April 14, 1953 J. R. RETALLACK 2,634,910

COMPUTING CIRCUITS FOR AUTOMATIC BILLING SYSTEMS

Filed June 22, 1949 29 Sheets-Sheet 1

INVENTOR
J.B. RETALLACK
BY
P. C. Smith
ATTORNEY

April 14, 1953 J. R. RETALLACK 2,634,910

COMPUTING CIRCUITS FOR AUTOMATIC BILLING SYSTEMS

Filed June 22, 1949 29 Sheets-Sheet 2

INVENTOR
J.B. RETALLACK
BY
P. C. Smith
ATTORNEY

April 14, 1953 J. R. RETALLACK 2,634,910

COMPUTING CIRCUITS FOR AUTOMATIC BILLING SYSTEMS

Filed June 22, 1949 29 Sheets-Sheet 3

INVENTOR
J.B. RETALLACK
BY P. C. Smith
ATTORNEY

April 14, 1953 J. R. RETALLACK 2,634,910

COMPUTING CIRCUITS FOR AUTOMATIC BILLING SYSTEMS

Filed June 22, 1949 29 Sheets-Sheet 4

INVENTOR
J.B. RETALLACK
BY P. C. Smith
ATTORNEY

INVENTOR
J.B. RETALLACK
BY P. C. Smith
ATTORNEY

April 14, 1953 J. R. RETALLACK 2,634,910

COMPUTING CIRCUITS FOR AUTOMATIC BILLING SYSTEMS

Filed June 22, 1949 29 Sheets-Sheet 6

INVENTOR
J.B. RETALLACK
BY P. C. Smith
ATTORNEY

April 14, 1953 J. R. RETALLACK 2,634,910

COMPUTING CIRCUITS FOR AUTOMATIC BILLING SYSTEMS

Filed June 22, 1949 29 Sheets-Sheet 7

INVENTOR
J.B. RETALLACK
BY
P. C. Smith
ATTORNEY

April 14, 1953 J. R. RETALLACK 2,634,910

COMPUTING CIRCUITS FOR AUTOMATIC BILLING SYSTEMS

Filed June 22, 1949 29 Sheets-Sheet 8

INVENTOR
J. B. RETALLACK
BY P. C. Smith
ATTORNEY

April 14, 1953 J. R. RETALLACK 2,634,910

COMPUTING CIRCUITS FOR AUTOMATIC BILLING SYSTEMS

Filed June 22, 1949 29 Sheets-Sheet 9

INVENTOR
J.B. RETALLACK
BY P. C. Smith
ATTORNEY

INVENTOR
J.B. RETALLACK
BY P. C. Smith
ATTORNEY

INVENTOR
J.B. RETALLACK
BY P. C. Smith
ATTORNEY

COMPUTING CIRCUITS FOR AUTOMATIC BILLING SYSTEMS

Filed June 22, 1949 29 Sheets-Sheet 12

INVENTOR
J.B. RETALLACK
BY P. C. Smith
ATTORNEY

April 14, 1953 J. R. RETALLACK 2,634,910

COMPUTING CIRCUITS FOR AUTOMATIC BILLING SYSTEMS

Filed June 22, 1949 29 Sheets-Sheet 13

INVENTOR
J.B. RETALLACK
BY P. C. Smith
ATTORNEY

INVENTOR
J.B. RETALLACK
BY P. C. Smith
ATTORNEY

INVENTOR
J.B. RETALLACK
BY P. C. Smith
ATTORNEY

COMPUTING CIRCUITS FOR AUTOMATIC BILLING SYSTEMS

Filed June 22, 1949 29 Sheets-Sheet 16

INVENTOR
J.B. RETALLACK
BY P. C. Smith
ATTORNEY

April 14, 1953 J. R. RETALLACK 2,634,910

COMPUTING CIRCUITS FOR AUTOMATIC BILLING SYSTEMS

Filed June 22, 1949 29 Sheets-Sheet 17

INVENTOR
J.B. RETALLACK
BY P. C. Smith
ATTORNEY

INVENTOR
J.B. RETALLACK
BY P. C. Smith
ATTORNEY

April 14, 1953 J. R. RETALLACK 2,634,910

COMPUTING CIRCUITS FOR AUTOMATIC BILLING SYSTEMS

Filed June 22, 1949 29 Sheets-Sheet 19

INVENTOR
J.B. RETALLACK
BY P. C. Smith
ATTORNEY

COMPUTING CIRCUITS FOR AUTOMATIC BILLING SYSTEMS

Filed June 22, 1949 29 Sheets-Sheet 20

INVENTOR
J.B. RETALLACK
BY P. C. Smith
ATTORNEY

April 14, 1953 J. R. RETALLACK 2,634,910

COMPUTING CIRCUITS FOR AUTOMATIC BILLING SYSTEMS

Filed June 22, 1949 29 Sheets-Sheet 21

INVENTOR
J.B. RETALLACK
BY P. C. Smith
ATTORNEY

April 14, 1953 J. R. RETALLACK 2,634,910

COMPUTING CIRCUITS FOR AUTOMATIC BILLING SYSTEMS

Filed June 22, 1949 29 Sheets-Sheet 22

INVENTOR
J.B. RETALLACK
BY P. C. Smith
ATTORNEY

INVENTOR
J.B. RETALLACK
BY P. C. Smith
ATTORNEY

April 14, 1953 J. R. RETALLACK 2,634,910

COMPUTING CIRCUITS FOR AUTOMATIC BILLING SYSTEMS

Filed June 22, 1949 29 Sheets-Sheet 24

INVENTOR
J.B. RETALLACK
BY P. C. Smith
ATTORNEY

INVENTOR
J.B. RETALLACK
BY P. C. Smith
ATTORNEY

INVENTOR
J.B. RETALLACK
BY P. C. Smith
ATTORNEY

INVENTOR
J.B. RETALLACK
BY P. C. Smith
ATTORNEY

INVENTOR
J.B. RETALLACK
BY P. C. Smith
ATTORNEY

INVENTOR
J.B. RETALLACK
BY P. C. Smith
ATTORNEY

Patented Apr. 14, 1953 2,634,910

UNITED STATES PATENT OFFICE 2,634,910

COMPUTING CIRCUITS FOR AUTOMATIC BILLING SYSTEMS

John B. Retallack, New York, N. Y., assignor to Bell Telephone Laboratories, Incorporated, New York, N. Y., a corporation of New York Application June 22, 1949, Serial No. 100,572

18 Claims. (Cl. 235—61.8)

This invention relates to telephone exchange systems and more particularly to automatic message accounting equipment for such systems.

Circuits have heretofore been proposed for automatically preparing records for short-haul toll calls which may be used for enabling bills to be prepared for transmission to subscribers for all toll calls made during a billing period. One type of automatic ticketing circuits which has been proposed, employs a ticket printer associated with a trunk employed in the establishment of the toll connection which printer prints on a ticket all of the call data that may be required for ticketing the call. Such a system is fully disclosed for example in Patent 2,629,016 granted February 17, 1953, to J. W. Gooderham and in the Patent No. 2,447,533, granted August 24, 1948, to J. B. Retallack. The record instead of being printed on a ticket may be magnetically recorded as disclosed in Patent 2,594,495 of April 29, 1952, to J. B. Retallack or may be punched in the ticket as disclosed for example in the application of W. W. Carpenter and R. E. Collis, Serial No. 759,402, filed July 7, 1947, or may be punched in a paper tape as disclosed in the Patent No. 2,165,925, granted July 11, 1939, to C. L. Goodrum, E. E. Hinrichsen, and L. Keller.

The toll ticket or tape has printed or otherwise recorded thereon the office code and numerical digits of the calling line designation, the class of the calling line, the office code and numerical digits of the called line designation, the charge rate for the call as determined from the office zones in which the calling and called lines are located, and digits indicative of the total elapsed time in minutes of the conversation. If the tickets are printed or punched they may be sent to the central accounting office to enable the accounting office to prepare the usual bill for service as is now done from tickets manually prepared by toll operators.

A next appropriate step is the production of toll tickets or records which are acapable of controlling billing or accounting devices to automatically prepare a bill suitable for mailing to a subscriber. In a system in which a toll ticket is printed it would be possible to modify the ticket printer so that in addition to printing the numerical data appertaining to a toll call, it would simultaneously print code data on the ticket corresponding to each item of numerical data whereby the ticket when submitted to an electronic scanner might, through the operation of the scanner, control suitable accounting apparatus. Such an electronic scanner has been disclosed in Patent No. 2,417,427 granted March 18, 1947, to R. F. Massonneau. If the call data is recorded on a ticket by punched holes the ticket may be read by a reader of the type disclosed for example in Patent 2,558,476 to W. W. Carpenter and J. W. Gooderham of June 26, 1951.

Automatic billing may be on either a bulk or a detailed basis. If on a detailed basis the electronic scanner or reader will scan each of the tickets or records made during a billing period at any or all offices of an exchange area to make registrations of the data recorded on each ticket or record scanned from which a computation of a money charge for the call is computed and a card punching machine is operated to punch a card corresponding to each toll call. The card would have punched thereon all the necessary data relating to the call including the computed money charge necessary for billing the call. All of the cards thus prepared may then be sorted by an automatic sorting machine in accordance with the subscriber's account and a stack of sorted cards may then be submitted to an automatic billing machine. A system which prepares toll cards for individual calls on a detailed basis is disclosed for example in my application Serial No. 772,092, filed September 4, 1947, and allowed November 6, 1952.

If the bulk billing basis is to be used the printed or punched tickets may first be submitted to an electronic scanner or reader which controls a sorting mechanism to sort the tickets into stacks in accordance with subscribers' accounts. The stack of tickets appertaining to a subscriber's account is then submitted to another scanning device or reader which controls computing mechanism to compute the individual charges for the separate calls in terms of message units, to add the computed individual charges and to add to that total the total message units for all local calls made during the billing period whereby a teletypewriter may be controlled to prepare a bill for the subscriber's account in which all the charges are billed in terms of message units.

It is an object of the invention to provide simple and reliable facilities for receiving data relating to a toll call and for computing from such data the number of message units to be charged for the call.

A further object of the invention is to provide facilities for successively receiving data relating to a plurality of toll calls, for computing from such data the number of message units to be charged for the calls, and for determining the total message units for all of the calls.

A further object of the invention is to provide facilities for subtracting message units from the total computed message units in the event that a subscriber's account should be credited with message units.

A further object of the invention is to provide facilities for adding message units to the total computed message units for all toll calls to determine the total number of message units for both toll and local calls for a billing period.

A further object of the invention is to provide facilities for receiving the digital data relating to the directory number of the subscriber whose account is being computed and for translating such data into the office designation and directory number of such subscriber to enable the printing thereof on a bill.

A further object of the invention is the provision of facilities for printing a bill on which the directory number of the subscriber and the total message units for the billing period are printed.

In general, the circuits of the present invention function to attain the hereinbefore enumerated objects in the manner now set forth. It will be assumed that the tickets for all calls made in an office of a switching area during a billing period have been sorted and that the stack of tickets pertaining to a particular subscriber's account has been placed in a reader associated with the billing equipment together with a ticket on which is recorded the number of message units to be charged the subscriber for all local calls made during the billing period. A start key is then operated which starts the reader to scan the first ticket of the stack which will be for a toll call if such a toll call has been made by the subscriber. The reader upon scanning the ticket will cause the registration of the several items of information relating to the toll call, including the office code and numerical digits of the calling subscriber's directory number, the office code digits of the called line number, the class of the calling line, the rate at which the call is to be charged and the tens and units digits of the elapsed time of conversation.

The charge rate for the registered toll call may be determined directly from the charge rate register or may be determined from the office code digits of both the calling and called line numbers as registered. This is accomplished by the operation of a calling zone relay operable in accordance with the three registered office code digits of the calling line number, by the operation of a called zone relay operable in accordance with the three registered office code digits of the called subscriber's line number and by the operation of a route charge relay under the joint control of the calling and called zone relays. If required the charge condition as determined by the operation of the route charge relay may be further modified in accordance with the class of service to which the calling line is entitled as registered in the class-of-service register of the computer.

With the tens and units elapsed time registers of the computer operated and the route charge relay operated a subtracting circuit is operated to subtract the predetermined initial period of conversation which may, for example, be three, four or five minutes, from the total registered elapsed minutes of conversation to determine the overtime minutes of conversation. The overtime minutes of conversation are then divided by a dividing circuit by one, two or five depending upon the preselected duration of each overtime period of conversation as determined by the operated route charge relay, to determine the number of periods of overtime. Having determined the number of periods of overtime such data is applied to a multiplying circuit which multiplies the number of overtime periods by the rate set in terms of message units for each period as determined by the route charge relay, which rate may for example be one or two message rate uints for each period. The charge for the overtime periods of conversation as determined in message units is then applied to a further adding circuit which adds thereto the charge for the initial period of conversation, which may be from one to seven message uints, as determined by the operated route charge relay so that the output from this adding circuit gives the total charge in message units for the total period of conversation. This output is then applied to a further adding and storing circuit.

The register circuits are then restored and the reader is progressed to read the next ticket in the stack. In response to such reading the message units for another toll call recorded on such ticket are computed and the computed message units are applied to the adding and storing circuit whereby they are added to the message units stored in response to the reading of the preceding ticket. In this manner all tickets for toll calls that are in the stack are successively read and computations made so that after the last toll ticket has been read the adding and storing circuit will contain a record of the total message units to be charged for all toll calls made by the subscriber during the billing period.

The reader will then proceed to read the last ticket in the stack which will be a ticket for the total message units to be charged for all local calls made by the subscriber during the billing period. This ticket will have recorded thereon the digits of the office code and numerical number of the calling line, the digits of a special number indicative of the fact that the local-call message units ticket is being scanned and the hundreds, tens, and units digits of the number of local-call message units. The registration of the calling office code digits and the special called office code digits results in the operation of a special charge transfer relay which is effective to transfer the registrations of the hundreds, tens and units digits of the local-call message units registered in the class and elapsed time registers of the computer to the input of the adding and storing circuit. The adding and storing circuit now has a total of all of the message units to be charged against the subscriber's account for all toll and local calls made during the billing period.

As a further result of the operation of the charge route relay and the registration of the numerical digits of the calling line number, a record is made available for controlling a teletypewriter to print the directory number of the calling line on a billing ticket or bill.

A teletypewriter and associated progress switch are provided in the computer whereby, following the scanning of all of the tickets of a stack, the teletypewriter under the control of the progress switch proceeds to make a printed record of the subscriber's directory number and the total number of message units to be charged to the subscriber's account.

Provision is also made whereby message units may be substracted from the total message units for the billing period if the subscriber's account should be given given a credit.

The invention having now been described in a general manner, reference may be had, for a comprehensive understanding thereof, to the following detailed description when read in connection with the accompanying drawings in which.

Figure 15:
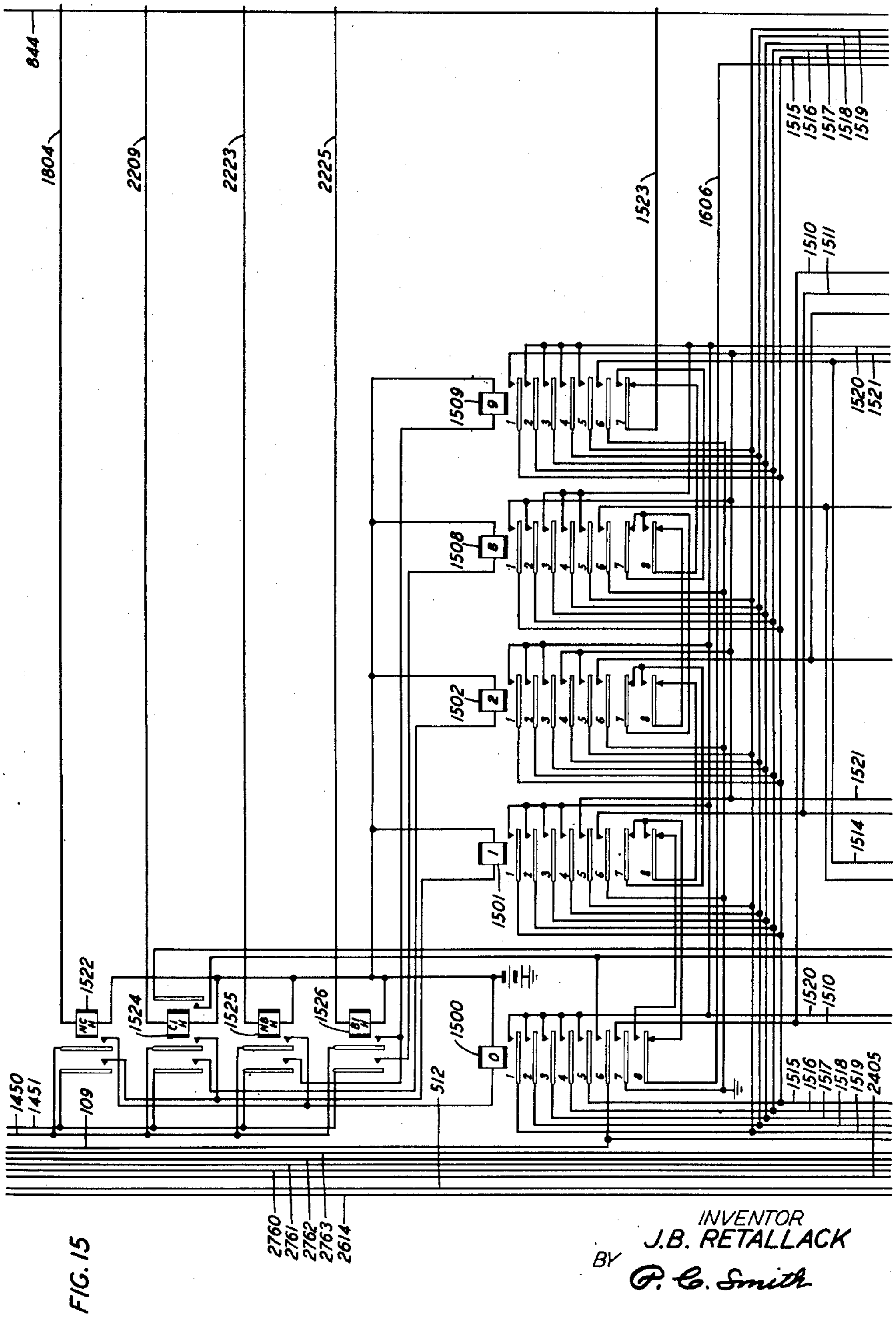
Figure 16:
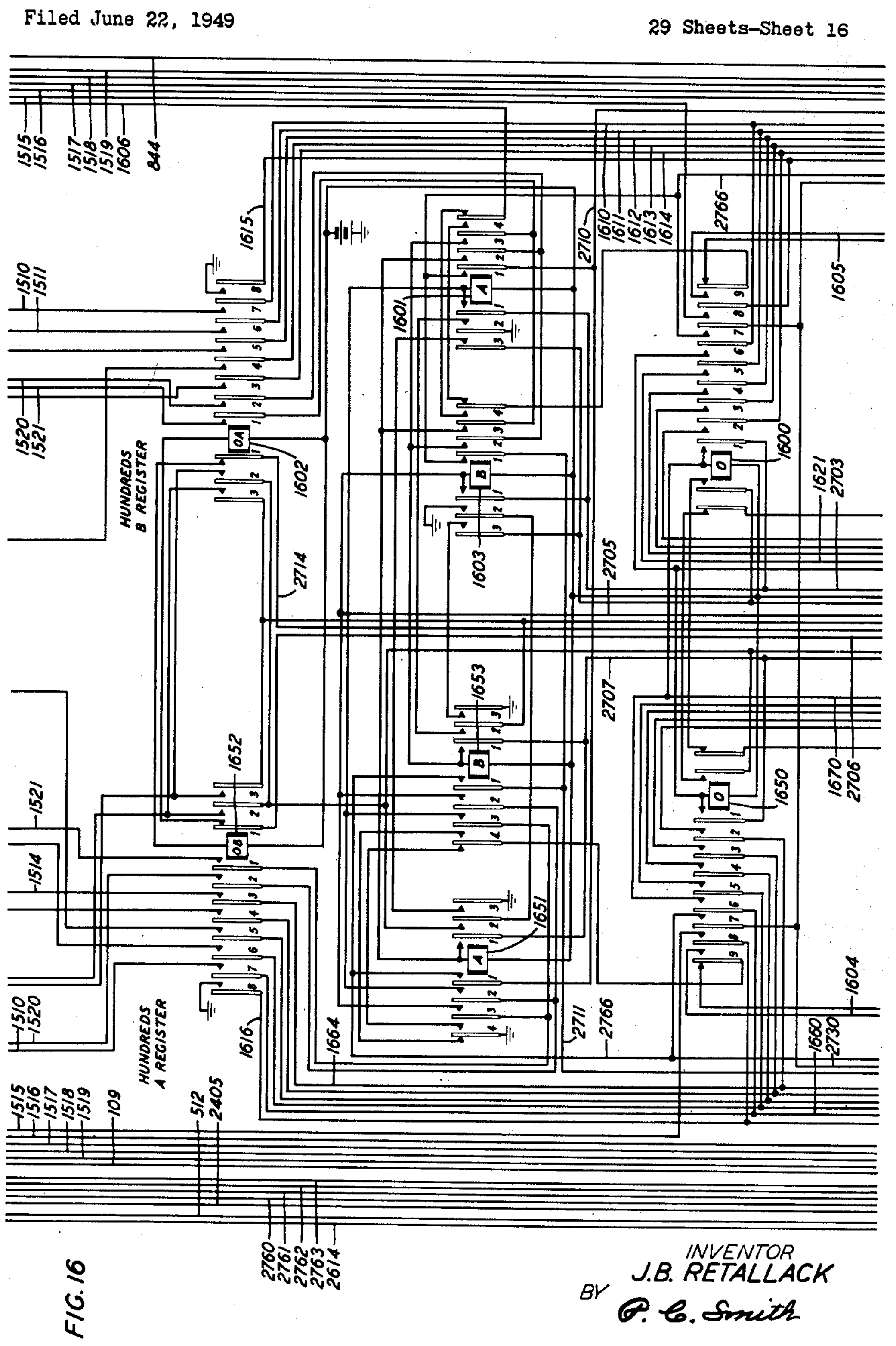
Figure 17:
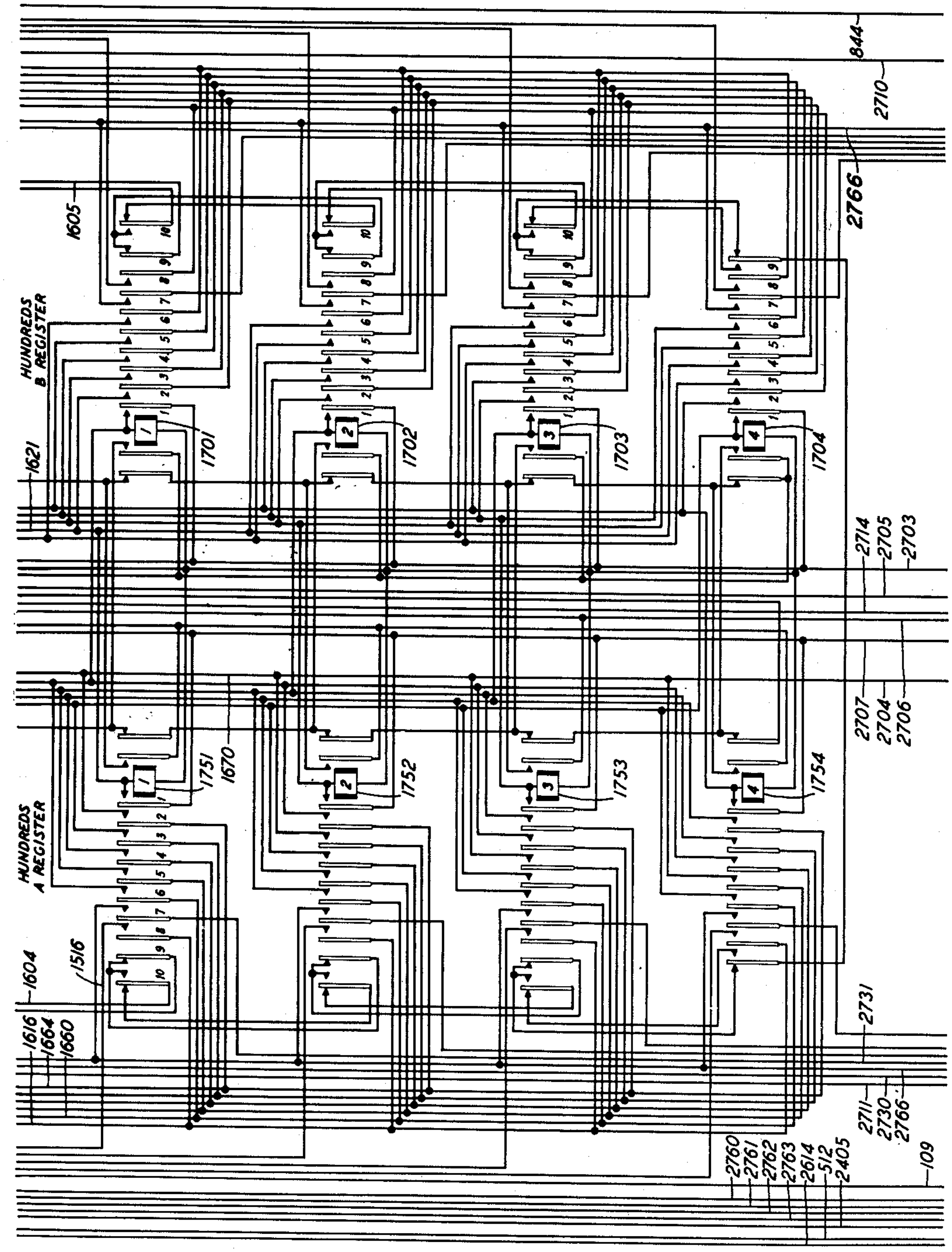
Figure 18:
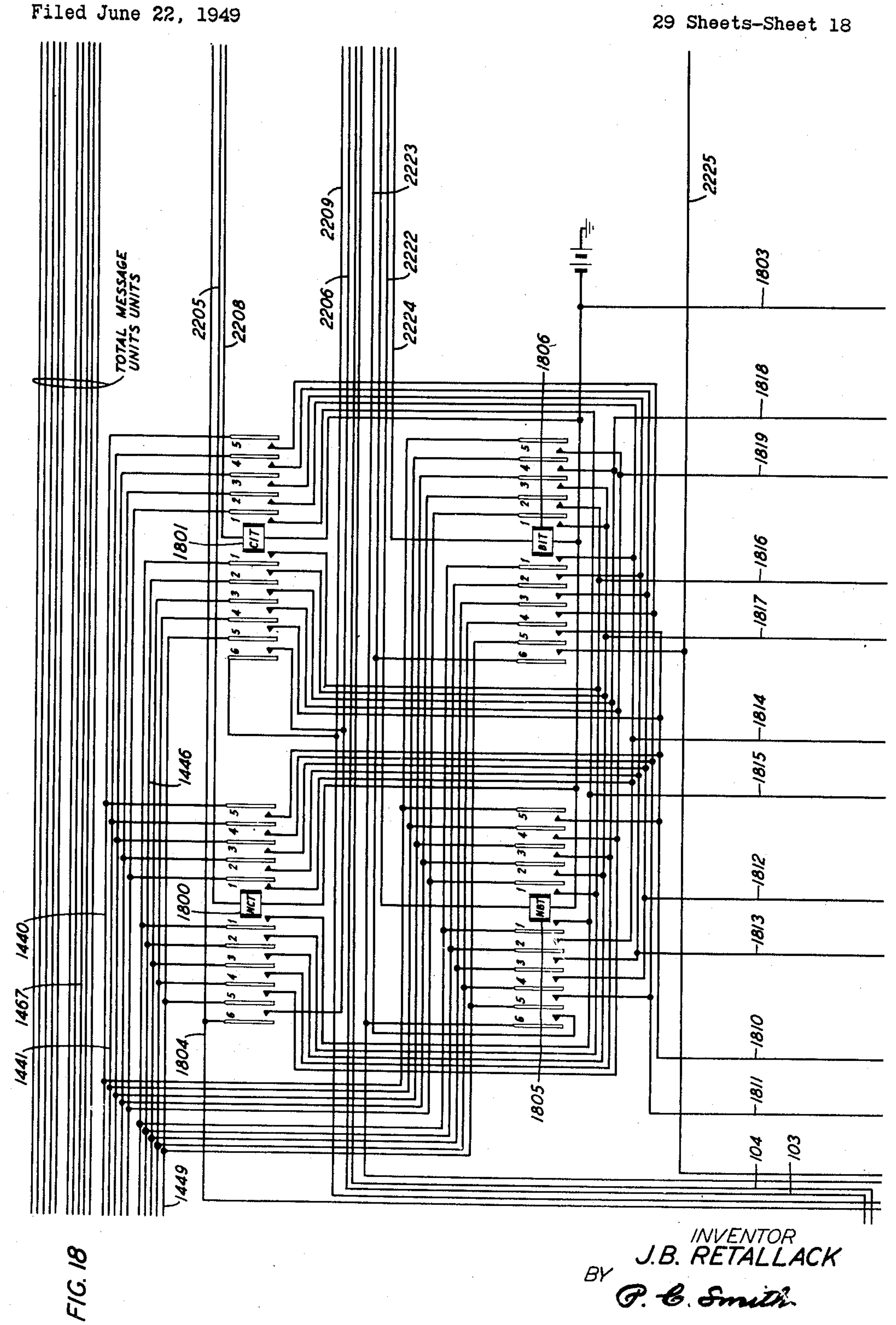
Figure 19:
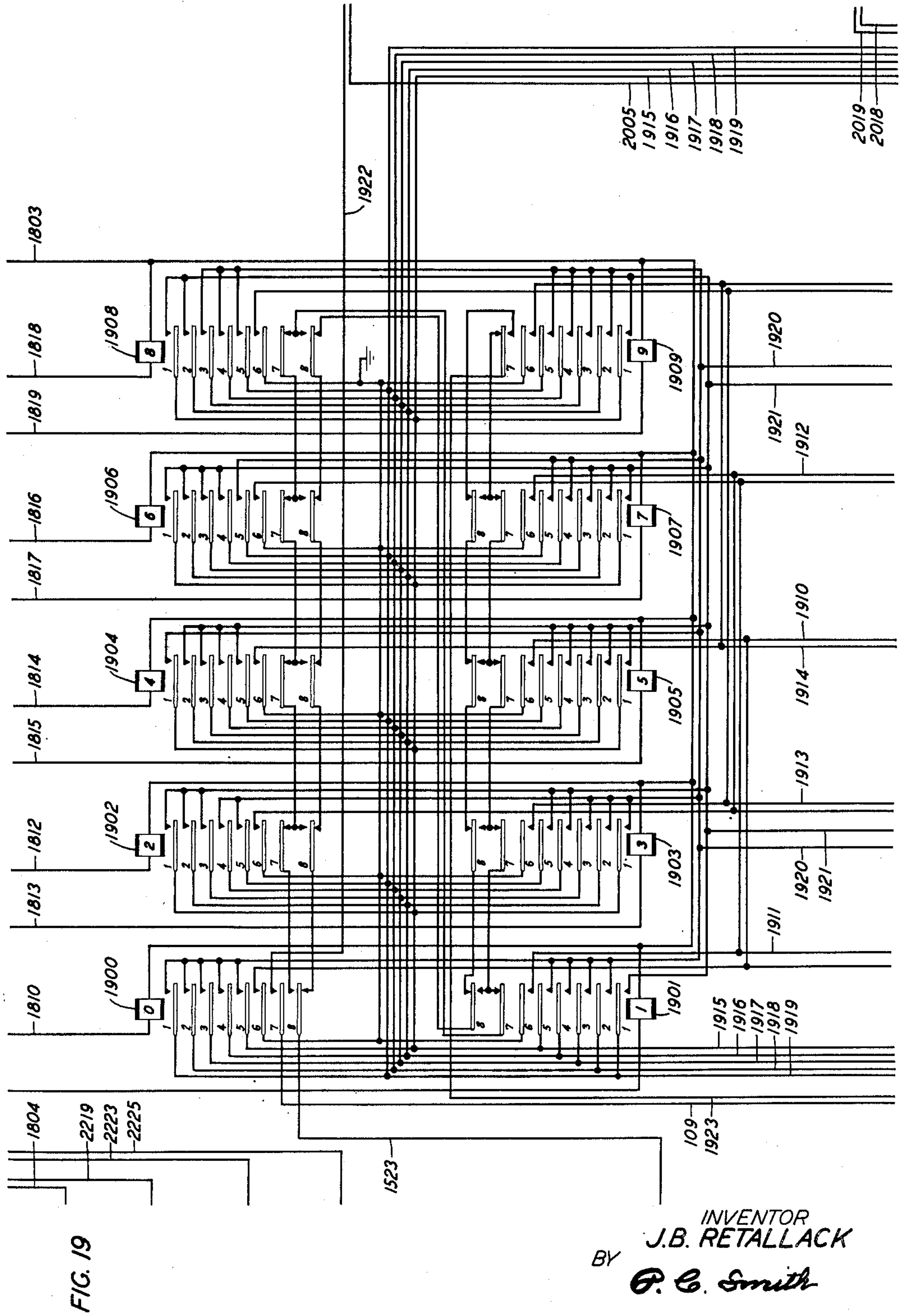
Figure 20:
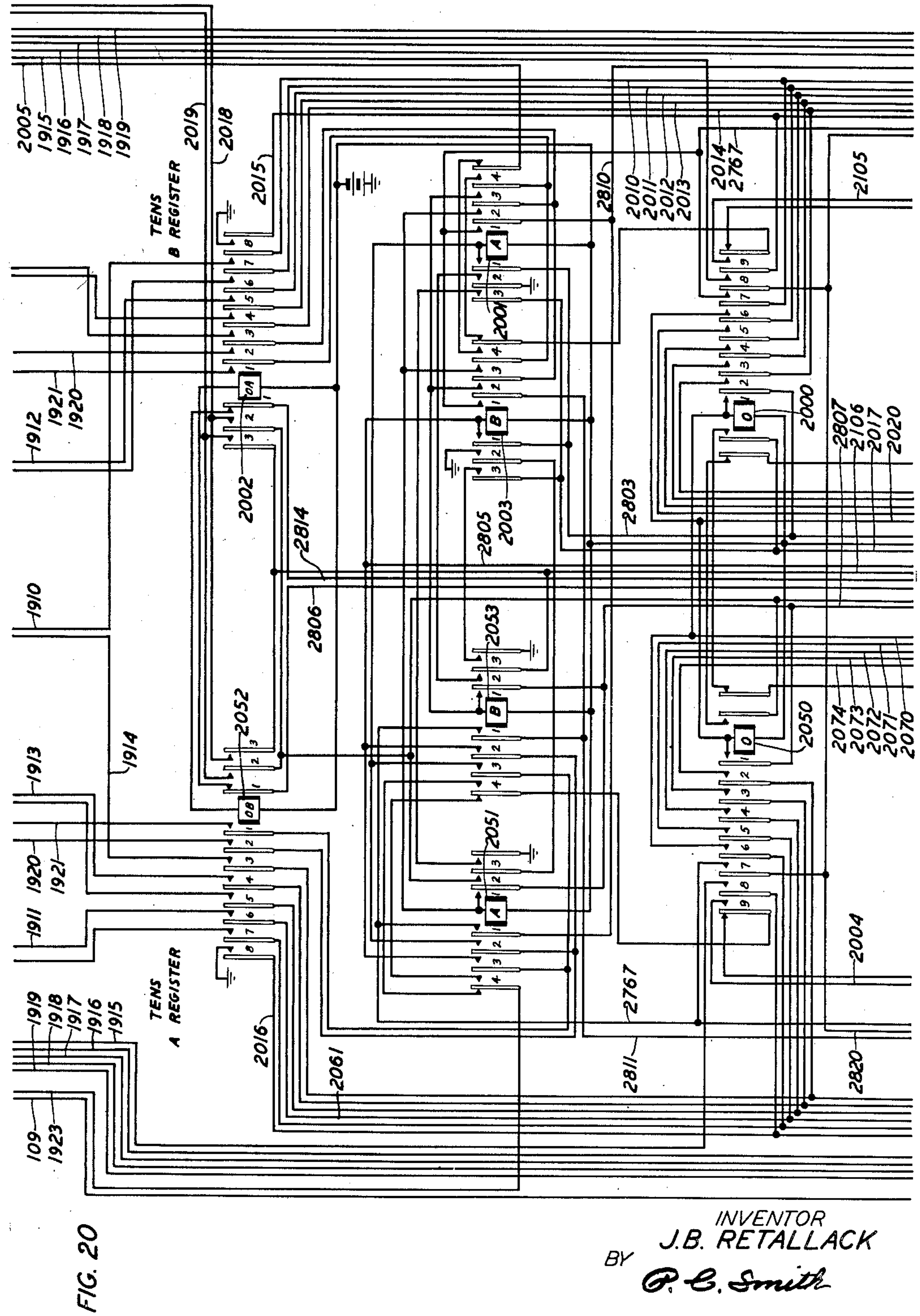
Figure 21:
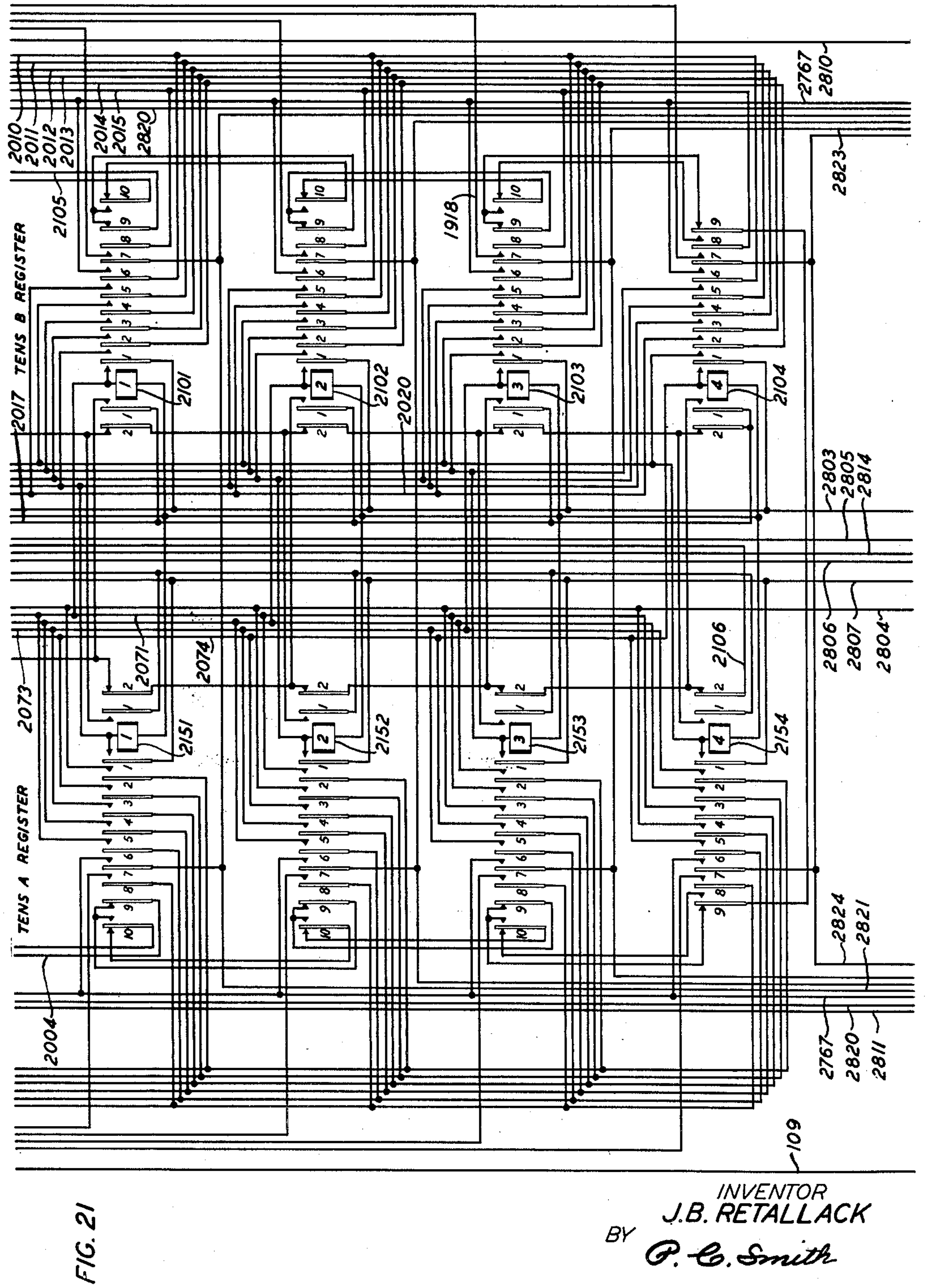
Figure 22:
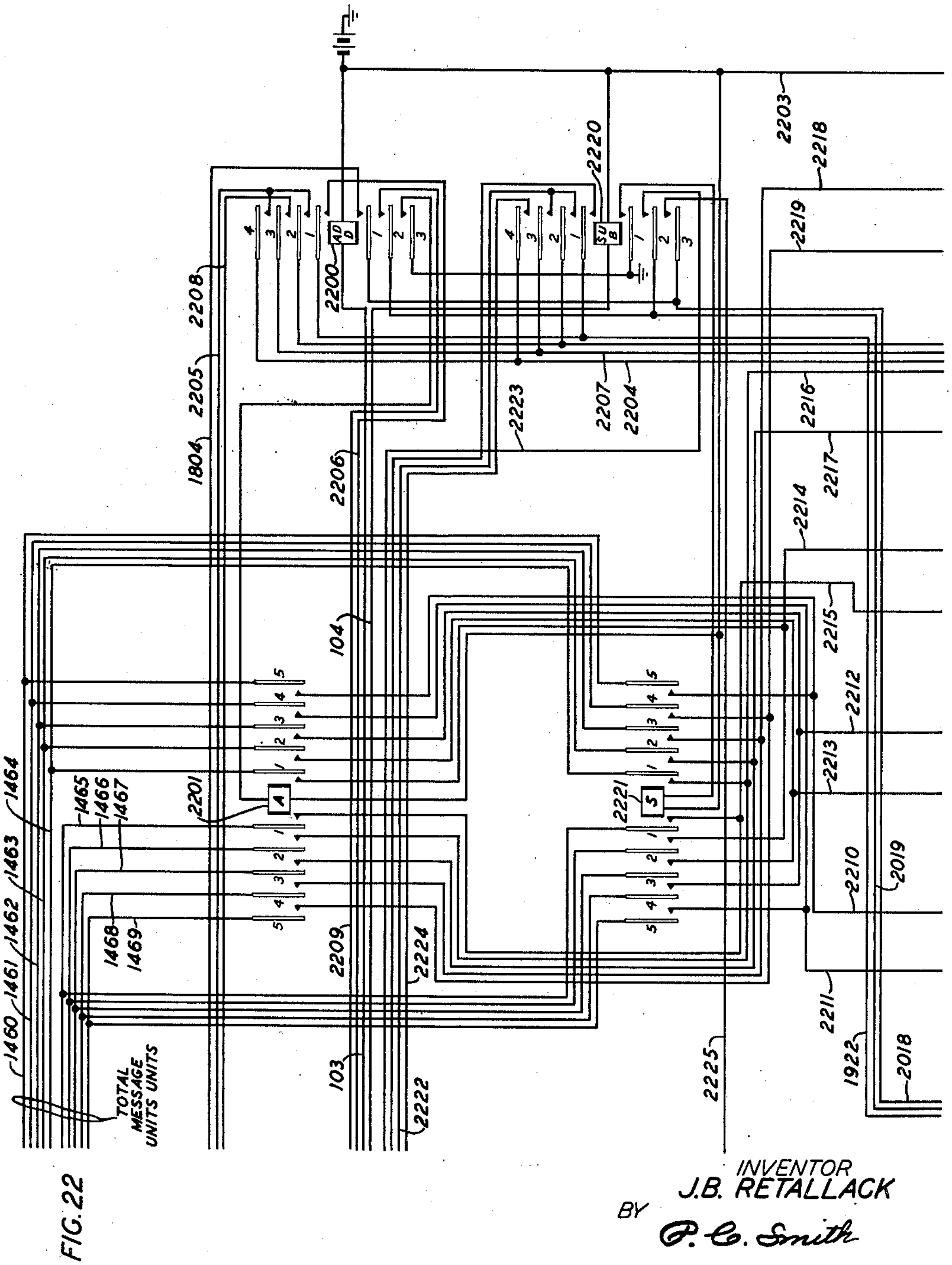
Figure 23:
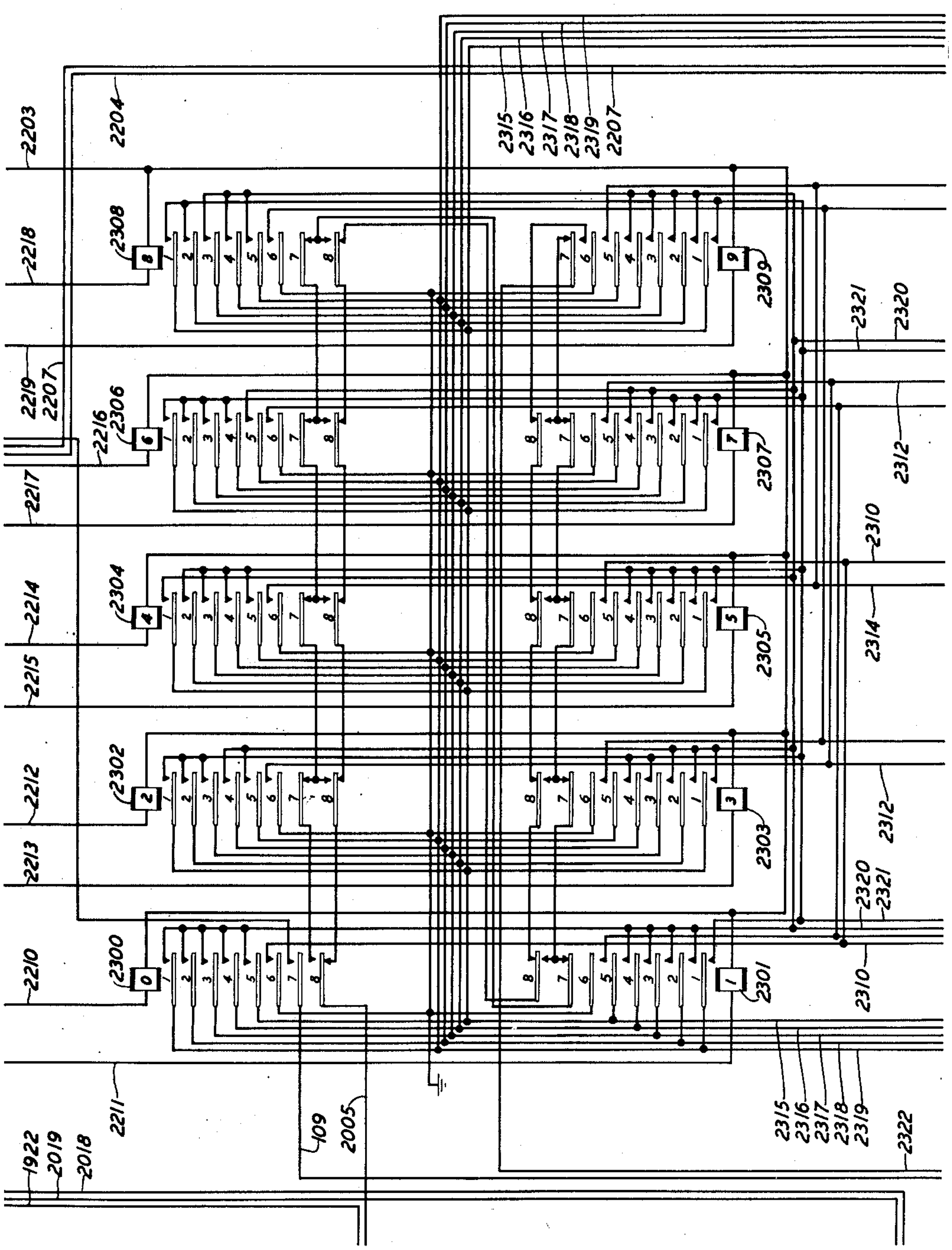
Figure 24:
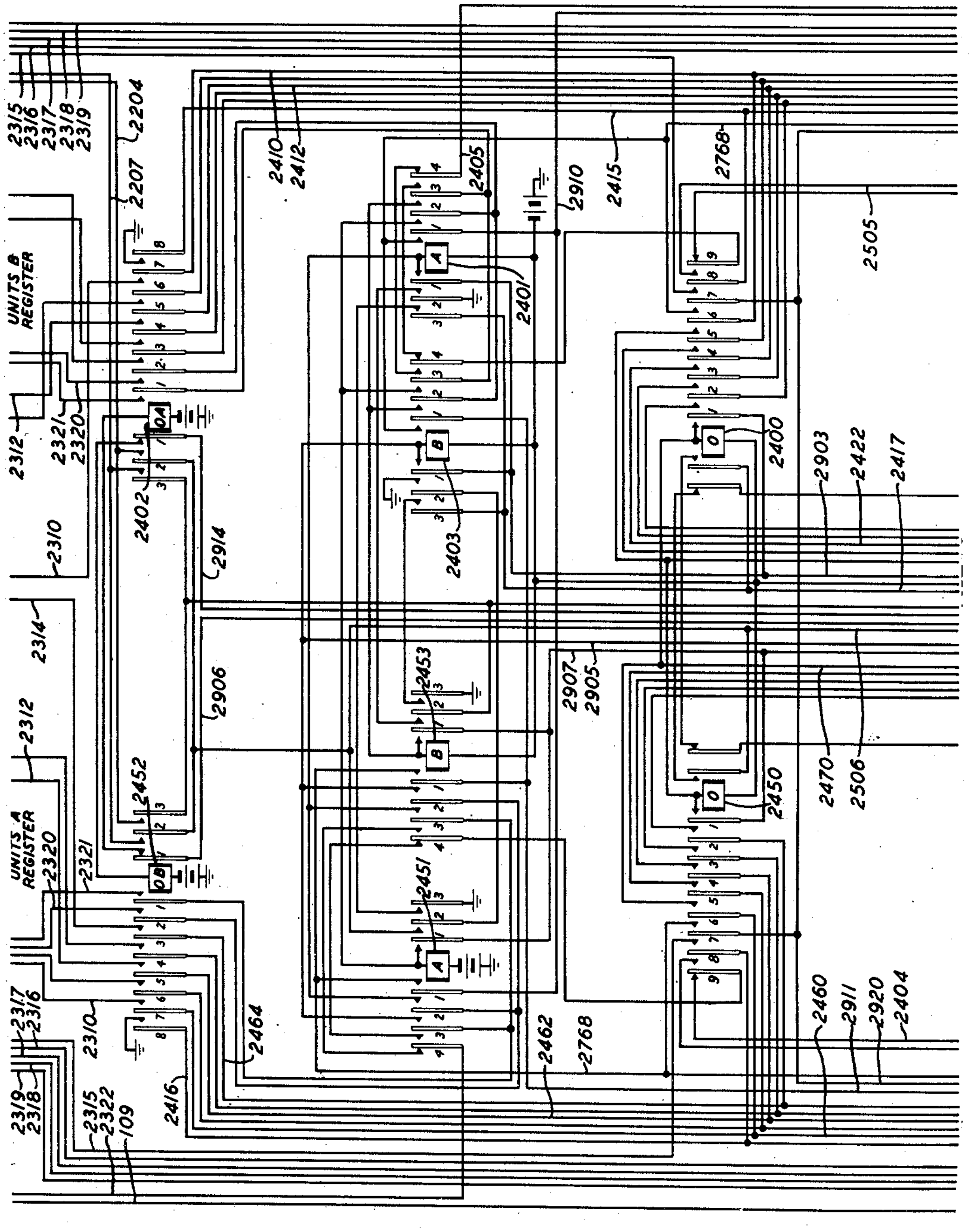
Figure 25:
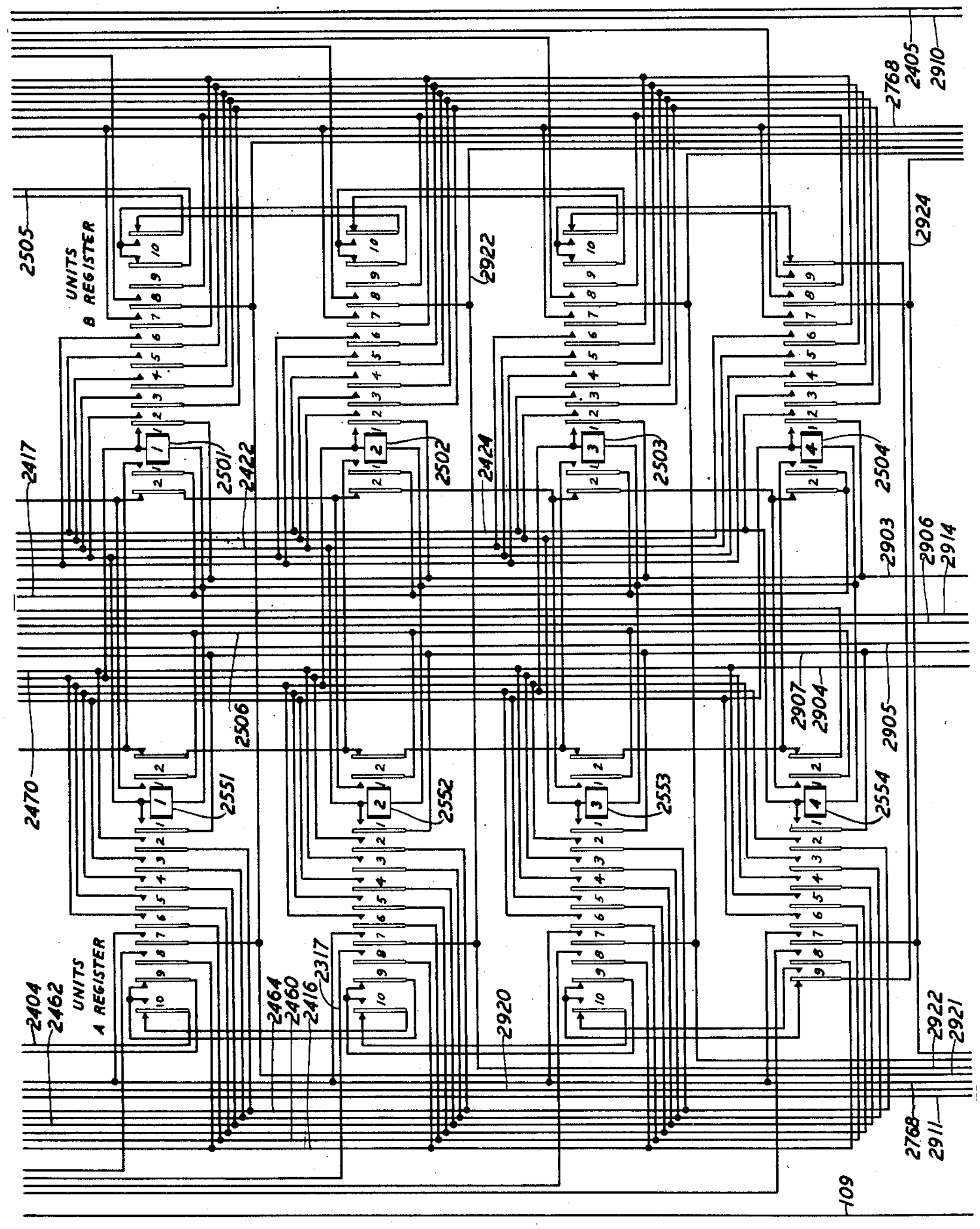
Figure 26:
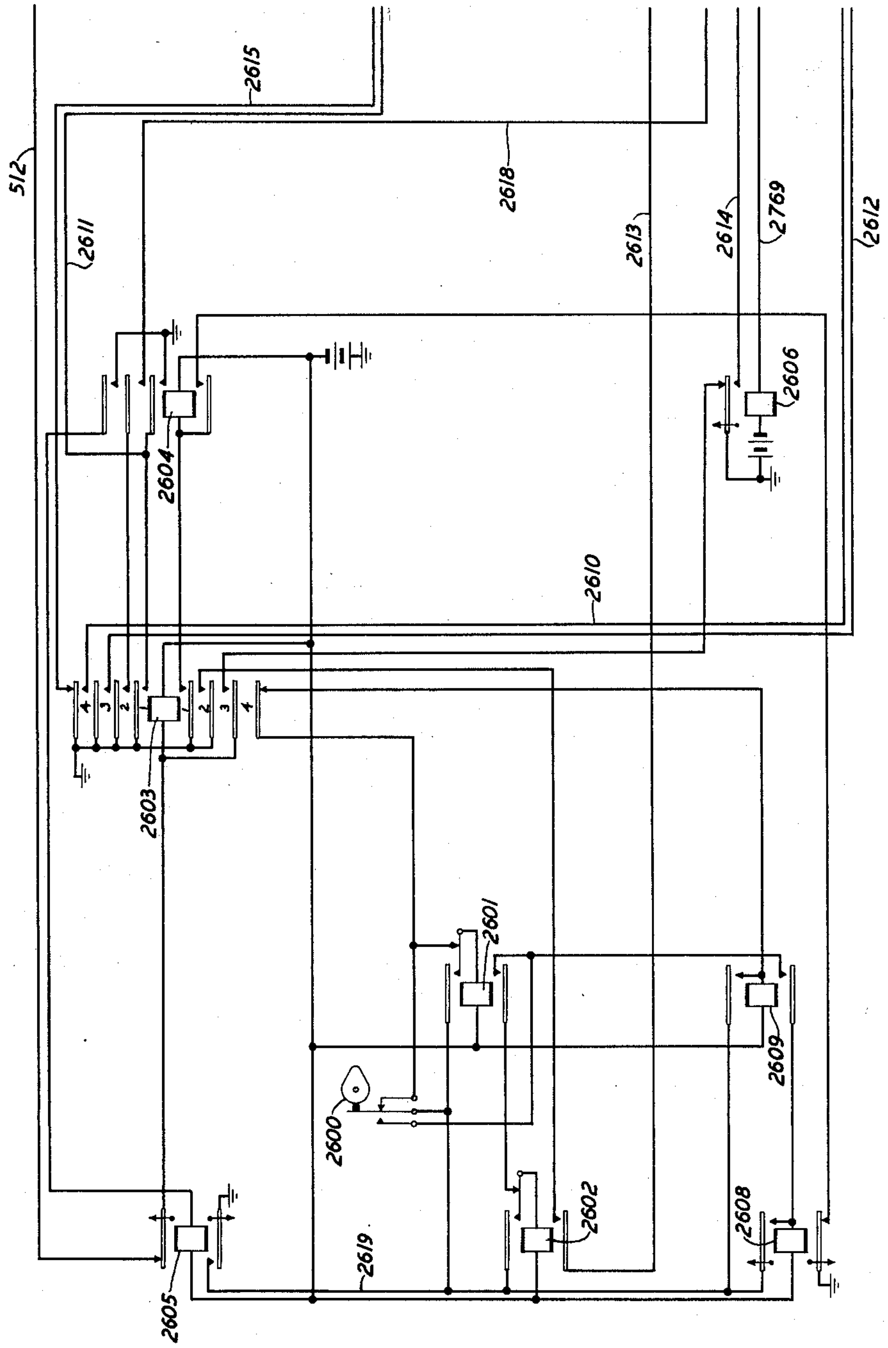
Figure 27:
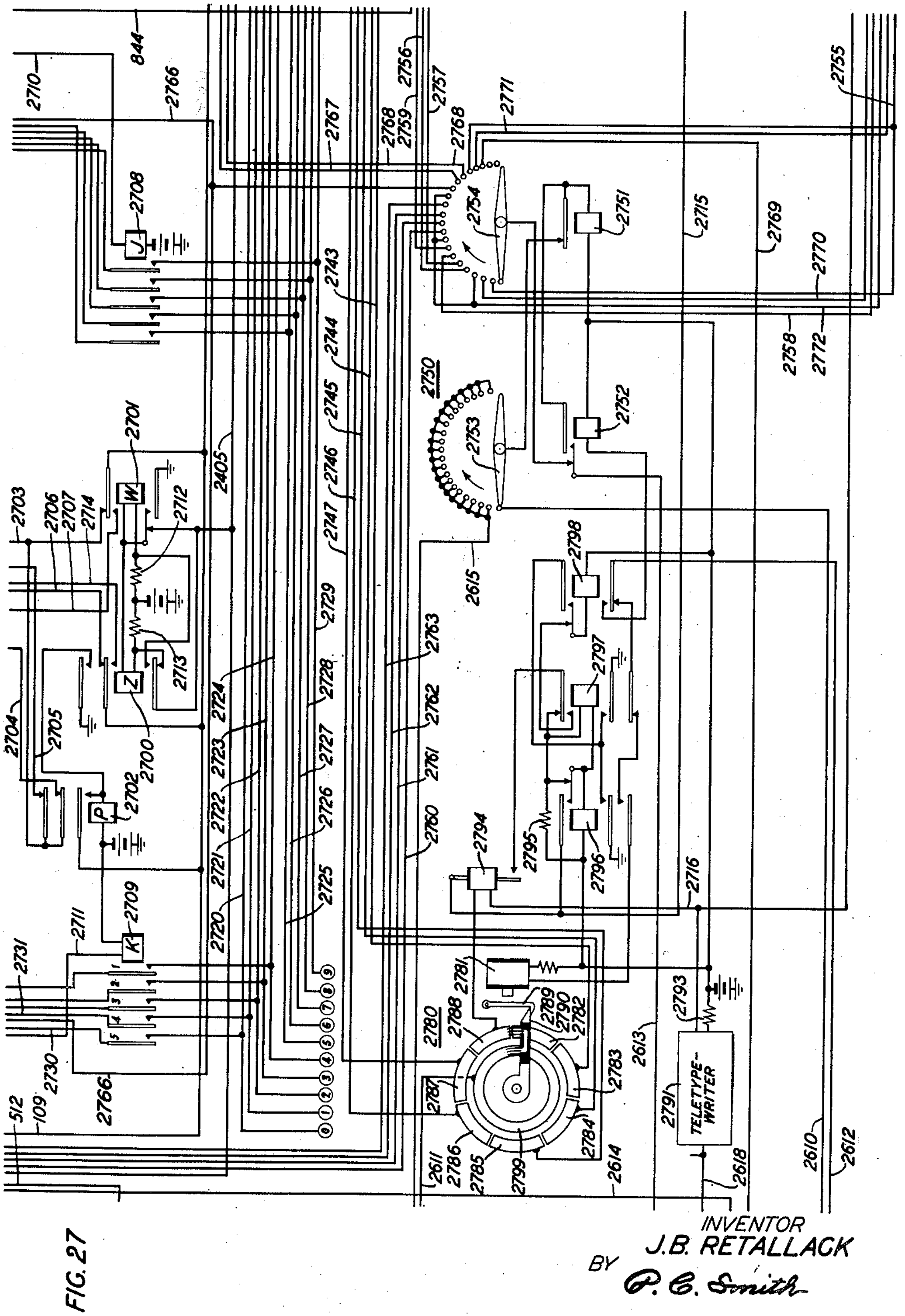
Figure 28:
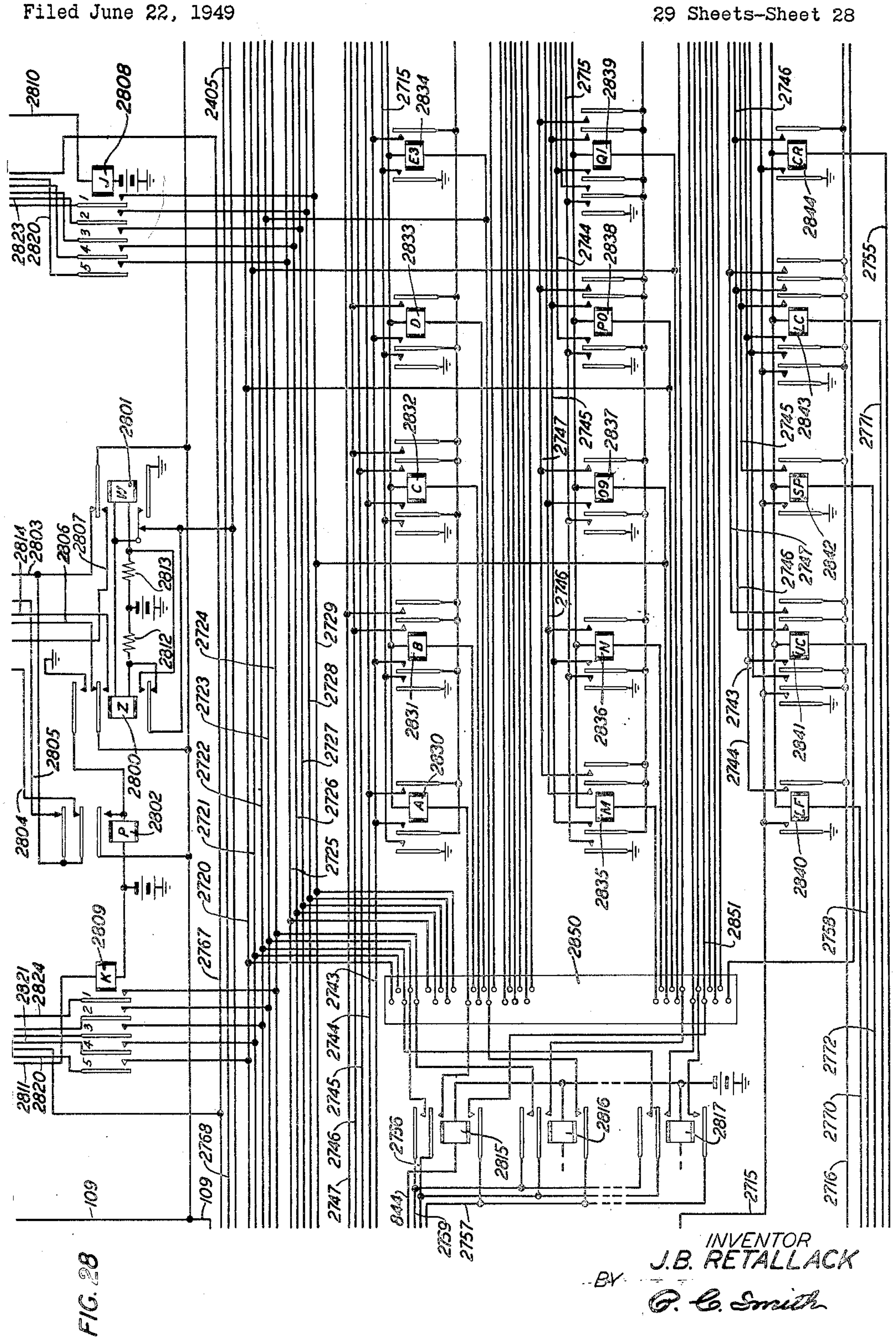
Figure 29:
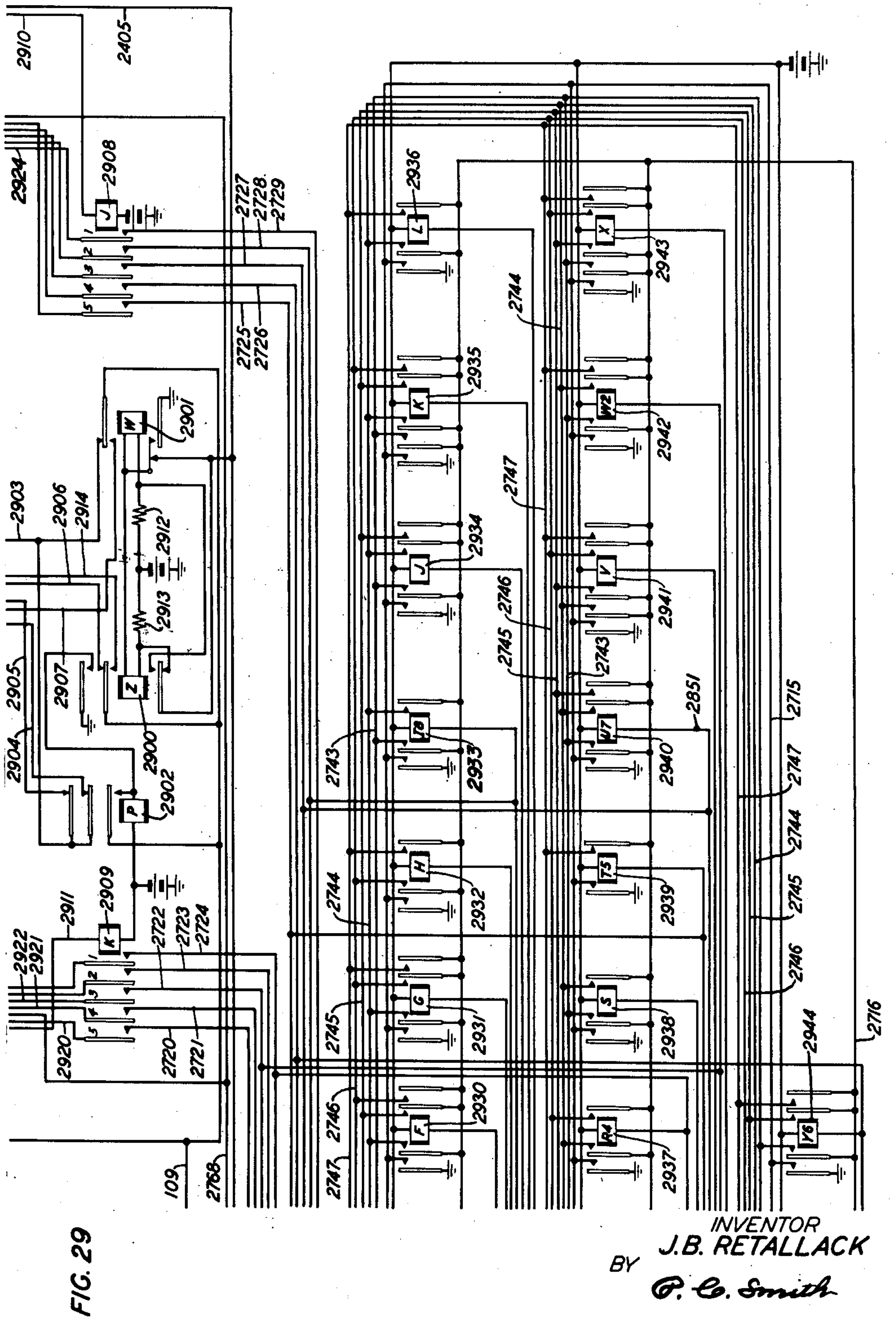

Fig. 15 in the upper portion thereof and Figs. 18 and 22 taken together, show circuits for enabling the computer to add or subtract message units for local calls from the total of the message units for all toll calls;

Fig. 15 in the lower portion thereof and Figs. 16, 17, 19, 20, 21, 23, 24, and 25 show circuits for adding and storing the hundreds, tens and units digits of message units: Figs. 15, 16 and 17 serving to add and store the hundreds digits; Figs. 19, 20 and 21 serving to add and store the tens digits and Figs. 23, 24 and 25 serving to add and store the units digits;

Fig. 26 shows control circuits for the teletypewriter;

Fig. 27 shows additional control circuits for the teletypewriter and the progress switch;

Figs. 28 and 29 show the character control relays for the teletypewriter; and

Figures 1, 30:
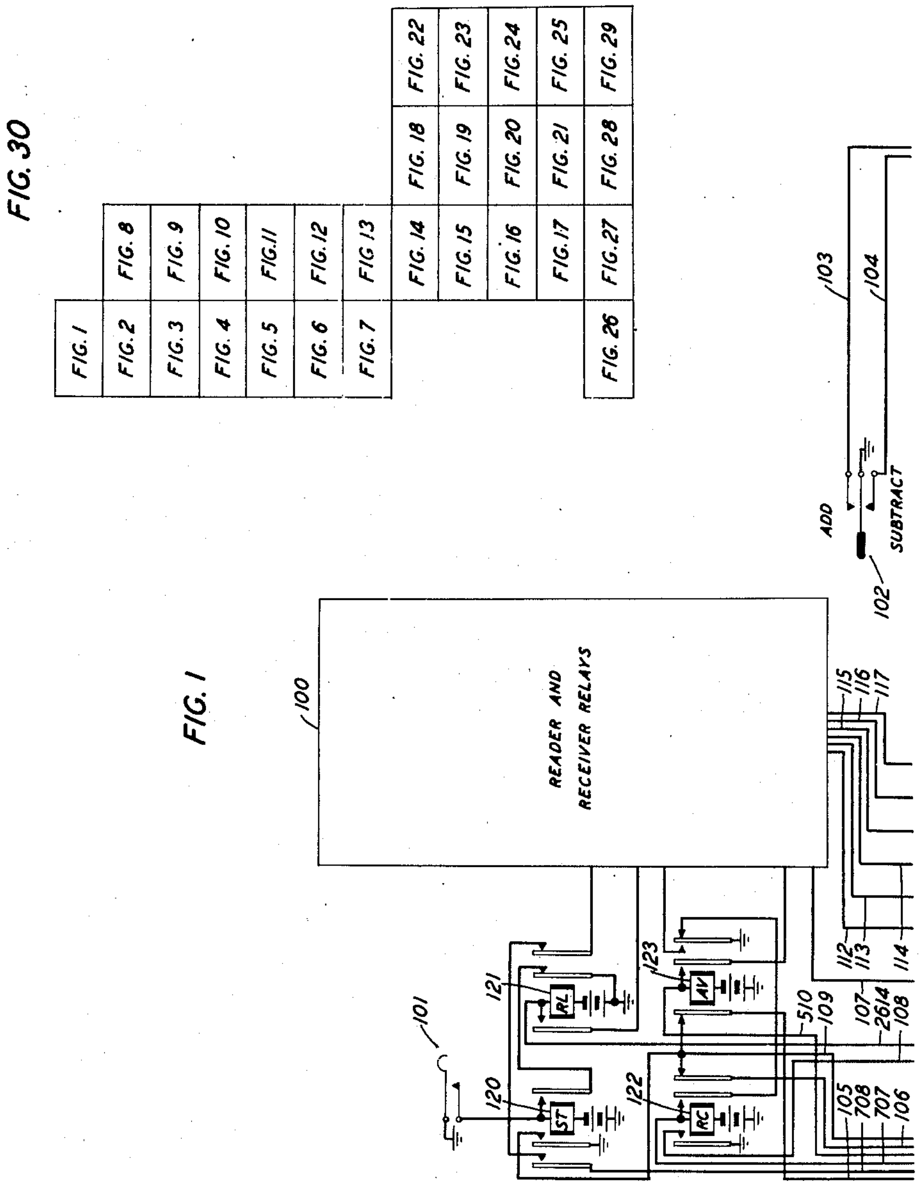
Fig. 1 shows schematically control relays and keys and a reader together with reader responsive relays indicated by the box.

Fig. 30 is a diagram showing how the several figures of the drawing should be arranged to completely disclose the invention.

The progress switch 2750 disclosed in Fig. 27 is of the step-by-step rotary type which is advanced step by step under the control of its stepping magnet 2751 and stepping relay 2752 to successively associate the registers of the computer circuits with terminals of the connecting rack 2850 of Fig. 28 whereby connections may be made to the character control relays of Figs. 28 and 29.

The teletypewriter and its associated circuits disclosed in Figs. 27, 28 and 29 may be of the general type disclosed in and referred to in Patent No. 2,238,126, granted April 15, 1941, to O. Myers.

Figure 8:
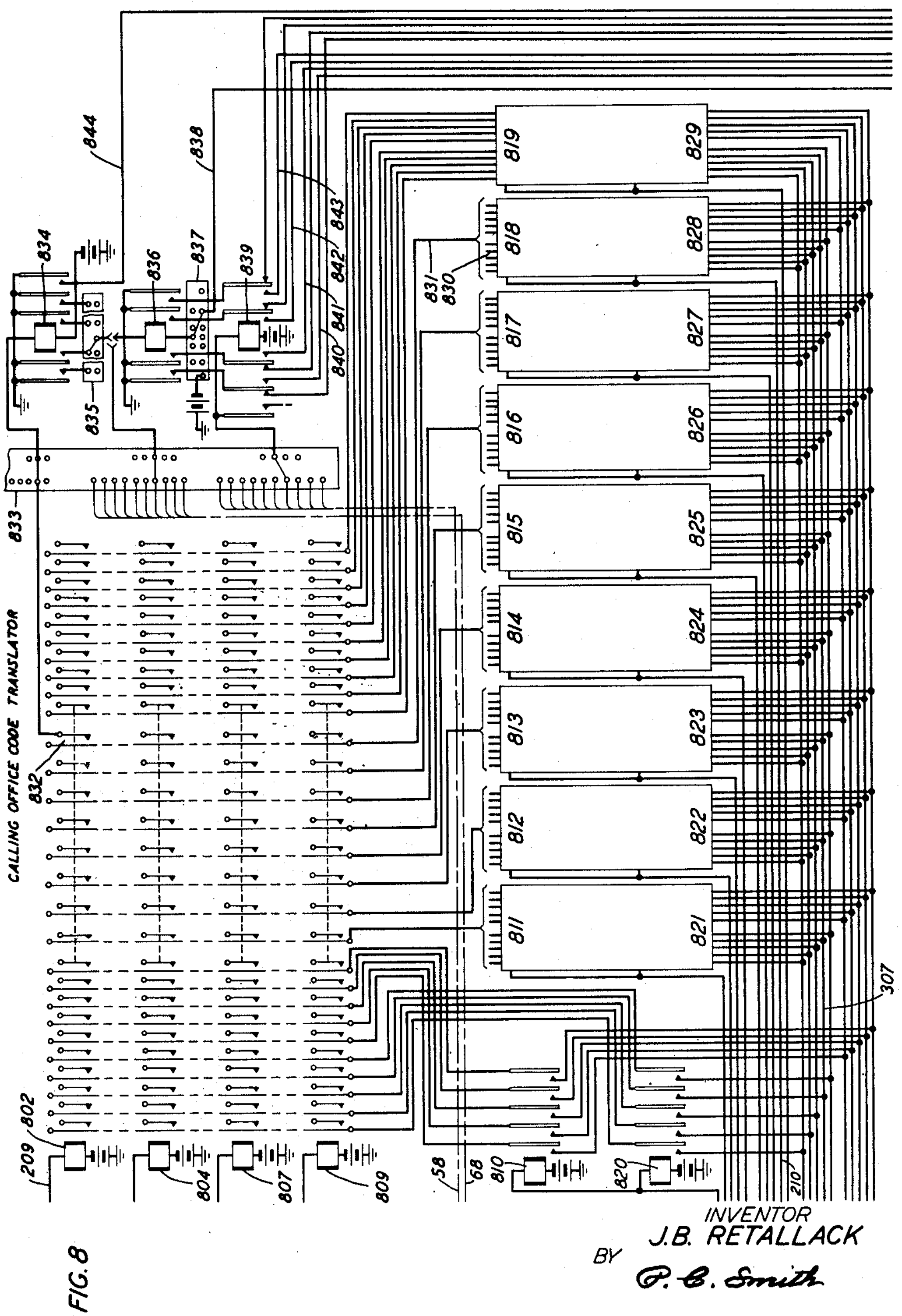
Fig. 8 shows the calling office code translator and calling zone, class of service and rate charge relays.
Figure 9:
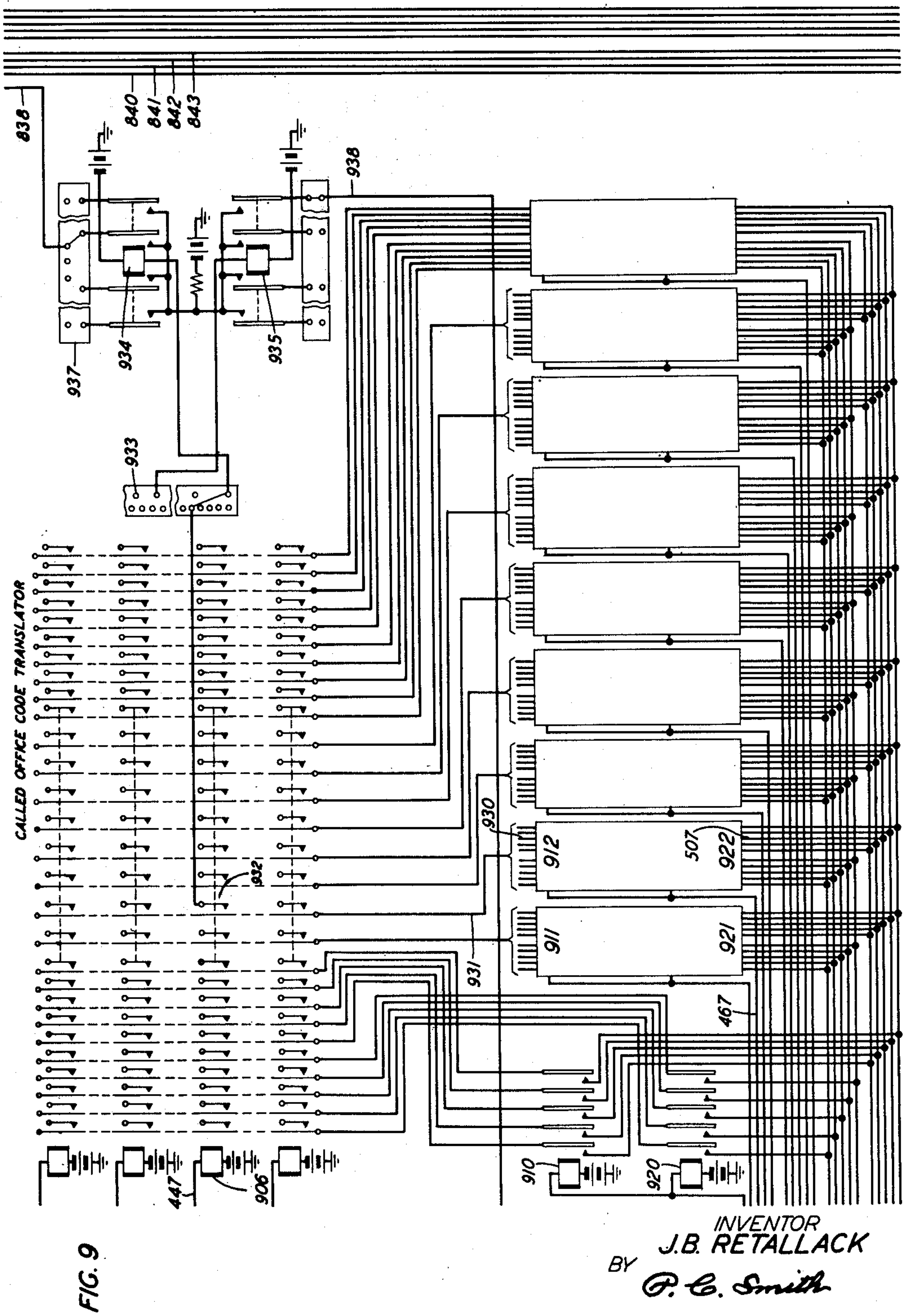
Fig. 9 shows the called office code translator and called zone and special rate charge relays.

The translator circuits disclosed in Figs. 8 and 9 are of the well-known type employed in the decoders of panel type exchange systems, such, for example, as is fully disclosed in Patent No. 1,862,549, granted June 14, 1932, to R. Raymond and W. J. Scully.

The registers shown in Figs. 2 to 7, inclusive, are of the conventional relay type controlled on a two-out-of-five code basis in response to circuits established from the scanner or reader 100 of Fig. 1.

Throughout the drawings relays and other apparatus elements have been given functional designations followed by a digital designation the first digit or digits of which are indicative of the figure of the drawing. Cables of conductors interconnecting apparatus of figures of the drawings have been designated by a numeral comprising the numbers of the two interconnected figures, for example, the cable interconnecting the bracketed conductors of Fig. 4 with the bracketed conductors of Fig. 3 has been designated cable 43.

Ticket Scanning or Reading

The invention having now been briefly described the manner in which the data in terms of message units for all calls made by any subscriber for a billing period is accumulated and printed on a bill or billing ticket, will now be described in more detail.

It will be assumed that all of the tickets for toll calls made by the subscriber whose directory listing is AUdubon 3–9096 have been sorted out and that the stack of sorted tickets have been placed in the reader disclosed schematically by the box 100 in Fig. 1 together with a ticket on which the calling subscriber's directory listing, the prescribed special routing information and the number of message units for local calls made during the billing period have been recorded either manually or in any other suitable manner. With the tickets thus placed in the reader the start key 101 is operated and, if it be assumed that the subscriber's account is to be debited with message units for all calls made, the key 102 is operated to its upper or ADD position. The operation of key 102 establishes a circuit from ground over its upper contact, conductor 103 and through the winding of the ADD relay 2200 of Fig. 22 to battery and ground, and this relay operates to perform functions which will be hereinafter described. The feature of adding or subtracting could be handled automatically by relays responsive to the sensing of the tickets of the stack, which would in turn cause the operation of the ADD relay 2200 if the ticket indicated a debit or the operation of the SUB relay 2220 if the ticket indicated a credit.

The operation of start key 101 establishes an obvious circuit for the start (ST) relay 120 which at its inner left contacts connects ground to off-normal ground bus-bar 109 and over the back contact of advance AV relay 123 to the ground bus-bar 105; connects ground over its inner left contacts and over the back contact of recycling (RC) relay 122 to start conductor 106 and establishes a locking circuit for itself over its right contacts and the inner right contacts of RL relay 121 to ground. With ground applied to start conductor 106 relays 200 and 201 operate preparatory to registering the first digit read by the reader from the uppermost ticket of the stack, which digit will be the A code digit of the calling subscriber's directory number.

Relay 200 upon operating locks itself and relay 201 to the ground bus-bar 105 and over its inner left contacts establishes a circuit from ground on bus-bar 105, serially through the windings of transfer relay 220 and progress relay 221 to battery which, in turn, operate. Similarly, relay 220 locks itself and relay 221 to ground bus-bar 105 and establishes a circuit over conductor 202 serially through the windings of transfer relay 300 and progress relay 301 to battery whereupon these relays operate and relay 300 locks itself and relay 301 to the grounded bus-bar 105. In the same manner the remaining transfer relays 320, 340, 400, 420, 440, 460, 500, 520, 600, 620, 700 and 720 and the remaining progress relays 321, 341, 401, 421, 441, 461, 501, 521, 601, 621, 701 and 721 are operated and locked to the ground bus-bar 105.

The operation of progress relay 721 is now effective to establish a circuit from battery over its No. 3 right contacts and conductor 707 through the winding of recycle relay 122 to battery whereupon such relay operates, locking over its inner right contacts to ground at the outer right back contact of relay 123, opening the initial start circuit for relays 200 and 201 and preparing a temporary locking circuit for the relays of the calling code A register. At its No. 4 right contacts relay 721 also connects battery to conductor 708 and thence over the outer left contacts of start relay 120 and the outer back contact of release relay 121 to the reader 100 whereby the reader is started into operation.

The receiving circuits are now ready to receive impulses from the reader. The signals transmitted are combinations of two-out-of-six in accordance with the following table:

| Character | Relays Operated |
|---|---|
| 0 | A, B |
| 1 | A, D |
| 2 | B, D |
| 3 | D, E |
| 4 | B, E |
| 5 | C, D |
| 6 | A, C |
| 7 | B, C |
| 8 | C, E |
| 9 | A, E |
| End of Record | C, F |

It has been assumed that the directory listing of the calling subscriber whose account is being computed is AUdubon 3-9096. The first or A code digit of this directory listing will therefore have a numerical equivalent of the digit 2. It will also be assumed that the toll ticket was for a call to a subscriber whose directory listing was MArket 7-1345 and that the ticket has the recorded digits 283—9096—627—1345—52—16 where the digits 283—9096 represent the calling subscriber's directory listing, the digits 627—1345 represent the called subscriber's directory listing, the digits 52 represent the calling line class-of-service digit 5 and the rate-of-charge digit 2, and the digits 16 represent sixteen minutes of elapsed time of conversation.

With the progress relay 201 now operated ground will be applied by the reader to conductors 113 and 115 indicative of the code letter A, or its numerical equivalent digit 2, whereupon circuits are completed over the right Nos. 2 and 4 front contacts of relay 201 and through the windings of the B and D relays 203 and 205 of the Calling Code A register to battery.

The reader in response to reading the first data recorded on the ticket also applies ground to conductor 107 thereby establishing a circuit over the No. 1 left front contact of relay 201 and through the winding of relay 201 to battery. Relay 201 is thus held operated as long as ground is maintained on conductor 107 but the application of this ground shunts down relay 200 which thereupon releases. With relay 201 operated and relay 200 released a temporary locking circuit is established for the operated register relays 203 and 205 extending over their inner lower contacts, the No. 1 left front contact of relay 201, the right back contact of relay 200 and conductor 108 to ground over the left contacts of relay 122. When the reader completes the reading of the first or A code digit recorded and advances to read the second or B code digit, ground is removed from conductor 107 and relay 201 releases since at this time start conductor 106 has been opened through the operation of relay 122. A new locking circuit for register relays 203 and 205 now extends over the No. 2 left normal contacts of relay 201 to ground on bus-bar 105.

With progress relay 201 now released the computer is prepared to receive the next signals from the reader which will be ground impulses over conductors 114 and 116, the Nos. 3 and 5 right back contacts of relay 201, the Nos. 3 and 5 right front contacts of progress relay 221 and through the windings of the C and D relays 224 and 226 of the Calling Code B register to battery. As before the reader applies ground to conductor 107 which is now extended over the No. 1 left back contact of progress relay 201 and over the No. 1 left front contact of progress relay 221 to the winding of relay 221 whereupon transfer relay 220 is shunted down and relay 221 is held operated until the reader removes the ground from conductor 107. The operated register relays 224 and 226 now lock over their inner lower contacts, the No. 2 left front contacts of relay 221 and the right back contact of relay 220 to ground on conductor 108. When the reader completes the reading of the second or B code digit it removes ground from conductor 107 and relay 221 releases, since its initial operating circuit has been opened at the left contacts of the released transfer relay 200. A new locking circuit for register relays 224 and 226 now extends over the No. 2 left normal contacts of progress relay 221 to ground on bus-bar 105. With progress relay 221 now released operating circuits are prepared at its right back contacts for the relays of the Calling Code C register.

In a similar manner succeeding signal impulses transmitted from the reader as it reads successive digits of the entry on the topmost ticket are registered in succeeding registers, the associated pairs of progress and transfer relays releasing successively in the manner previously described. Thus in response to the transmission of signals representative of the recorded toll data, the B and D relays 203 and 205 of the Calling Code A register, the C and E relays 224 and 226 of the Caling Code B register, the D and E relays 305 and 306 of the Calling Code C register, the A and E relays 322 and 326 of the Calling Thousands register, the A and B relays 342 and 343 of the Calling Hundreds register, the A and E relays 402 and 406 of the Calling Tens register, the A and C relays 422 and 424 of the Calling Units register, the A and C relays 442 and 444 of the Calling Code A register, the B and D relays 463 and 465 of the Called Code B register, the B and C relays 503 and 504 of the Called Code C register, the C and D relays 524 and 525 of the Calling Class register, the B and D relays 603 and 605 of the Rate register, the A and D relays 622 and 625 of the Elapsed Time Tens register, and the A and C relays 702 and 704 of the Elapsed Time Units register are operated and locked.

Figure 7:
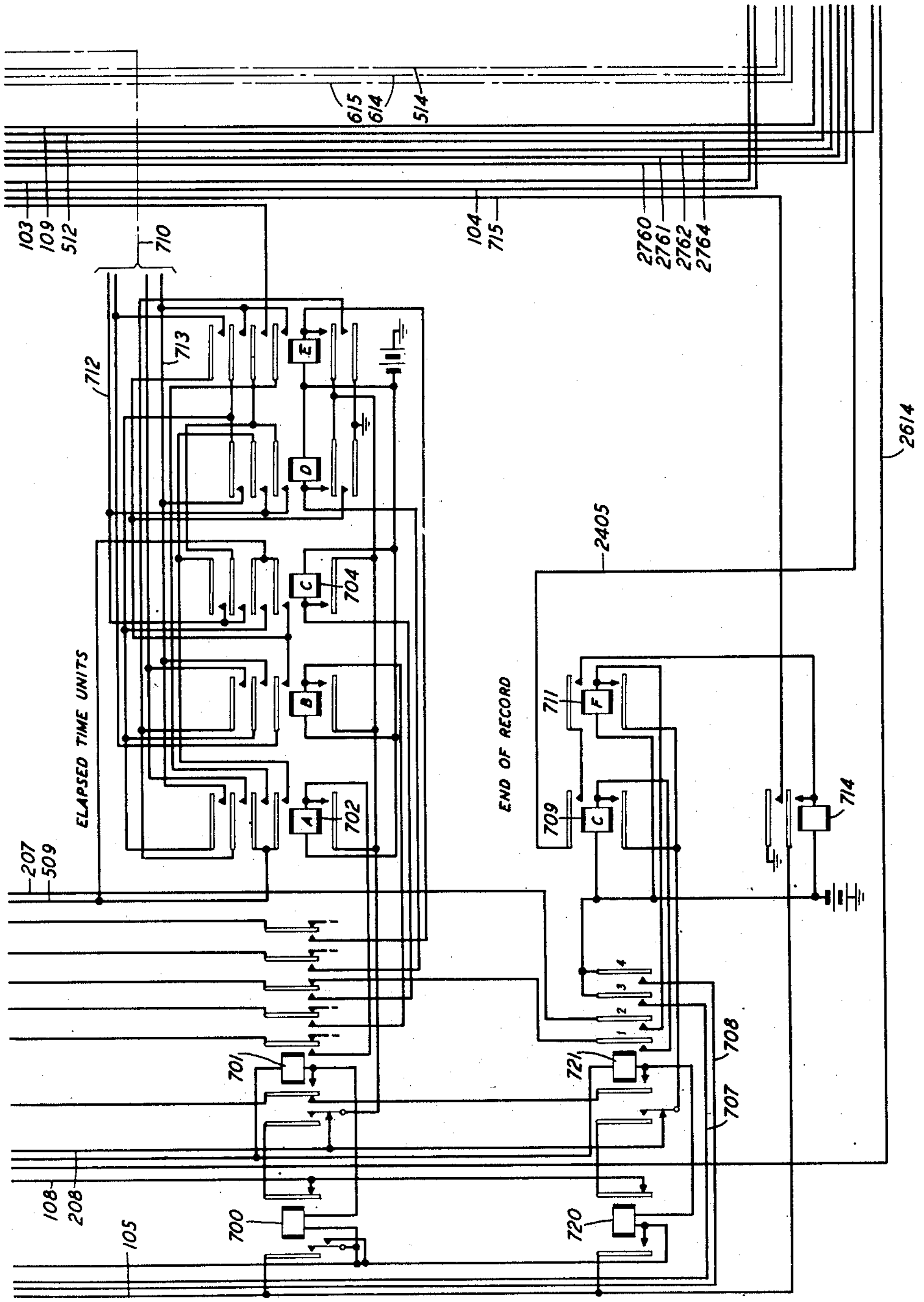
Fig. 7 shows the register for registering the units digit of the elapsed time of conversation and the end of record control relays.

Following the registration of the units digit of the elapsed time progress relay 701 and transfer relay 700 release, relay 701 upon releasing extending the control conductor 114 over its right No. 3 back contact and the right No. 1 front contact of progress relay 721 to the winding of the C relay 709 of the End of Record register of Fig. 7. With progress relay 201 previously released, the control conductor 117 is extended over its right No. 6 back contact, conductor 207 and over the right No. 2 contacts of progress relay 721 to the winding of the F register relay 711. When thereafter the reader sends an end-of-record signal by connecting ground to conductors 114 and 117, register relays 709 and 711 become operated and locked, first over a circuit extending over their lower contacts and the outer left front contact of progress relay 721 and the right back contact of transfer relay 720 to ground on conductor 108 following the release of relay 720, and thereafter over the outer left normal contacts of relay 721 to ground on conductor 208 following the release of relay 721 at the end of the signal. The operation of register relays 709 and 711 is effective to prepare an advance circuit to advance the reader to read the next ticket in the stack in a manner to be later described.

Translation of Calling and Called Office Codes

It will be recalled that relays 203 and 205 of the Calling Code A register, relays 224 and 226 of the Calling Code B register and relays 305 and 306 of the Calling Code C register have been operated and locked. These relays are jointly effective in operating a calling zone relay through the operation of the translator shown in Fig. 8. The translator comprises eight multicontact relays 802 to 809, inclusive, of which relays 802, 804, 807 and 809 are disclosed, operated in accordance with the first digit of the calling office code and ten pairs of relays 810 and 820 . . . 819 and 829 operated in accordance with the second digit of the calling office code.

With relays 203 and 205 of the Calling Code A register operated, as assumed, a circuit is established from ground over the upper contacts of relay 203, the upper contacts of relay 205 and conductor 209 through the winding of multicontact relay 802 to battery whereupon relay 802 operates. With relays 224 and 226 of the Calling Code B register operated, as assumed, a circuit is established from ground over the inner upper contacts of relay 224, the lower contacts of relay 226, conductor 210 and thence through the windings of multicontact relays 818 and 828 to battery whereupon these relays operate. With relays 305 and 306 of the Calling Code C register operated, as assumed, a circuit is established from ground over the inner upper contacts of relay 305, the inner upper contacts of relay 306, conductor 307, over the next to outer contacts of relay 828, similar to relay 820, conductor 830 of cable 831, contact set 832 of operated relay 802, cross-connected terminals of rack 833, and to battery through the winding of calling zone relay 834.

In a similar manner with relays 442 and 444 of the Called Code A register operated, as assumed, a circuit is established from ground over the lower contacts of relay 442, over the upper contacts of relay 444, conductor 447 of cable 43 and the winding of multicontact relay 906 to battery. With relays 463 and 465 of the Called Code B register operated, as assumed, a circuit is established from ground over the inner upper contacts of relay 463, over the middle upper contacts of relay 465, conductor 467 of cable 34 and in parallel through the windings of the pair of relays 912 and 922 to battery. With relays 503 and 504 of the Called Code C register operated, as assumed, a circuit is established from ground over the inner upper contacts of relay 503, the middle upper contacts of relay 504, conductor 507 of cable 53, the middle contacts of relay 912, corresponding to relay 910, conductor 930 of cable 931, contact set 932 of the operated multicontact relay 906, terminals of cross-connecting rack 933 cross-connected to a terminal connected to the called zone relay 934, and thence through the winding of such relay to battery.

The calling zone relay 834 having now operated to register the zone of the toll area in which the calling line is located, and the called zone relay 934 having operated to register the zone of the toll area in which the called line is located, a charge route relay 836 is now operated under the joint control of relays 834 and 934 in a circuit extending from ground, over contacts of relay 834, cross-connected terminals of rack 835, through the winding of charge route relay 836, cross-connected terminals of rack 837, conductor 838, cross-connected terminals of rack 937, and over contacts of relay 934 to battery. Relay 836 thus operates to establish the route charge for the toll call.

Figure 6:
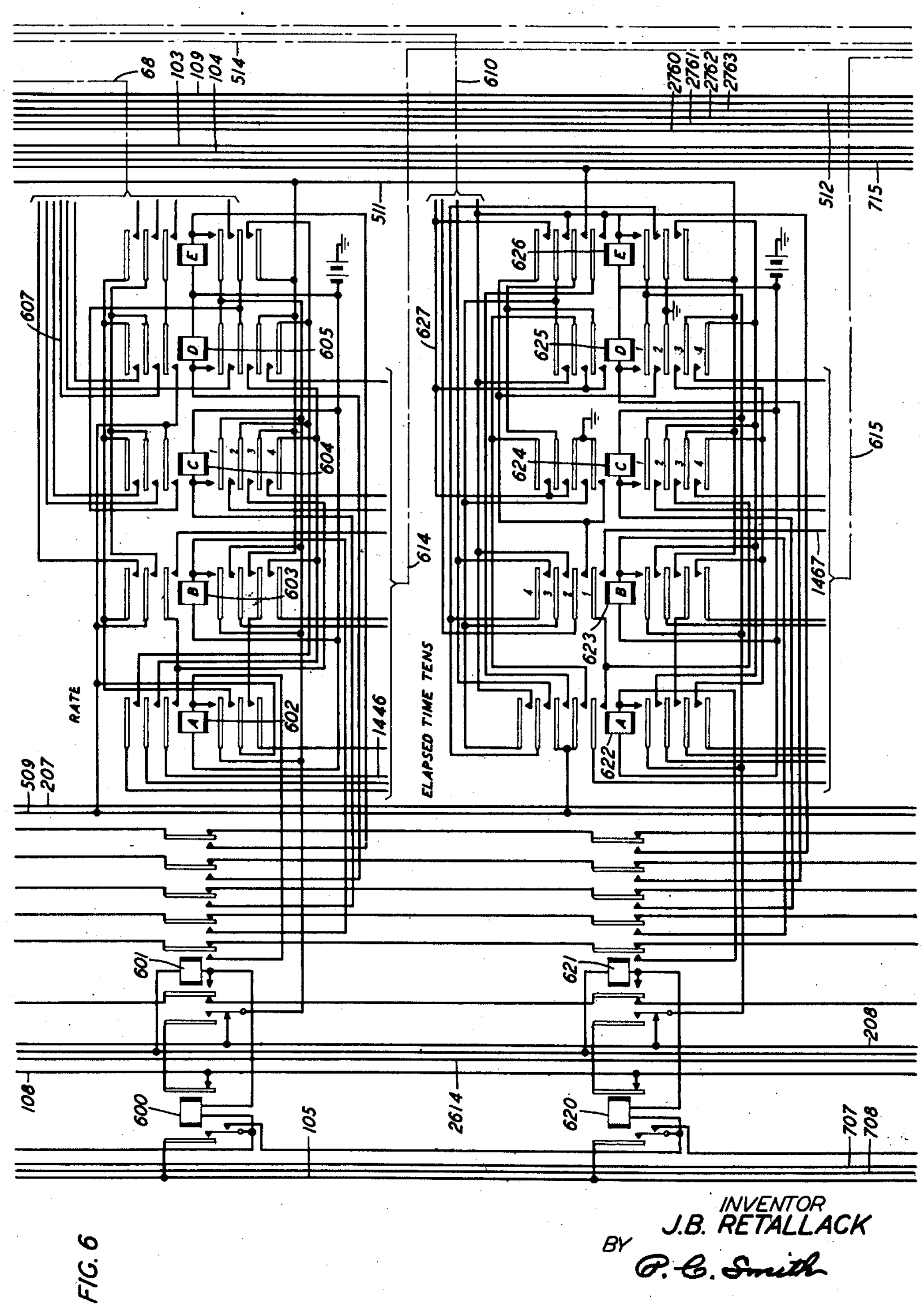
Fig. 6 shows the registers for registering either the charge rate and tens digit of the elapsed time of conversation or, in response to the operation of the route transfer relay, the tens and units digits of the number of local-call message units.

If the charge rate has been registered in the Rate register of Fig. 6 by the operation of relays 603 and 605, then it is not necessary to translate the calling and called office codes as previously described to determine which charge route relay will be operated, since this translation has already been performed in the originating office. In the case assumed a circuit for the charge route relay, for example, relay 836 would be established from ground over the right back contact of route transfer relay 508, conductor 509, the upper middle contacts of register relay 603, the upper middle contacts of register relay 605, conductor 607 of cable 68, cross-connected terminals of rack 833, through the winding of relay 836 and cross-connections on rack 837 to battery.

It is possible that in some areas a condition may be encountered where certain classes of subscribers receive a different rate treatment than others for calls having the same routing. In such a case a class-of-service relay such as 839 is provided which, when operated, modifies the basic rate information supplied to the computing circuits. A group of these class relays may be provided any one of which may be selectively operated in accordance with the setting of the Calling Class register of Fig. 5. It has previously been assumed that relays 524 and 525 of this register have been operated thereby establishing a circuit for class relay 839 which may be traced from ground on conductor 509 over the inner upper contacts of register relay 524, over the next to inner lower contacts of register relay 525, conductor 527 of cable 58, over cross-connected terminals on rack 833 and through the winding of class relay 839 to battery.

The operated charge route relays such as 836 determine the basic rates at which calls shall be charged. Representative rates are disclosed in the following table:

| Charge Route Number | Minutes Initial Period | Minutes Overtime Period | Initial Charge in Message Units | Overtime Charge in Message Units |
|---|---|---|---|---|
| 1 | 5 | 5 | 1 | 1 or None |
| 2 | 5 | 3 | 2 | 1 |
| 3 | 5 | 2 | 3 | 1 |
| 4 | 5 | 2 | 4 | 1 |
| 5 | 4 | 2 | 5 | 1 |
| 6 | 3 | 1 | 6 | 2 |
| 7 | 3 | 1 | 7 | 2 |

Determination of the Overtime Minutes of Conversation

The overtime minutes of conversation are determined from the total elapsed time of conversation by subtracting from the minutes of total elapsed time of overtime conversation the minutes for the initial period prescribed for the charge route, that is, as determined by the operated charge route relay. From the preceding table it will be noted that the initial period may be either five, four or three minutes. This subtraction is accomplished by the relays disclosed in Fig. 10. It will be assumed that with the route charge relay 836 and the class relay 839 both operated, the S4 relay 1064 is operated to subtract four minutes from the total elapsed time. The circuit of relay 1064 may be traced from ground, over the outer left contacts of route charge relay 836, over the middle left front contact of relay 839, conductor 840, cross-connection rack 1003, and through the winding of relay 1064 to battery.

Figure 10:
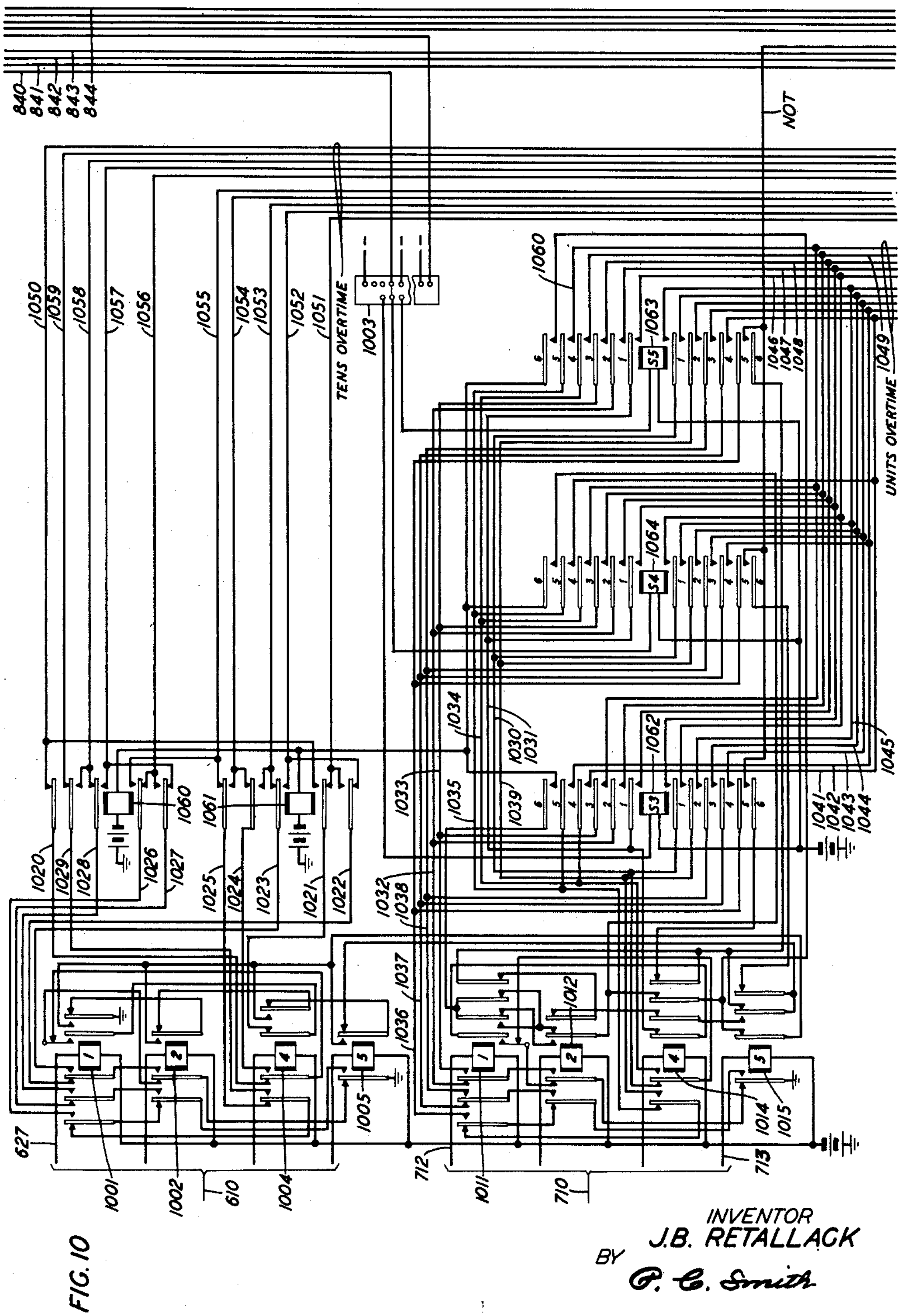
Fig. 10 shows a portion of the subtracting circuits of the computer whereby any one of a plurality of prescribed initial periods of conversation may be subtracted from the total period of conversation.

It will be recalled that relays 622 and 625 of the Elapsed Time Tens register and relays 702 and 704 of the Elapsed Time Units register were operated and locked and therefore with relays 622 and 625 operated to register the assumed tens digit 1 of the elapsed time, a circuit is established from ground on conductor 509, over the next to inner upper contacts of relay 622, over the upper contacts of relay 624, conductor 627 of cable 610 and through the winding of relay 1001 of the tens digit portion of the elapsed time register of the subtracting circuit of Fig. 10 to battery. Also with relays 702 and 704 operated to register the assumed units digit 6 of the elapsed time, a circuit is established from ground on conductor 509, over the inner upper contacts of relay 702, over the upper contacts of relay 704, conductor 712 of cable 710 and through the winding of relay 1011 of the units digit portion of the elapsed time register of the subtracting circuit to battery, and a second circuit is established from ground on conductor 509 over the next to inner upper contacts of relay 704, over the upper contacts of relay 702, conductor 713 of cable 710 and through the winding of relay 1015 to battery. Relays 1011 and 1015 thus operate to register the units digit 6 of the elapsed time.

With the tens digit register relay 1001 operated, ground is connected to conductor 1021 over the left back contact of relay 1005, over the inner left back contact of relay 1002, over the inner right alternate contacts of relay 1001, over the inner right back contact of relay 1004 and to conductor 1021 indicative of a tens digit 1. With units relays 1011 and 1015 both operated ground is connected over the left front contact of relay 1015, over the outer left back contact of relay 1012, the outer left front contact of relay 1011 and to conductor 1036 indicative of a units digit 6. Ground is applied to other contacts of the group 1020 to 1029, inclusive, indicative of the tens digit of the elapsed time of a call and to other contacts of the group 1030 to 1039, inclusive, indicative of the units digit of the elapsed time in response to the selective operation of relays of the Elapsed Time Tens and Elapsed Time Units registers of the receiving circuit and the consequent selective operation of the tens and units register relays of the subtracting circuit in accordance with the following table:

| Tens Digit | Operated Relays Elapsed Time Tens Register | Operated Relays of Tens Register of Subtracting Circuit | Grounded Tens Conductor |
|---|---|---|---|
| 0 | 622, 623 | None | 1020 |
| 1 | 622, 625 | 1001 | 1021 |
| 2 | 623, 625 | 1002 | 1022 |
| 3 | 625, 626 | 1001, 1002 | 1023 |
| 4 | 623, 626 | 1004 | 1024 |
| 5 | 624, 625 | 1005 | 1025 |
| 6 | 622, 624 | 1001, 1005 | 1026 |
| 7 | 623, 624 | 1002, 1005 | 1027 |
| 8 | 623, 626 | 1001, 1002, 1005 | 1028 |
| 9 | 622, 626 | 1004, 1005 | 1029 |

| Units Digit | Operated Relays Elapsed Time Units Register | Operated Relays of Units Register of Subtracting Circuit | Grounded Units Conductor |
|---|---|---|---|
| 0 | 702, 703 | None | 1030 |
| 1 | 702, 705 | 1011 | 1031 |
| 2 | 703, 705 | 1012 | 1032 |
| 3 | 705, 706 | 1011, 1012 | 1033 |
| 4 | 703, 706 | 1014 | 1034 |
| 5 | 704, 705 | 1015 | 1035 |
| 6 | 702, 704 | 1011, 1015 | 1036 |
| 7 | 703, 704 | 1012, 1015 | 1037 |
| 8 | 704, 706 | 1011, 1012, 1015 | 1038 |
| 9 | 702, 706 | 1014, 1015 | 1039 |

It will be recalled that the S4 relay 1064 has been operated in accordance with the assumed rate structure to subtract an initial four-minute period of conversation from the total elapsed time assumed to be sixteen minutes. With relay 1064 operated, units conductor 1036 to which ground has been applied through the operation of units register relays 1011 and 1015, is connected over the lower No. 5 contacts of relay 1064 to outgoing units conductor 1042 representative of the units digit 2. Relays 1060 and 1061 are not operated unless the units digit of the initial period of conversation is equal to or less than the units digit of the total elapsed time and therefore since the units digit of the initial period assumed to be 4, is less than the units digit 6 of the total elapsed time, relays 1060 and 1061 are not operated and all of the tens digit conductors 1020 to 1029, inclusive, are therefore connected over back contacts of relays 1060 and 1061 to correspondingly numbered tens digit conductors 1050 to 1059, inclusive. The grounded conductor 1021 is therefore extended over the inner lower back contact of relay 1061 to outgoing tens conductor 1051. Ground thus applied to conductors 1042 and 1051 is indicative of an overtime period of conversation of twelve minutes or sixteen minutes total elapsed time less four minutes of initial period of conversation.

Had the S3 relay 1062 been operated instead of relay 1064, grounded units conductor 1036 would have been extended over the lower No. 5 contacts of relay 1062 to outgoing units conductor 1043 and grounded tens conductor 1021 would have been extended over the inner lower back contact of relay 1061 to outgoing tens conductor 1051 as before. Ground thus connected to conductors 1043 and 1051 would be indicative of an overtime period of conversation of thirteen minutes. Had the S5 relay 1063 been operated instead of relay 1064, grounded units conductor 1036 would have been extended over the lower No. 5 contacts of relay 1063 to outgoing units conductor 1041 and grounded tens conductor 1021 would have been extended over the inner lower back contact of relay 1061 to outgoing tens conductor 1051 as before. Ground thus applied to conductors 1041 and 1051 would be indicative of an overtime period of conversation of eleven minutes.

On calls on which the elapsed time is equal to or less than the initial period of conversation a signal is provided to a "no overtime circuit" which nullifies any signal which may exist in the intermediate circuits. If the initial period is three minutes and the S3 relay 1062 is operated on a call for which the elapsed time does not require the operation of either the No. 4 or No. 5 units relays 1014 and 1015 and which does not require the operation of any of the tens relays 1001, 1002, 1004 or 1005, that is, on a call having an elapsed time less than four minutes, ground is applied over the outer right back contacts of relays 1001, 1002, 1004 and 1005 over the middle right back contact of No. 5 register relay 1015, over the right back contact of register relay 1014, and over the lower No. 6 contacts of the S3 relay 1062 to conductor NOT. The same condition exists in the case the S4 relay 1064 is operated if the No. 5 units relay is not operated and none of the tens register relays is operated. In this case the ground applied from the right back contact of register relay 1005 is applied over the outer right back contact of units register relay 1015 and the lower No. 6 contacts of the S4 relay 1064 to conductor NOT. If the S5 relay 1063 is operated and the units digit registration is less than 6 as indicated by the non-operated condition of all of the tens register relays and the No. 5 units register relay 1015 is operated but none of the Nos. 1, 2 or 4 register relays 1011, 1012 and 1014 are operated, ground is connected to conductor NOT from the right back contact of relay 1005, over the right front contact of relay 1015 to next to the inner right back contact of relay 1014, outer right back contact of relay 1012, outer right back contact of relay 1011, and over the lower No. 6 contacts of the S5 relay 1063 to conductor NOT. These preceding conditions are thus encountered when the elapsed time has not gone into the overtime period and represents a high percentage of the cases to be handled.

In the preceding discussion it was assumed that the units digit of the elapsed time was greater in every case than the initial period. The case will now be discussed in which the initial period, for example, three minutes, is greater than the units digit of the elapsed time, for example twelve minutes. Under this assumption the tens register relay 1001 and the units register relay 1012 will be operated. When therefore relay 1062 is operated grounded conductor 1032 becomes connected over the upper No. 2 contacts of relay 1062 to outgoing units conductor 1049 and a circuit is established for relays 1060 and 1061 from ground over the outer right front contact of relay 1001, inner right back contact of relay 1015, the next to outer right back contact of relay 1014, the inner right front contact of relay 1012, the next to inner right back contact of relay 1011, over the upper No. 6 contacts of the S3 relay 1062 and through the windings of relays 1060 and 1061 in parallel to battery. With relay 1061 operated, ground connected to conductor 1021 by the operation of register relay 1001 is extended over the inner lower front contact of relay 1061 to the outgoing tens conductor 1050 whereby, with conductors 1050 and 1049 both grounded, an overtime period of nine minutes is indicated.

As a further example it will be assumed that the elapsed time is twenty-three minutes and that therefore relays 1002, 1011 and 1012 are operated, and that the initial period of conversation is five minutes and that therefore the S5 relay 1063 is operated. With relays 1011, 1012 and 1063 operated, ground is connected over the left back contact of relay 1015, over the inner left front contact of relay 1012, the inner left front contact of relay 1011, conductor 1033 and over the upper No. 3 contacts of relay 1063 to outgoing units conductor 1048. A circuit is also established for relays 1060 and 1061 from ground over the outer right back contact of tens register relay 1001, over the right front contact of relay 1002, the inner right back contact of units register relay 1015, the upper No. 6 contacts of the S5 relay 1063 and through the windings of relay 1060 and 1061 in parallel to battery. With relay 1061 operated ground is extended over the left back contact of relay 1005, the inner left front contact of relay 1002, the inner left back contact of relay 1001, conductor 1022, the lower front contact of relay 1061 and to the outgoing tens conductor 1051 whereby, with conductors 1051 and 1048 both grounded, an overtime period of eighteen minutes is indicated.

Thus when the elapsed time goes into the overtime period with the S3 relay 1062 operated a 3 is substracted from the digital value of each one of the conductors 1030 to 1039, inclusive, extending from the units register and a 1 in the tens place is subtracted from the digital value of each one of the conductors 1020 to 1029, inclusive, extending from the tens register if the units registration is less than 3 and the tens registration is anything but zero. With the S4 relay 1064 operated a 4 is subtracted from the digital value of each one of the conductors 1030 to 1039, inclusive, and in the tens place a 1 is subtracted from the digital value of each one of the conductors 1020 to 1029, inclusive, extending from the tens register if the units registration is less than 4 and the tens registration is anything but zero, and with the S5 relay 1063 operated a 5 is subtracted from the digital values of each one of the conductors 1030 to 1039, inclusive, extending from the units register and a 1 in the tens place is subtracted from the digital values of each one of the conductors 1020 to 1029, inclusive, extending from the tens register if the units registration is less than 5 and the tens registration is anything but zero.

Determination of the Number of Overtime Periods

Figure 11:
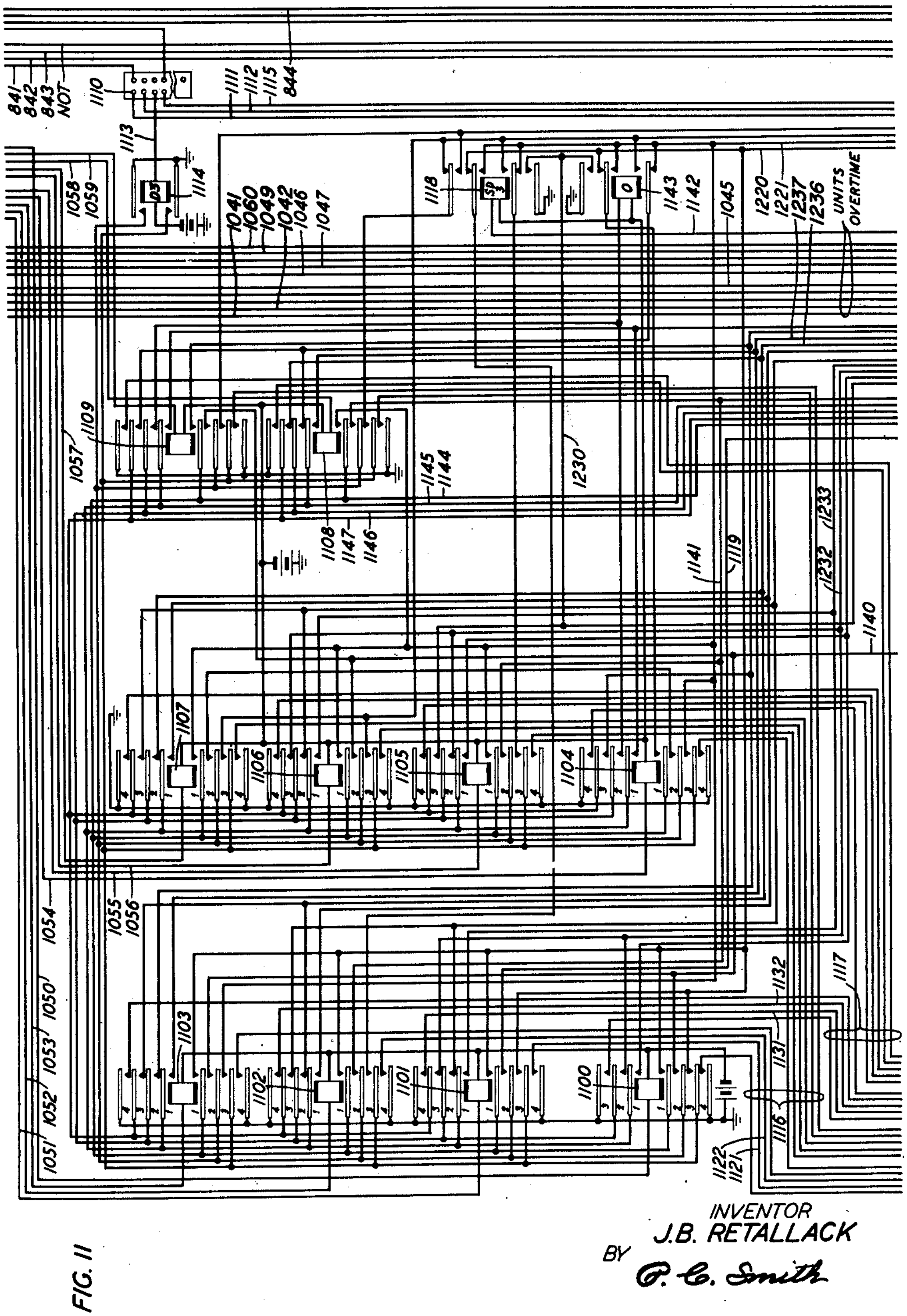
Fig. 11 shows in the left portion thereof the remainder of the subtracting circuits and in the right portion thereof the circuits for dividing the output of the subtracting circuits by three to determine the number of three-minute overtime periods.

The connection of ground to one of the conductors 1050 to 1059, inclusive, of the Tens Overtime group of conductors results in the operation of one of the ten relays 1100 to 1109, inclusive, of Fig. 11 to register the tens digit of the overtime period. It has been assumed that the tens digit of the overtime period is one and that therefore the connection of ground as previously described to conductor 1051 results in the operation of the tens overtime register relay 1101.

Figure 12:
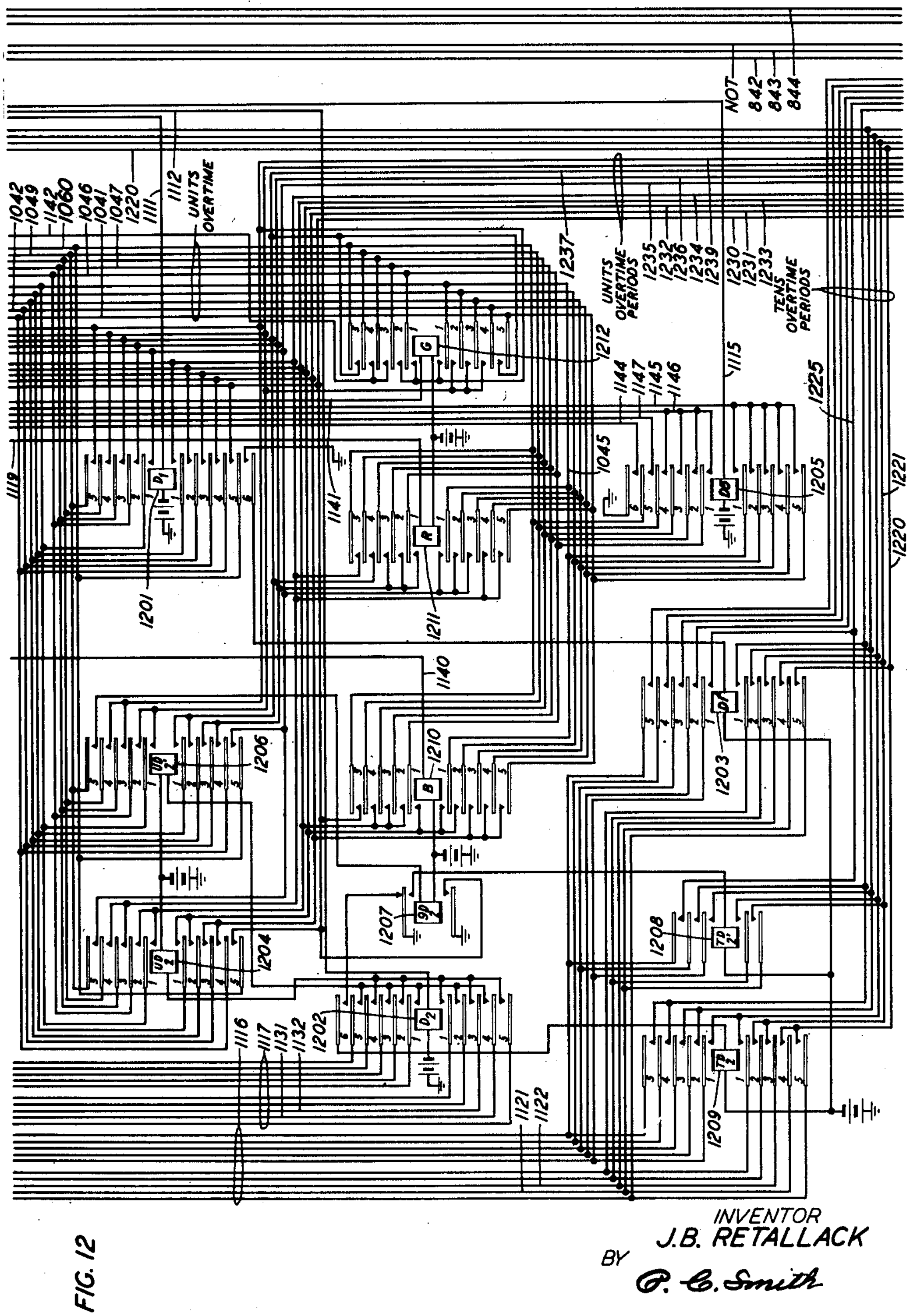
Fig. 12 shows the circuits of the computer for dividing the output of the subtracting circuits by one, two or five to determine the number of one-, two-, or five-minute overtime periods.

For controlling the dividing circuit of Figs. 11 and 12 to determine the number of overtime periods in the total overtime, a circuit is established from ground over the inner left contacts of the operated route charge relay 836 over the inner left front contact of class relay 839, assumed to be operated, over conductor 841 to a terminal on cross-connecting rack 1110, which terminal may be connected to a terminal connected over conductor 1111 to the winding of the D1 relay 1201 of Fig. 12 if each prescribed overtime period is to be one minute; to a terminal connected over conductor 1112 to the winding of the D2 relay 1202 of Fig. 12 if each overtime period is to be two minutes; to a terminal connected over conductor 1113 to the winding of the D3 relay 1114 of Fig. 11 if each overtime period is to be three minutes; or to a terminal connected over conductor 1115 to the winding of the D5 relay 1205 of Fig. 12 if each overtime period is to be five minutes.

If the D1 relay 1201 is operated indicative of the fact that the overtime period of conversation is to be charged on the basis of one-minute intervals, an obvious circuit is established over its lower No. 6 contacts through the winding of the D1′ relay 1203. With any one of relays 1100 to 1109, inclusive, operated to register the tens digit of the entire overtime period, a circuit will be established from ground over the lower No. 4 contacts of the operated register relay, over a conductor of group 1116, and over contacts of relay 1203 to a conductor of the Tens Overtime Periods group, extending to the multiplying circuit of Fig. 13 indicative of the same tens digit value as the tens digit value of the operated register relay. For example, with register relay 1101 operated to register the tens digit one of the overtime period, ground is applied over the lower No. 4 contacts of relay 1101, over conductor 1121 of the group 1116, and over the No. 4 contacts of the D1′ relay 1203 to conductor 1221 of the Tens Overtime Periods group indicative of a tens digit one for the number of overtime periods. With relay 1201 operated, conductors of the Units Overtime group are extended to conductors of the Units Overtime Periods group extending to the multiplying circuit without change in the units digit value. For example, conductor 1042 to which ground was applied indicative of the units digit two for the duration of overtime, is extended over the lower No. 3 contacts of relay 1201 to conductor 1232 of the Units Overtime Periods group representative of the units digit two. Thus the twelve-minute overtime period is divided into twelve one-minute periods.

Figure 13:
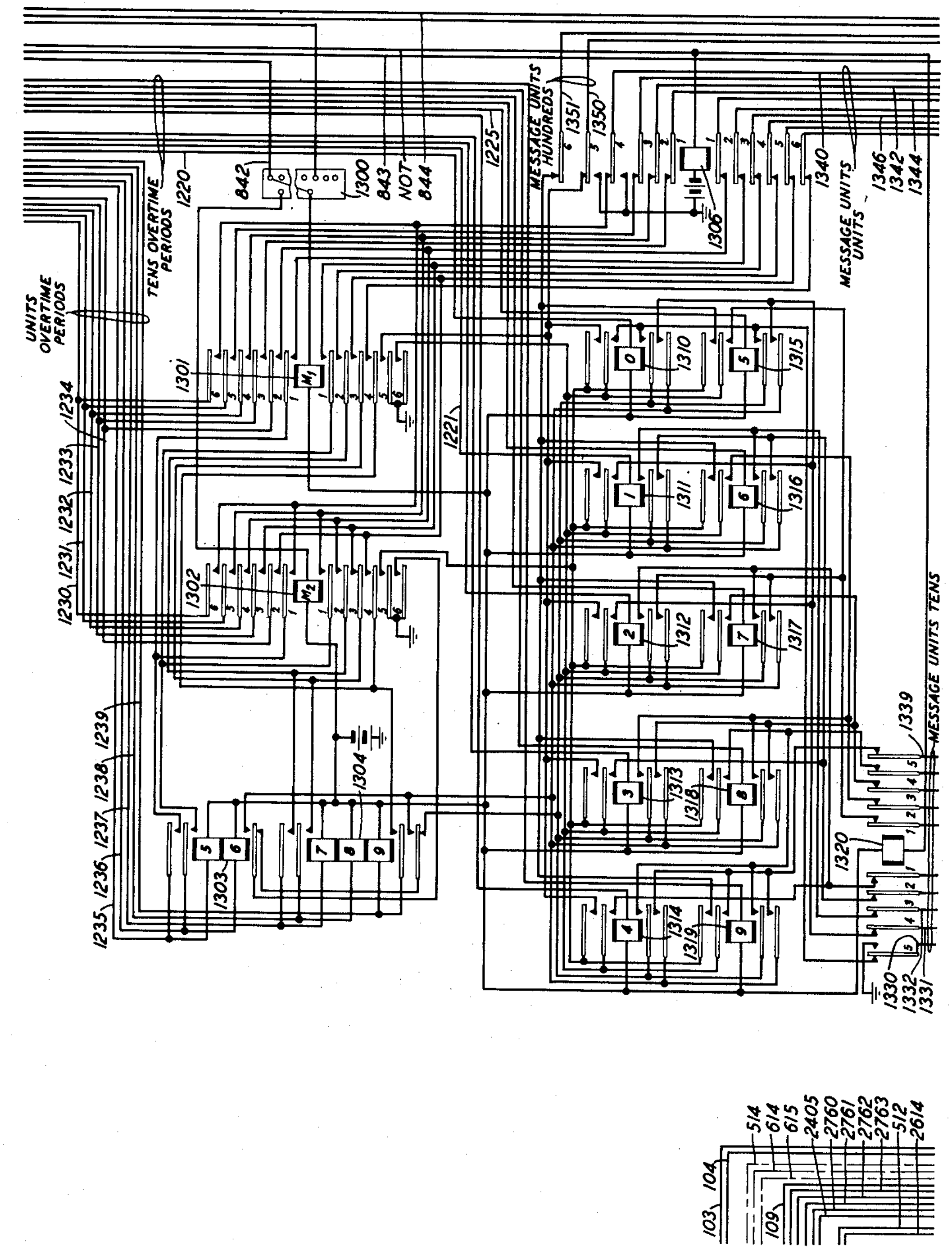
Fig. 13 shows the circuits of the computer for multiplying the outputs of the dividing circuits of Figs. 11 and 12 by one or two to determine the charge in message units for the overtime periods of conversation.

If the overtime period of conversation is to be charged on the basis of two-minute intervals relay 1202 is operated. It should be understood that in dividing by any number other than one the fractional remainder in all cases increases the quotient to the next higher integer. This is because the entrance into the beginning of an overtime period is treated as though the conversation has proceeded to the end of the overtime interval. Thus the division of six by two is three and also the division of five by two will be three. Thus in dividing by two any odd number just preceding an even number will result in the same answer as the succeeding even number would give by ordinary arithmetical processes. Thus it will be noted that the units input to this circuit from the Units Overtime group of conductors is connectable over the contacts of the UD2 and UD2′ relays 1204 and 1206 to the Units Overtime Periods group of conductors, the values of the units digits, however, being dependent upon whether the tens digits are odd or even. However, when the tens digit is even one and two units become one, three and four units become two, and so forth. The shift in the tens place is also in groups of two, and zero and one become zero, two and three become one, and so forth, except in those cases when the units digit is a nine in which event the one of tens becomes one, the three of tens becomes two, five of tens becomes three, and so forth. This is accomplished by the provision of the 9D2 relay 1207 which operates when the units digit is nine and in operating causes the operation of the tens TD2′ relay 1208 which accomplishes the above result. In this manner the Tens Overtime Periods and the Units Overtime Periods conductors extending to the multiplying circuit of Fig. 13 are grounded in a way which indicates the division of the overtime period by two and thus the number of overtime intervals involved in the call.

It will be recalled that from the previous computation an overtime period of twelve minutes was indicated and that the D2 relay 1202 of the divide-by-two circuit was operated. Since the tens digit of the overtime period is one and relay 1101 is therefore operated, a circuit is established from ground over the upper No. 4 contacts of relay 1101, over conductor 1131 of group 1117, over the lower No. 4 contacts of relay 1202 and to battery through the winding of the UD2′ relay 1206. Relay 1206 thereupon operates and connects conductor 1042 to which ground was connected in the subtracting circuit, indicating the units digit of the overtime period as two, over the lower No. 3 contacts of relay 1206 to conductor 1236 of the Units Overtime Periods group extending to the multiplying circuit indicative of a units digit six. Since the units digit of the overtime period is two and not nine no circuit is established by the operation of the UD2′ relay 1206 for the 9D2 relay 1207 and therefore the operation of the D2 relay 1202 results in the establishment of a circuit from ground over the upper back contact of relay 1207, over the upper No. 6 contacts of relay 1202 and through the winding of the TD2 relay 1209 to battery. Relay 1209 upon operating now connects conductor 1121 of group 1116 to which ground was connected by the operation of relay 1101 of the subtracting circuit of Fig. 11, over the lower No. 4 contacts of relay 1209, to conductor 1220 of the Tens Overtime Periods group extending to the multiplying circuit indicative of a tens digit zero. Thus the result of dividing the twelve-minute overtime period by two is to produce an indication of six two-minute periods of conversation.

It will now be assumed that the overtime period was eleven minutes and that therefore ground has been connected to the tens conductors 1121 and 1131 by the operation of relay 1101 and that ground has been connected to units conductor 1041 representative of the tens and units digits of the overtime period. The connection of ground to conductor 1131 with the D2 relay 1202 operated causes the operation of the UD2′ relay 1206 as before, which relay upon operating connects conductor 1041 over its lower No. 4 contacts to conductor 1236 of the Units Overtime Periods group extending to the multiplying circuit. Relay 1209 operates as before and connects grounded conductor 1121 over its lower No. 4 contacts to conductor 1220 of the Tens Overtime Periods group extending to the multiplying circuit. Thus the result of dividing the eleven-minute overtime period by two is to produce an indication of six two-minute periods of overtime since conversation overran the fifth two-minute period.

As a further illustration it will be assumed that the overtime period was of twenty-nine minutes duration and that therefore the tens register 1102 has been operated to register the tens digit two and that ground has been connected to conductor 1049 of the Units Overtime group extending from the subtracting circuit to indicate the units digit nine. With relay 1102 operated ground is connected over its lower No. 4 contacts to conductor 1122 of group 1116 and ground is also connected over its upper No. 4 contacts to conductor 1132 of group 1117. With the D2 relay 1202 operated conductor 1132 is extended over its lower No. 3 contacts and through the winding of the UD2 relay 1204 to battery. Thereupon relay 1204 operates and establishes a circuit from the grounded units conductor 1049, over the upper No. 5 contacts of relay 1204 to conductor 1235 of the Units Overtime Periods group extending to the multiplying circuit. Relay 1209 operates as before and connects grounded conductor 1122 over its lower No. 3 contacts to conductor 1221 of the Tens Overtime Periods group extending to the multiplying circuit. Thus the result of dividing the twenty-nine-minute overtime period by two is to produce an indication of fifteen two-minute periods of overtime since the conversation ran over the fourteenth two-minute period.

As a still further illustration it will be assumed that the overtime period was of nineteen minutes duration and that, therefore, the tens register relay 1101 has been operated to register the tens digit one and that ground has been connected to conductor 1049 of the Units Overtime group extending from the subtracting circuit to indicate the units digit nine. With relay 1101 operated ground is connected to conductors 1121 and 1131 as before described and with the D2 relay 1202 operated conductor 1131 is extended over its lower No. 4 contacts and through the winding of relay 1206 to battery whereupon relay 1206 operates and, with ground connected to conductor 1049, establishes a circuit from conductor 1049 over the upper No. 5 contacts of relay 1206 and through the winding of the 9D2 relay 1207 to battery. Relay 1207 thereupon operates and over its upper front contact establishes the circuit of the TD2′ relay 1208 which also operates. Relay 1208 upon operating establishes a circuit from grounded conductor 1121 over its lower contacts to conductor 1221 of the Tens Overtime Periods group extending to the multiplying circuit. Relay 1207 at its lower contacts also connects ground to conductor 1230 of the Units Overtime Periods group extending to the multiplying circuit. Thus the result of dividing the nineteen minutes overtime period by two is to produce an indication of ten two-minute periods of overtime since conversation ran over the ninth two-minute period.

In the process of dividing by three the switching of the necessary conductors in the tens digit place is accomplished by using contacts of the tens register relays 1100 to 1109, inclusive, of the subtracting circuit. The units digits are switched in groups of three by the B, R, and G relays 1210, 1211 and 1212. For example, Units Overtime conductors for units digits one, two and three will be connected to a conductor outgoing to the multiplying circuit for the units digit one, conductors for units digits four, five and six will be connected to the outgoing conductor for the units digit two and conductors for units digits seven, eight and nine will be connected to the outgoing conductor for the units digit three by the operation of relay 1210 only when the tens digit is zero, three, six or nine. When the tens digit is either one, four or seven a different shift occurs in the units digit through the operation of relay 1211 whereby conductors for units digits one and two will be connected to an outgoing conductor for the units digit four; conductors for the units digit three, four and five will be connected to an outgoing conductor for the units digit five; conductors for the units digit six, seven and eight will be connected to an outgoing conductor for the units digit six; the conductor for the units digit nine will be connected to an outgoing conductor for the units digit seven, and the conductor for units digit zero will be connected to an outgoing conductor for the units digit four. When the tens digit is either two, five or eight and relay 1212 is operated a third shift is made in the units digit whereupon the conductor for the units digit one will be connected to the outgoing conductor for units digit seven; the conductors for the units digits two, three and four will be connected to the outgoing conductor for the units digit eight; the conductors for the units digits five, six and seven will be connected to the outgoing conductor for the units digit nine; the conductors for the units digits eight and nine will result in the connection of ground to the outgoing conductor for the units digit zero and the conductor for the units digit zero will be connected to the outgoing conductor for the units digit seven.

In addition to these shifts in the units determined by the tens registration, a shift of the tens output digit is determined by the units in the case where the units digit of the overtime period received from the subtracting circuit is either eight or nine and the tens digit is two, five or eight. In this case the outgoing tens digit of the quotient is increased one in value by the operation of the SD3 relay 1118 of Fig. 11. Thus any number received from the subtracting circuit is divided by three if the D3 relay 1114 is cross-connected to the contacts of the charge route relay 836. It is understood, however, that any fractional remainders increase the quotient to the next higher integer in all cases.

As illustrative of the manner in which division by three is accomplished it will first be assumed that the overtime period of conversation was twelve minutes and that consequently the tens register 1101 of the subtracting circuit has been operated and ground has been connected to conductor 1042 of the Units Overtime group. With the divide-by-three D3 relay 1114 operated a circuit is now effective from ground over the upper contacts of relay 1114, over the lower No. 2 contacts of relay 1101 and over conductor 1119 through the winding of the R relay 1211 to battery. Relay 1114 also establishes a circuit from ground over its lower contacts, the lower No. 3 contacts of relay 1101 to conductor 1220 of the Tens Overtime Periods group extending to the multiplying circuit. With relay 1211 operated the grounded conductor 1042 is connected over the lower No. 4 contacts of relay 1211 to conductor 1234 of the Units Overtime Periods group extending to the multiplying circuit. Thus the result of dividing the twelve-minute overtime period by three is to produce an indication of four three-minute periods of overtime.

As a further illustration it will be assumed that the overtime period of conversation was thirty-one minutes and that consequently the tens register 1103 of the subtracting circuit has been operated and ground has been connected to conductor 1041 of the Units Overtime group. With relay 1114 operated, a circuit is now established from ground, over the upper contacts of relay 1114, over the lower No. 2 contacts of relay 1003, over conductor 1140 and through the winding of the B relay 1210 to battery. Relay 1114 also establishes a circuit from ground, over its lower contacts, the lower No. 3 contacts of relay 1103 to conductor 1221 of the Tens Overtime Periods group extending to the multiplying circuit. With relay 1210 operated the grounded conductor 1041 is connected over the lower No. 5 contacts of relay 1210 to conductor 1231 of the Units Overtime Periods group extending to the multiplying circuit. Thus the result of dividing the thirty-one-minute overtime period by three is to produce an indication of eleven three-minute periods of overtime since conversation overran the tenth three-minute period by a minute.

As another illustration it will be assumed that the overtime period of conversation was twenty-seven minutes and that consequently the tens register relay 1102 of the subtracting circuit has been operated and ground has been connected to conductor 1047 of the Units Overtime group. With relay 1114 operated a circuit is now effected from ground, over the upper contacts of relay 1114, over the lower No. 2 contacts of relay 1102, over conductor 1141 and through the winding of the G relay 1212 to battery. Relay 1114 also establishes a circuit from ground over its lower contacts, the lower No. 3 contacts of relay 1102, over the inner upper back contact of the SD3 relay 1118 to conductor 1220 of the Tens Overtime Periods group extending to the multiplying circuit. With relay 1212 operated the grounded conductor 1047 is connected over the upper No. 2 contacts of relay 1212 to conductor 1239 of the Units Overtime Periods group extending to the multiplying circuit. Thus the result of dividing the twenty-seven-minute overtime period by three is to produce an indication of nine three-minute periods of overtime.

As a further illustration it will be assumed that the overtime period of conversation was twenty-nine minutes and that consequently the tens register 1102 of the subtracting circuit has been operated and ground has been connected to conductor 1049 of the Units Overtime group. With relay 1114 operated a circuit is established from ground, over its upper contacts, over the lower No. 2 contacts of relay 1102, over conductor 1141 and through the winding of the G relay 1212 to battery. Since the units digit conductor 1049 has been assumed to be grounded, a circuit is established from such conductor over the upper No. 4 contacts of relay 1212, over conductor 1142 and to battery through the winding of the SD3 relay 1118. Relay 1118 thereupon operates and with relay 1114 operated a circuit is now established from ground over the lower contacts of relay 1114, over the lower No. 3 contacts of relay 1102 and over the inner upper front contact of relay 1118 to conductor 1221 of the Tens Overtime Periods group extending to the multiplying circuit. Relay 1118 also establishes a circuit from ground over its lower contacts to conductor 1230 of the Units Overtime Periods group extending to the multiplying circuit. Thus the result of dividing the twenty-nine-minute overtime period by three is to produce an indication of ten three-minute periods of overtime since conversation overran the ninth three-minute period by two minutes.

To divide by five the route charge relay 836 will have been cross-connected so as to cause the operation of the D5 relay 1205 of Fig. 12 as previously described. In this case the conductors for the units digits one to five of the Units Overtime group incoming from the subtracting circuit are connectable in a group of five over contacts of relay 1205 to a first conductor 1145, conductors for the units digits six to nine, inclusive, are connectable to a second conductor 1146 over a group of four other contacts of relay 1205, and the conductor for the units digit zero is connectable over a further contact of relay 1205 to a third conductor 1147. These three conductors are strapped selectively to contacts of the tens register relays 1100 and 1109, inclusive, of the subtracting circuit and in accordance with the tens digit registered govern the proper choice of the units digit quotient. The tens digit is determined directly by the operation of the tens register relays, a shift, however, being necessary when the tens digit is either four or nine. In this case when the units digit is six to nine, inclusive, and the tens digit is four or nine and thus either relay 1104 or 1109 is operated, the relay 1143 is operated to increase the tens digit by one. As before stated when any overtime is divided by five all fractional remainders increase the quotient to the next higher integer.

As an illustration it will be assumed that the overtime period of conversation was fifteen minutes and that consequently the tens relay 1101 of the subtracting circuit has been operated and ground has been connected to conductor 1045 of the Units Overtime group. With relay 1205 operated a circuit is established from ground over its upper No. 6 contacts, conductor 1144, and over the lower No. 1 contacts of register relay 1101 to conductor 1220 of the Tens Overtime Periods group extending to the multiplying circuit. In addition, a circuit is established from the grounded units conductor 1045 over the lower No. 1 contacts of relay 1205, conductor 1145, the upper No. 1 contacts of register relay 1101 and to conductor 1233 of the Units Overtime Periods group extending to the multiplying circuit. Thus the result of dividing the fifteen-minute overtime period by five is to produce an indication of three five-minute periods of overtime.

As a further illustration it will be assumed that the overtime period of conversation was twenty-nine minutes and that, consequently, the tens register relay 1102 of the subtracting circuit has been operated and ground has been connected to conductor 1049 of the Units Overtime group. With relay 1205 operated a circuit is established from ground over its upper No. 6 contacts, conductor 1144, over the upper No. 1 contacts of register relay 1102 and to conductor 1220 of the Tens Overtime Periods group extending to the multiplying circuit. In addition, a circuit is established from grounded units conductor 1049, over the upper No. 4 contacts of relay 1205, over conductor 1146, over the upper No. 2 contacts of register relay 1102 and to conductor 1236 of the Units Overtime Periods group extending to the multiplying circuit. Thus the result of dividing the twenty-nine-minute overtime period by five is to produce an indication of six five-minute periods of overtime since the conversation overran the fifth five-minute period by four minutes.

As another example it will be assumed that the overtime period of conversation was forty-nine minutes and that, therefore, the tens register relay 1104 of the subtracting circuit has been operated and ground has been connected to conductor 1049 of the Units Overtime group, over the upper No. 4 contacts of relay 1205, conductor 1146, over the upper No. 2 contacts of register relay 1104 and through the winding of relay 1143 to battery. Relay 1143 thereupon operates and with relay 1104 operated establishes a circuit from ground over the upper No. 6 contacts of relay 1205, conductor 1144, the lower No. 1 contacts of relay 1104, and the inner upper front contact of relay 1143 to conductor 1221 of the Tens Overtime Periods group extending to the multiplying circuit. In addition, relay 1143 connects ground over its upper contacts to conductor 1230 of the Units Overtime Periods group. Thus the result of dividing the forty-nine-minute overtime period by five is to produce an indication of ten five-minute periods of overtime since conversation overran the ninth five-minute period by four minutes.

As another example it will be assumed that the overtime period of conversation was ten minutes and that therefore the tens register relay 1101 of the subtracting circuit has been operated and ground has been connected to conductor 1060 of the Units Overtime group. With relay 1205 operated a circuit is established from ground over its upper No. 6 contacts, conductor 1144, the lower No. 1 contacts of relay 1101, to conductor 1220 of the Tens Overtime Periods group extending to the multiplying circuit. In addition, a circuit is extended from grounded units conductor 1060, over the upper No. 5 contacts of relay 1205, conductor 1147, the upper No. 3 contacts of relay 1101 and to conductor 1232 of the Units Overtime Periods group extending to the multiplying circuit. Thus the result of dividing the ten-minute overtime period by five is to produce an indication of two five-minute periods of overtime.

Determination of Charge for Overtime Period of Conversation

After the determination of the number of overtime periods of conversation through the operation of the dividing circuit the charge to be made for the entire overtime conversation period may be determined by multiplying the number of overtime periods by the charge to be made for each period as prescribed by the operated charge route relay 836. For example, the charge may be at the rate of one or two message units for each of the overtime periods. It has previously been assumed that with the charge route relay 836 operated the D2 relay 1202 was operated to divide the total elapsed overtime, assumed to be twelve minutes, by two. As a consequence the dividing circuit of Fig. 12 has connected ground to the No. 0 conductor 1220 of the Tens Overtime Periods group and to the No. 6 conductor 1236 of the Units Overtime Periods group representative of six two-minute periods of overtime. It will now be assumed that with the charge route relay 836 operated a circuit is established from ground over the inner right contacts of such relay, over the inner right front contact of relay 839, conductor 842 and strapped terminals of cross-connecting rack 1300 through the winding of the M1 relay 1301 to battery. Relay 1301 thereupon operates indicative of the fact that each two-minute overtime period is to be charged at the rate of one message rate for each period. In other words, the assumed six two-minute overtime periods are to be multiplied by one.

It was assumed that conductor 1220 was grounded indicative of a tens digit 0 of the number of two-minute elapsed time intervals and therefore as a result the circuit of the 0 relay 1310 is established resulting in the operation of relay 1310. It is obvious that in multiplying by one the product will be the same as the input and that therefore the tens digit of the output will be zero.

Figure 14:
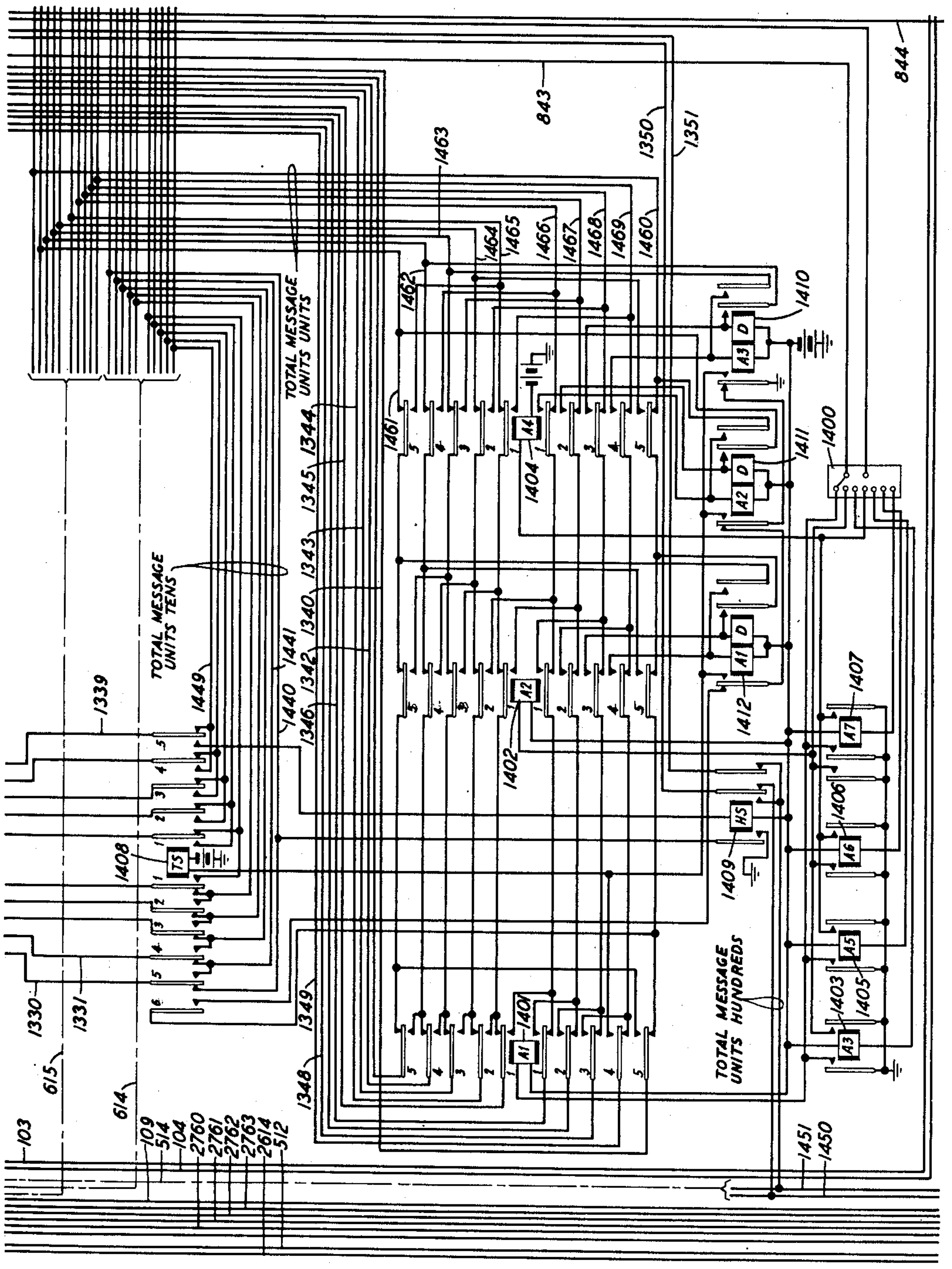
Fig. 14 shows the circuits for computing the charge in message units for the initial period of conversation and for adding it to the charge for the overtime periods of conversation as determined by the circuits of Fig. 13.

With the M1 relay 1301 operated ground will be applied over its lower No. 5 contacts and the upper No. 5 back contact of relay 1306 to conductor 1350 of the Message Units Hundreds group of conductors extending to the adding circuit of Fig. 14. A further circuit is also established from ground over the lower No. 6 contacts of relay 1301, the inner upper contacts of relay 1310, the left No. 5 back contact of relay 1320 to conductor 1330 of the Message Units Tens group of conductors extending to the adding circuit of Fig. 14. Ground applied to conductor 1236, as assumed, causes the energization of relay 1303 over its lower winding and the extension of conductor 1236 over its inner upper contacts, the lower No. 1 contacts of relay 1301, and the lower No. 3 back contacts of relay 1306 to conductor 1346 of the Message Units group of conductors extending to the adding circuit of Fig. 14. Therefore, the result of multiplying the number of overtime periods, assumed to be six, by one is to produce an indication 006 or six message units for the overtime period of the call.

As a further example it will be assumed that the number of overtime periods of conversation was ten and that, therefore, conductor 1221 of the Tens Overtime Periods group and conductor 1230 of the Units Overtime Periods group have been grounded. With ground connected to conductor 1221 the circuit of the 1 relay 1311 is completed whereupon relay 1311 operates to register the tens digit 1 of the number of overtime periods.

Now with the M1 relay 1301 operated, ground is connected over its lower No. 5 contacts and the upper No. 5 back contact of relay 1306 to conductor 1350 of the Message Units Hundreds group extending to the adding circuit of Fig. 14 and ground is connected over the lower No. 6 contacts of relay 1301, the inner upper contacts of operated relay 1311 and the left No. 4 back contact of relay 1320 to conductor 1331 of the Message Units Tens group extending to the adding circuit of Fig. 14. Ground applied to conductor 1230 is extended over the upper No. 6 contacts of relay 1301 and the upper No. 4 back contact of relay 1306 to conductor 1340 of the Message Units Units group extending to the adding circuit of Fig. 14. Thus the result of multiplying the ten periods of overtime by one is to produce an indication 010 or ten message units for the overtime period of conversation.

In multiplying by two the tens digit product depends on whether the incoming units digit is above or below five. For instance, when the incoming units digit is from one to four the tens product digit is zero but when the incoming units digit is from five to nine the tens digit is one. The switching of the circuits performing this multiplying function is accomplished by having five relay windings on the relays 1303 and 1304 to which the five to nine units digit conductors 1235 to 1239 are connected. Thus with the 0 relay 1310 of the tens register operated the resultant tens can be either zero or one and with the 1 tens relay 1311 operated the resultant tens can be either two or three depending upon whether the units is above or below five. The hundreds digit results in zero for all values up to 49 for the input digit. From 50 to 99 input the hundreds digit becomes one.

It was previously assumed that for the particular toll call ticket being calculated there were six two-minute periods of overtime and that, consequently, incoming conductors 1220 and 1236 have been grounded in the dividing circuits. To multiply by two conductor 842 is cross-connected over rack 1300 to the winding of the M2 relay 1302 whereupon such relay is operated. With relay 1302 operated ground is applied over its lower No. 5 contacts, the upper contacts of the 0 relay 1310 and the upper No. 5 back contact of relay 1306 to conductor 1350 of the Message Units Hundreds group. With ground applied to conductor 1236 relay 1303 is energized over its lower winding and with relays 1302 and 1310 both operated, ground is connected over the lower No. 6 contacts of relay 1302, the lower front contact of relay 1303, the lower contacts of relay 1310 and the left No. 4 back contact of relay 1320 to conductor 1331 of the Message Units Tens group. The ground on conductor 1236 is also extended over the inner upper contacts of relay 1303, the lower No. 1 contacts of relay 1302 and the upper No. 3 back contact of relay 1306 to conductor 1342 of the Message Units Units group of conductors. Thus the result of multiplying the six periods of overtime by two is to produce an indication of 012 or twelve message units for the overtime period of conversation.

As a further example it will be assumed that there were ten two-minute periods of overtime and that, consequently, incoming conductors 1221 and 1230 have been grounded in the dividing circuits. With ground connected to conductor 1221 the 1 relay 1311 is operated. Ground is connected over the lower No. 5 contacts of relay 1302, the upper contacts of relay 1311, and the upper No. 5 back contact of relay 1306 to conductor 1350 of the Message Units Hundreds group of conductors and ground is connected over the lower No. 6 contacts of relay 1302, the lower back contact of relay 1303, the lower back contact of relay 1304, these two relays not having operated since the units digit has a value less than five, the inner lower contacts of relay 1311, the left No. 3 back contact of relay 1320 and to conductor 1332 of the Message Units Tens group of conductors. The ground on conductor 1230 is also extended over the upper No. 6 contacts of relay 1302 and the upper No. 4 back contact of relay 1306 to conductor 1340 of the Message Units Units group of conductors. Thus the result of multiplying the ten periods of overtime by two is to produce an indication 020 or twenty message units for the overtime period of conversation.

As a still further example it will be assumed that there were fifty-seven periods of overtime represented by grounded conductors 1225 and 1237. With ground connected to conductor 1225 the 5 relay 1315 is operated and with ground connected to conductor 1237 relay 1304 is operated over its lower winding. Relay 1302 is operated as previously described and over its lower No. 5 contacts connects ground over the upper contacts of relay 1315 and the upper No. 6 back contact of relay 1306 to conductor 1351 of the Message Units Hundreds group of conductors. Also relay 1302 connects ground over its lower No. 6 contacts, the lower back contact of relay 1303, the lower front contact of relay 1304, the lower contacts of relay 1315 and the left No. 4 back contact of relay 1320 to conductor 1331 of the Message Units Tens group of conductors. Ground on conductor 1237 is also extended over the upper contacts of relay 1304, the lower No. 2 contacts of relay 1302 and the lower No. 1 back contact of relay 1306 to conductor 1344 of the Message Units Units group of conductors. Thus the result of multiplying the fifty-seven periods of overtime by two is to produce an indication of 114 or one hundred fourteen message units for the overtime period of conversation.

Adding the Charge for the Initial Period of Conversation

The output of the multiplying circuit of Fig. 13 in hundreds, tens and units of message units represents the complete charge for the overtime periods and in order to arrive at the total charge for the call it is necessary to add the charge in message units for the initial charge. This initial charge, as indicated in the preceding table of basic rates, may be any value from one to seven message units. The amount of the initial charge to be added is determined by the circuits disclosed in Fig. 14 under the control of the charge route relay 836 which connects ground over its outer right contacts, the outer right front contact of relay 839 and conductor 843 to a terminal on cross-connecting rack 1400 which terminal may be cross-connected to the winding of any one of the A1 to A7 relays designated 1401 to 1407, respectively. If the amount of the initial charge is one message unit and the A1 relay 1401 is operated, the units charge represented by ground connected to any one of the conductors of the Message Units Units group is increased by one. For example, if the charge for the overtime period is six message units conductor 1350 of the Message Units Hundreds group, conductor 1330 of the Message Units Tens group and conductor 1346 of the Message Units Units group are grounded. With the HS relay 1409 unoperated, indicative of the fact that the tens digit of the number of message units for the overtime periods of conversation is other than nine and that in adding one message unit for the initial period it is not necessary to increase the total in the tens place by one, conductor 1350 is extended over the inner right back contact of relay 1409 to conductor 1450 of the Total Message Units Hundreds group extending to the adding or subtracting circuits of Figs. 15, 18 and 22. With relay 1401 operated and the units digit of the number of message units for the overtime periods other than nine there is no effective circuit over the lower No. 4 front contact of relay 1401 for the TS relay 1408 and therefore the grounded conductor 1330, indicative of the tens value of the overtime message units, is extended over the left No. 5 back contact of relay 1408 to conductor 1440 of the Total Message Units Tens group extending to the adding or subtracting circuits of Figs. 15, 18 and 22. Grounded conductor 1346 is extended over the lower No. 1 front contact of relay 1401, the lower No. 2 back contacts of relays 1402 and 1404 to conductor 1467 of the Total Message Units Units group extending to the adding or subtracting circuits of Figs. 15, 18 and 22. Thus with conductors 1450, 1440 and 1467 grounded the indicated charge for the total period of conversation is calculated to be seven message units.

In the event the message units for the overtime periods of conversation are nine instead of six then with ground connected to units conductor 1349 a circuit is extended from such conductor over the lower No. 4 front contact of relay 1401 and through the winding of relay 1408 to battery and therefore the tens place digit conductor 1330 is extended over the left No. 5 front contact of relay 1408 to conductor 1441 of the Total Message Units Tens group but the circuit of relay 1409, while closed at the right No. 5 front contact of relay 1408, is ineffective since no ground is applied to incoming tens conductor 1339 and therefore the incoming hundreds conductor 1350 is extended as before to the outgoing hundreds conductor 1450 extending to the adding or subtracting circuits. With relay 1408 operated ground is connected over the left back contacts of relays 1410, 1411 and 1412, the left No. 6 contacts of relay 1408, the lower No. 5 back contacts of relays 1402 and 1404 to conductor 1460 of the Total Message Units Units group extending to the adding or subtracting circuits. Thus with conductors 1450, 1441 and 1460 grounded the indicated charge for the total period of conversation is calculated to be ten message units.

If, however, the input registered a nine in the tens place and a nine in the units place as, for example, to indicate 99 message units for the overtime periods of conversation then conductors 1350, 1339 and 1349 will be grounded and with ground on conductor 1349 the circuit of relay 1408 is, therefore, completed. With relay 1408 operated the grounded conductor 1339 is extended over the right No. 5 front contact of relay 1408 to the winding of relay 1409 which operates and extends the grounded hundreds conductor 1350 over its inner right front contact to output conductor 1451 and connects ground over its left contacts to the outgoing tens conductor 1440. With relay 1408 operated ground is connected over the left back contacts of relays 1410, 1411 and 1412, the left No. 6 contacts of relay 1408, the lower No. 5 back contacts of relays 1402 and 1404 to outgoing units conductor 1460. Thus with conductors 1451, 1440 and 1460 grounded the indicated charge for the total period of conversation is calculated to be one hundred message units.

If the initial period of conversation is to be charged at the rate of two message units then the A2 relay 1402 is operated by a ground applied to conductor 843. With relay 1401 unoperated and relay 1402 operated, a shift of two is made in the units place, a shift is made in the tens place if the units digit is eight or nine through the operation of the AID relay 1412 and the consequent operation of relay 1408 and a shift of one is made in the hundreds place through the operation of relay 1409 if a shift is made in the tens place through the operation of relay 1408 and the tens digit is nine.

As an example it will be assumed that the charge for the overtime periods of conversation was six message units and that ground has been applied to incoming conductors 1350, 1330 and 1346. Under this condition no circuits are effective through the operation of relay 1402 for relays 1412, 1408 or 1409 and therefore grounded conductor 1350 is extended over the inner right back contact of relay 1409 to outgoing conductor 1450, grounded conductor 1330 is extended over the left No. 5 back contact of relay 1408 to conductor 1440 and grounded conductor 1346 is extended over the lower No. 1 back contact of relay 1401, the lower No. 1 front contact of relay 1402, and the lower No. 3 back contact of relay 1404 to outgoing conductor 1468. Thus with conductors 1450, 1440 and 1468 grounded the indicated charge for the total period of conversation is calculated to be eight message units.

As a further example it will be assumed that the charge for the overtime periods of conversation was eight message units and that ground has been applied to incoming conductors 1350, 1330 and 1348. Under this condition ground applied to conductor 1348 is extended over the lower No. 3 back contact of relay 1401 and the lower No. 3 front contact of operated relay 1402 and thence through the right winding of relay 1412 to battery whereupon relay 1412 operates and extends its operating ground over its inner right contacts and the lower No. 5 back contact of relay 1404 to the outgoing units conductor 1460. Relay 1412 upon operating also establishes a circuit from ground over the left back contacts of relay 1410 and 1411, over the left front contact of relay 1412 and thence through the winding of relay 1408 to battery. With relay 1408 operated the ground applied to incoming tens conductor 1330 is extended over the left No. 5 front contact of relay 1408 to the outgoing tens conductor 1441. Relay 1409 is not operated at this time since there is no ground on the incoming tens conductor 1339 and, therefore, the incoming hundreds conductor 1350 is extended over the inner right back contact of relay 1409 to the outgoing hundreds conductor 1450. Thus with conductors 1450, 1441 and 1460 grounded the indicated charge for the total period of conversation is calculated to be ten message units.

As a still further example it will be assumed that the charge for the overtime periods of conversation was ninety-nine message units and that ground has been applied to incoming conductors 1350, 1339 and 1349. The application of ground to conductor 1349 establishes a circuit from such conductor over the lower No. 4 back contact of relay 1401 and over the lower No. 4 front contact of relay 1402 through the left winding of relay 1412 to battery and the latter relay upon operating extends its operating ground over its outer right contacts and the upper No. 5 back contact of relay 1404 to the outgoing units conductor 1461. Relay 1412 upon operating also establishes the previously traced operating circuit for relay 1408 which operates and extends the grounded incoming tens conductor 1339 over its right No. 5 front contact through the winding of relay 1409 to battery whereupon relay 1409 operates and extends the incoming hundreds conductor 1350 over its inner right front contact to the outgoing hundreds conductor 1451 and at its left contacts connects ground to the outgoing tens conductor 1440. Thus with conductors 1451, 1440 and 1461 grounded the indicated charge for the total period of overtime is calculated to be one hundred one message units.

If the initial period of conversation is to be charged at the rate of three message units then the A3 relay 1403 is operated by ground connected to conductor 843 and at its contacts establishes obvious circuits for the A1 relay 1401 and the A2 relay 1402. With relay 1401 operated a shift of one is made in the units place as previously described and with the relay 1402 operated a further shift of two is made in the units place. A shift of one is also made in the tens place if the incoming units digit is seven, eight or nine through the operation of relay 1401 and the further operation of relay 1412. A shift of one is also made in the hundreds place as previously described if the tens digit is nine.

As an example it will be assumed that the charge for the overtime periods of conversation was six message units and that ground has been applied to incoming conductors 1350, 1330 and 1346. With ground applied to the incoming units conductor 1346 and relays 1401 and 1402 both operated such grounded conductor is extended over the lower No. 1 front contact of relay 1401 and the lower No. 2 front contact of relay 1402, the lower No. 4 back contact of relay 1404 to the outgoing units conductor 1469. Under this condition neither relay 1408 nor relay 1409 will be operated and, consequently, the grounded incoming hundreds conductor 1350 is extended over the inner right back contact of relay 1409 to the outgoing hundreds conductor 1450 and the incoming tens conductor 1330 is extended over the left No. 5 back contact of relay 1408 to the outgoing tens conductor 1440. Thus with conductors 1450, 1440 and 1469 grounded the indicated charge for the total period of conversation is calculated to be nine message units.

As a further example it will be assumed that the charge for the overtime periods of conversation was ninety-nine message units and that ground has therefore been applied to incoming conductors 1350, 1339 and 1349. With ground connected to conductor 1349 and relays 1401 and 1402 both operated such ground is extended over the lower No. 4 front contact of relay 1401 through the winding of relay 1408 to battery and relay 1408 upon operating extends grounded conductor 1339 over its right No. 5 front contact through the winding of relay 1409 to battery. Relay 1409 upon operating now extends the incoming hundreds conductor 1350 over its inner right front contact to outgoing hundreds conductor 1451 and over its left contacts connects ground to the outgoing tens conductor 1440. A circuit is also closed from ground over the left back contacts of relays 1410, 1411 and 1412, over the left No. 6 contacts of relay 1408, over the lower No. 5 front contact of relay 1402 and the upper No. 4 back contact of relay 1404 to the outgoing units conductor 1462. Thus with conductors 1451, 1440 and 1462 grounded the indicated charge for the total period of conversation is calculated to be one hundred and two message units.

If the initial period of conversation is to be charged at the rate of four message units then the A4 relay 1404 is operated by ground connected to conductor 843 and at its contacts provides a shift of four in the units place. If the units digit is 6, 7, 8 or 9, either relay 1410 or 1411 may be operated resulting in a shift of one in the tens place, and if the tens digit is 9, there will also be a shift of one in the hundreds place.

As an example, it will be assumed that the charge for the overtime periods of conversation was five message units and that ground has been applied to incoming conductors 1350, 1330 and 1345. With ground applied to the incoming units conductor 1345 and relays 1401 and 1402 both unoperated, such grounded conductor is extended over the upper No. 1 back contacts of relays 1401 and 1402 and over the upper No. 1 front contact of relay 1404 to outgoing units conductor 1469. Under this condition neither relay 1408 nor relay 1409 will be operated and, consequently, the grounded incoming hundreds conductor 1350 is extended over the inner right back contact of relay 1409 to the outgoing hundreds conductor 1450 and the incoming tens conductor 1330 is extended over the left No. 5 back contact of relay 1408 to the outgoing tens conductor 1440. Thus, with conductors 1450, 1440 and 1469 grounded, the indicated charge for the total period of conversation is calculated to be nine message units.

As a further example, it will be assumed that the charge for the overtime periods of conversation was six message units, and that ground has been applied to incoming conductors 1350, 1330 and 1346. With ground applied to the incoming units conductor 1346 and relays 1401 and 1402 both unoperated, such grounded conductor is extended over the lower No. 1 back contacts of relays 1401 and 1402 and over the lower No. 1 front contact of relay 1404 through the left winding of relay 1411 to battery. Relay 1411 thereupon operates and extends its operating ground over its outer right contacts to the outgoing units conductor 1460. In addition, a circuit is established from ground at the left back contact of relay 1410, the left front contact of relay 1411 and through the winding of relay 1408 to battery. Relay 1408 thereupon operates and over its left No. 5 front contact extends the incoming tens conductor 1330 to the outgoing tens conductor 1441. Since there is no ground on incoming tens conductor 1339, no circuit is established over the right No. 5 front contact of relay 1408 through the winding of relay 1409 and, therefore, with relay 1409 unoperated, incoming hundreds conductor 1350 is extended over its inner right back contact to the outgoing hundreds conductor 1400. Thus, with conductors 1450, 1441 and 1460 grounded, the indicated charge for the total period of conversation is calculated to be ten message units.

As a further example, it will be assumed that the charge for the overtime periods of conversation was ninety-nine message units and that ground has, therefore, been applied to incoming conductors 1350, 1339 and 1349. With ground connected to conductor 1349 and relays 1401 and 1402 both unoperated, such ground is extended over the lower No. 4 back contacts of relays 1401 and 1402 and over the lower No. 4 front contact of relay 1404 through the left winding of relay 1410 to battery. Relay 1410 thereupon operates and extends its operating ground over its outer right contacts to the outgoing units conductor 1463. Also at its left front contact, relay 1410 establishes the circuit of relay 1408 which thereupon operates and extends the incoming tens conductor 1339 over its right No. 5 front contact through the winding of relay 1409 to battery. Relay 1409 thereupon operates and at its left contacts connects ground to outgoing tens conductor 1440 and extends ground on incoming hundreds conductor 1350 over its right front contact to outgoing hundreds conductor 1451.

Thus, with conductors 1451, 1440 and 1463 grounded, the indicated charge for the total period of conversation is calculated to be one hundred and three message units.

If the initial period of conversation is to be charged at the rate of five message units then the A5 relay 1405 is operated by ground connected to conductor 843 and at its contacts establishes obvious circuits for the A1 relay 1401 and the A4 relay 1404. With relay 1401 operated, a shift of one is made in the units place as previously described and with the relay 1404 operated, a further shift of four is made in the units place. A shift of one is also made in the tens place through the operation of relay 1401 and the further operation of either relay 1410 or 1411 if the units digit is 5, 6, 7, 8 or 9, and a shift of one is made in the hundreds place if there is a shift in the tens place and the tens digit is 9.

As an example, it will be assumed that the charge for the overtime periods of conversation was four message units and that ground has been applied to incoming conductors 1350, 1330 and 1344. With ground applied to the incoming units conductor 1344 and relay 1401 operated, such grounded conductor is extended over the upper No. 2 front contact of relay 1401, the upper No. 1 back contact of unoperated relay 1402, the upper No. 1 front contact of relay 1404 and to outgoing units conductor 1469. Under this condition, neither relay 1408 nor relay 1409 will be operated and, consequently, the grounded incoming hundreds conductor 1350 is extended over the inner right back contact of relay 1409 to the outgoing hundreds conductor 1450, and the incoming tens conductor 1330 is extended over the left No. 5 back contact of relay 1408 to the outgoing tens conductor 1440. Thus, with conductors 1450, 1440 and 1469 grounded, the indicated charge for the total period of conversation is calculated to be nine message units.

As a further example, it will be assumed that the charge for the overtime periods of conversation was six message units and that ground has been applied to incoming conductors 1350, 1330 and 1346. With ground applied to incoming units conductor 1346 and relay 1401 operated, such grounded conductor is extended over the lower No. 1 front contact of relay 1401, the lower No. 2 back contact of relay 1402, the lower No. 2 front contact of relay 1404 and through the right winding of relay 1411 to battery. Relay 1411 thereupon operates and extends its operating ground over its inner right contacts to outgoing units conductor 1461. In addition, a circuit is extended from ground over the left back contact of relay 1410, the left front contact of relay 1411 and through the winding of relay 1408 to battery whereupon relay 1408 operates and extends the incoming tens conductor 1330 over its left No. 5 front contact to the outgoing tens conductor 1441. Since there is no ground on the incoming tens conductor 1339, the closure of the right No. 5 front contact of relay 1408 does not result in the operation of relay 1409 and, therefore, the incoming hundreds conductor 1350 is extended over the inner right back contact of relay 1409 to the outgoing hundreds conductor 1450. Thus, with conductors 1450, 1441 and 1461 grounded, the indicated charge for the total period of conversation is calculated to be eleven message units.

As a further example, it will be assumed that the charge for the overtime periods of conversation was ninety-nine message units and that ground has, therefore, been applied to incoming conductors 1350, 1339 and 1349. With ground connected to conductor 1349 and relay 1401 operated, such ground is extended over the lower No. 4 front contact of relay 1401 and through the winding of relay 1408 to battery, and relay 1408 upon operating extends grounded conductor 1339 over its right No. 5 front contact through the winding of relay 1409 to battery. Relay 1409 upon operating now extends the incoming hundreds conductor 1350 over its inner right front contact to outgoing hundreds conductor 1451 and over its left contacts connects ground to the outgoing tens conductor 1440. A circuit is also closed from ground over the left back contacts of 1410, 1411 and 1412 over the left No. 6 contacts of relay 1408 over the lower No. 5 back contact of relay 1402 and the lower No. 5 front contact of relay 1404 to outgoing units conductor 1464. Thus, with conductors 1451, 1440 and 1464 grounded, the indicated charge for the total period of conversation is calculated to be one hundred and four message units.

If the initial period of conversation is to be charged at the rate of six message units, then the A6 relay 1406 is operated by ground connected to conductor 843 and at its contacts establishes obvious circuits for the A2 relay 1402 and the A4 relay 1404. With relay 1402 operated, a shift of two is made in the units place and with the relay 1404 operated, a further shift of four is made in the units place. A shift of one is made in the tens place through the operation of either relay 1410, 1411 or 1412 if the units digit is 4, 5, 6, 7, 8 or 9, and a shift of one is made in the hundreds place if there is a shift in the tens place and the tens digit is 9.

As an example, it will be assumed that the charge for the overtime periods of conversation was three message units and that ground has been applied to incoming conductors 1350, 1330 and 1343. With ground applied to the incoming units conductor 1343, relay 1401 unoperated and relays 1402 and 1404 both operated, such grounded conductor is extended over the upper No. 3 back contact of relay 1401, the upper No. 3 front contact of relay 1402, the upper No. 1 front contact of relay 1404 to outgoing units conductor 1469. Under this condition, neither relay 1408 nor relay 1409 will be operated and, consequently, the grounded incoming hundreds conductor 1350 is extended over the inner right back contact of relay 1409 to the outgoing hundreds conductor 1450 and the incoming tens conductor 1330 is extended over the left No. 5 back contact of relay 1408 to the outgoing tens conductor 1440. Thus, with conductors 1450, 1440 and 1469 grounded, the indicated charge for the total period of conversation is calculated to be nine message units.

As a further example, it will be assumed that the charge for overtime periods of conversation was six message units and that ground has been applied to incoming conductors 1350, 1330 and 1346. With ground applied to the incoming units conductor 1346, relay 1401 unoperated and relays 1402 and 1404 both operated, such grounded conductor is extended over the lower No. 1 back contact of relay 1401, the lower No. 1 front contact of relay 1402, the lower No. 3 front contact of relay 1404 and through the right winding of relay 1410 to battery. Relay 1410 thereupon operates and extends its operating ground over its inner right contacts to outgoing units conductor 1462 and at its left front contact establishes the circuit of relay 1408. Relay 1408 thereupon operates and at its left No. 5 front contact extends the incoming tens conductor 1330 to the outgoing tens conductor 1441. Since there is no ground on incoming tens conductor 1339, the closure of the right No. 5 front contact of relay 1408 is not effective to complete the circuit of relay 1409 and, therefore, the incoming hundreds conductor 1350 is extended over the inner right back contact of relay 1409 to the outgoing hundreds conductor 1450. Thus, with conductors 1450, 1441 and 1462 grounded, the indicated charge for the total period of conversation is calculated to be twelve message units.

As a further example, it will be assumed that the charge for the overtime periods of conversation was ninety-nine message units and that ground has, therefore, been applied to incoming conductors 1350, 1339 and 1349. With ground connected to conductor 1349 and relay 1401 unoperated, such ground is extended over the lower No. 4 back contact of relay 1401, the lower No. 4 front contact of relay 1402 and through the left winding of relay 1412 to battery. Relay 1412 thereupon operates extending its operating ground over its outer right contacts and the upper No. 5 front contact of relay 1404 to outgoing units conductor 1465. Relay 1412 also establishes a circuit from ground over the left back contacts of relays 1410 and 1411 and the left front contact of relay 1412 through the winding of relay 1408 to battery and relay 1408 operates to extend incoming tens conductor 1339 over its right No. 5 front contact through the winding of relay 1409 to battery. Relay 1409 thereupon operates connecting ground over its left contacts to outgoing tens conductor 1440 and extending incoming hundreds conductor 1350 over its inner right front contact to outgoing hundreds conductor 1451. Thus, with conductors 1451, 1440 and 1465 grounded, the indicated charge for the total period of conversation is calculated to be one hundred and five message units.

If the initial period of conversation is to be charged at the rate of seven message units, then A7 relay 1407 is operated by ground connected to conductor 843 and at its contacts establishes obvious circuits for the A1 relay 1401, the A2 relay 1402 and the A4 relay 1404. With relay 1401 operated, a shift of one is made in the units place, with relay 1402 operated a further shift of two is made in the units place and with relay 1404 operated a further shift of four is made in the units place. With relay 1401 operated and either relay 1410, 1411 or 1412 operated, as will be described, a shift of one is made in the tens place if the units digit is 3, 4, 5, 6, 7, 8 or 9. A shift of one is also made in the hundreds place if there is a shift in the tens place and the tens digit is 9.

As an example, it will be assumed that the charge for the overtime periods of conversation was two message units and that ground has been applied to incoming conductors 1350, 1330 and 1342. With ground applied to the incoming units conductor 1342 and relays 1401, 1402 and 1404 all operated, such grounded conductor is extended over the upper No. 4 front contact of relay 1401, the upper No. 3 front contact of relay 1402, the upper No. 1 front contact of relay 1404 and to the outgoing units conductor 1469. Under this condition, neither relay 1408 nor relay 1409 will be operated and, consequently, the grounded incoming hundreds conductor 1350 is extended over the inner right back contact of relay 1409 to the outgoing hundreds conductor 1450 and the incoming tens conductor 1330 is extended over the left No. 5 back contact of relay 1408 to the outgoing tens conductor 1440. Thus, with conductors 1450, 1440 and 1469 grounded, the indicated charge for the total period of conversation is calculated to be nine message units.

As a further example, it will be assumed that the charge for the overtime periods of conversation was six message units and that ground has been applied to incoming conductors 1350, 1330 and 1346. With ground applied to the incoming units conductor 1346 and relays 1401, 1402 and 1404 all operated, such grounded conductor is extended over the lower No. 1 front contact of relay 1401, the lower No. 2 front contact of relay 1402 and the lower No. 4 front contact of relay 1404 and through the left winding of relay 1410 to battery. Relay 1410 thereupon operates extending its operating ground over its outer right contacts to outgoing units conductor 1463 and at its left front contact establishing the circuit of relay 1408. Relay 1408 upon operating extends the incoming tens conductor 1330 over its left No. 5 front contact to outgoing tens conductor 1441. Since there is no ground on incoming tens conductor 1339, the operation of relay 1408 is ineffective to complete the circuit of relay 1409, and therefore, the incoming hundreds conductor 1350 is extended over the inner right back contact of relay 1409 to the outgoing hundreds conductor 1450. Thus, with conductors 1450, 1441 and 1463 grounded, the indicated charge for the total period of conversation is calculated to be thirteen message units.

As a further example, it will be assumed that the charge for the overtime periods of conversation was ninety-nine message units and that ground has, therefore, been applied to incoming conductors 1350, 1339 and 1349. With ground connected to conductor 1349 and relay 1401 operated, such ground is extended over the lower No. 4 front contact of relay 1401 through the winding of relay 1408 to battery and relay 1408 upon operating extends grounded conductor 1339 over its right No. 5 front contact through the winding of relay 1409 to battery. Relay 1409 upon operating now extends the incoming hundreds conductor 1350 over its inner right front contact to outgoing hundreds conductor 1451 and over its left contacts connects ground to the outgoing tens conductor 1440. A circuit is also closed from ground over the left back contacts of relays 1410, 1411 and 1412, over the left No. 6 contacts of relay 1408, over the lower No. 5 front contact of relay 1402 and the upper No. 4 front contact of relay 1404 to outgoing units conductor 1466. Thus, with conductors 1451, 1440 and 1466 grounded, the indicated charge for the total period of conversation is calculated to be one hundred and six message units.

No Overtime

It will be recalled that on calls on which the elapsed time is equal to or less than the initial period of conversation, ground is connected to conductor NOT resulting in the operation of relays 1306 and 1320 of Fig. 13. With relay 1320 operated, all conductors of the Message Units Tens group are disconnected at its back contacts from conductors 1330 to 1339 and ground is connected over its left No. 5 front contact to outgoing tens conductor 1330. With relay 1306 operated, the conductors 1350 and 1351 of the Message Units Hundreds group are disconnected at its upper Nos. 5 and 6 back contacts and ground is connected over its upper No. 5 front contact to conductor 1350. Also, relay 1306 disconnects the outgoing conductors 1340 to 1349 of the Message Units Units groups and at its upper No. 4 front contact connects ground to conductor 1340. Thus, with ground connected to conductors 1350, 1330 and 1340, a calculation of no overtime period is made so that the initial period of conversation, calculated by the adding circuits of Fig. 14, results in the extension of such grounded conductors to conductors of the Total Message Units Hundreds; Total Message Units Tens and Total Message Units Units groups in such a manner as will be indicative only of the charge for the initial period of conversation.

PREPARATION OF ADDING AND STORING CIRCUITS

It will be recalled that in response to the operation of the start key 101, the start relay 120 operated and connected ground to the off-normal ground bus-bar 109. This ground is effective to prime the B register of the hundreds, tens and units sections of the adding and storing circuits to register zeros. In the hundreds section, disclosed in Figs. 15, 16, 17 and 27, the ground on conductor 109 is extended over the upper back contact of the W relay 2701 to conductor 2703, over the upper back contacts of the P relay 2702 to conductors 2704 and 2705, thence from conductor 2704, over conductor 1670, through the winding of the 0 relay 1600 of the hundreds B register to battery and from conductor 2705 through the winding of the B relay 1603 of the hundreds B register to battery. Relay 1600 operates and prepares a locking circuit for itself over its right No. 1 contacts to ground supply conductor 2703, and relay 1603 operates and prepares a locking circuit for itself over its left No. 1 contacts to 2703. The connection of ground to off-normal bus-bar 109 also establishes a circuit over the upper back contact of relay 2700, conductor 2706 over the No. 1 right back contact of the 0B relay 1652 and through the winding of the 0A relay 1602 to battery whereupon relay 1602 operates.

Similarily, in the tens section disclosed in Figs. 19, 20, 21 and 28 the ground on conductor 109 is extended over the upper back contact of the W relay 2801 to conductor 2803, over the upper back contacts of the P relay 2802 to conductors 2804 and 2805, thence from conductor 2804, over conductor 2070, through the winding of the 0 relay 2000 of the tens B register to battery and from conductor 2805 through the winding of the B relay 2003 of the tens B register to battery. Relay 2000 operates and locks over its right No. 1 contacts to ground on conductor 2803 and relay 2003 operates and locks over its left No. 1 contacts to ground on conductor 2803. The connection of ground to off-normal conductor 109 also establishes a circuit over the upper back contact of the Z relay 2800, conductor 2806, over the No. 1 right back contact of the 0B relay 2052 and through the winding of the 0A relay 2002 to battery whereupon relay 2002 operates.

Also, in the units section disclosed in Figs. 23, 24, 25 and 29 the ground on conductor 109 is extended over the upper back contact of the W relay 2901 to conductor 2903, over the upper back contacts of the P relay 2902 to conductors 2904 and 2905, thence from conductor 2904, over conductor 2470, through the winding of the 0 relay 2400 of the units B register to battery and from conductor 2905 through the winding of the B relay 2403 of the units B register to battery. Relay 2400 operates and locks over its right No. 1 contacts to ground on conductor 2903 and relay 2403 operates and locks over its left No. 1 contacts to ground on conductor 2903. The connection of ground to off-normal conductor 109 also establishes a circuit over the upper back contact of relay 2900, conductor 2906, over the No. 1 right back contact of the 0B relay 2452 and through the winding of the 0A relay 2402 to battery whereupon relay 2402 operates.

The 0 relays 1600, 2000 and 2400 of the B registers have now been primed to register 0 hundreds, tens and units digits of the message units charge on the adding and storing circuits and the B relays 1603, 2003 and 2403 and the 0A relays 1602, 2002 and 2402 have been operated preparatory to the registration in the A registers of the hundreds, tens and units digits of the charge in message units for the first processed toll ticket.

ADDING OR SUBTRACTING TOTAL MESSAGE UNITS FROM THE STORED TOTAL

It has been assumed that for the toll ticket being processed there were six overtime periods each charged at the rate of one message unit per overtime period and that the initial period was charged at the rate of one message unit making a total charge of seven message units which is indicated by the grounding of conductors 1450, 1440 and 1467 outgoing from the adding circuit of Fig. 14. It will be recalled that in response to the operation of key 102 of Fig. 1 to its ADD position, the ADD relay 2200 of Fig. 22 was operated indicative of the fact that the adding and subtracting circuits of Figs. 15, 18 and 22 are to be conditioned for causing the output of Fig. 14 in total message units for each successively processed ticket to be added to the total message units for previously processed tickets of the same subscriber's account.

The operation of relay 2200 establishes a circuit from ground over its lower No. 3 contacts and through the winding of relay 2201 to battery whereupon relay 2201 operates to extend the incoming conductors of the Total Message Units Units group to correspondingly valued conductors of the units output group comprising conductors 2210 to 2219, inclusive, extending to the units section of the adding and storing circuits. It having been assumed that ground was connected to conductor 1467 indicative of the units value 7 of the message units, such conductor is extended by the left No. 3 contacts of operated relay 2201 to conductor 2217 thereby causing the operation of the 7 units translator relay 2307 of Fig. 23 in a circuit from ground on conductor 2217 through the winding of relay 2307 to battery on conductor 2203.

Relay 2307 upon operating establishes a circuit from ground over its No. 6 contacts, conductor 2312, the right No. 5 contacts of the 0A relay 2402, conductor 2412, the right No. 4 contacts of the 0 relay 2400, conductor 2422 and through the winding of the 2 relay 2552 of the units A register to battery whereupon relay 2552 operates and prepares a locking circuit over its left No. 1 contacts to ground supply conductor 2907 to which ground will be applied upon the subsequent operation of the W relay 2901. In addition relay 2307 establishes a circuit extending from ground at the right No. 8 contacts of the 0A relay 2402, conductor 2415, the right No. 8 contacts of the 0 relay 2400, conductor 2315, the No. 1 contacts of the 7 relay 2307, conductor 2321, the right No. 1 contacts of the 0A relay 2402, the right No. 3 contacts of the B relay 2403 and to battery through the winding of the A relay 2451 of the units A register, whereupon the latter relay operates and at its right No. 1 contacts prepares a locking circuit for itself to locking ground conductor 2907. As a further result of the operation of the A relay 2451 a circuit is prepared for the J relay 2908 of Fig. 29 for applying the output of the units section of the adding and storing circuits to the teletypewriter control circuits. The circuit for relay 2908 may be traced from battery through its winding, conductor 2910, the left No. 1 contacts of relay 2451 to conductor 2768, which becomes grounded when the progress switch 2750 of Fig. 27 advances at the end of the ticket processing. It is to be noted in this connection that while the circuits for relays 2908 and 2909 may be prepared in response to each adding operation of the adding and storing circuits, such relays do not, however, operate until after the entire stack of tickets for a subscriber's account have been processed.

The operation of the 2 relay 2552 of the units A register has now been instrumental in adding the units digit 7 of the charge in message units for the first processed ticket to the units digit 0 registered by the 0 relay 2400 of the B register to produce a total units digit 7 which if relay 2908 were operated at this time would result in ground being connected to the conductor 2727 over a circuit which may be traced from ground applied by the progress switch 2750 over conductor 2768, the left No. 7 contacts of the 2 relay 2552, conductor 2922, the No. 3 contacts of the J relay 2908 and to conductor 2727 whereby the teletypewriter would be controlled to print the units digit 7 of the total message units.

Since the units digit of the total message units now registered is 7, there is no necessity for carrying a 1 over into the tens register section of the adding and storing circuits and, therefore, a circuit is established for the no-carry tens (NC—T) relay 1800 of Fig. 18 which may be traced from ground over the left No. 2 contacts of the B relay 2403, the right No. 2 contacts of the A relay 2451, the left No. 2 contacts of the 0A relay 2402, conductor 2204, the upper No. 4 contacts of the ADD relay 2200, conductor 2205 and through the winding of relay 1800 to battery. Relay 1800, therefore, operates and extends the tens group of conductors 1440 to 1449, inclusive, incoming from the circuits of Fig. 14 over its contacts to the conductors 1810 to 1819, inclusive, without change in the digital values. It has been assumed that conductor 1440 has been grounded indicative of a tens digit 0 for the total message units charge for the ticket being processed and, therefore, with relay 1800 operated, such conductor is extended over the right No. 5 contacts of relay 1800 to conductor 1810 and thence through the winding of the 0 tens translator relay 1900 of the tens register section of the adding and storing circuits disclosed in Figs. 19, 20, 21 and 29 to battery on conductor 1803.

Relay 1900 upon operating establishes a circuit from ground over its No. 6 contacts, conductor 1910, the right No. 7 contacts of operated 0A relay 2002, the right No. 6 contacts of the 0 relay 2000, thence through the winding of the 0 relay 2050 of the tens A register to battery. Thereupon relay 2050 operates and prepares a locking circuit at its left No. 1 contacts to locking ground conductor 2807 to which ground will be applied upon the subsequent operation of the W relay 2801. In addition, relay 1900 establishes a circuit extending from ground at the right No. 8 contacts of the 0A relay 2002, conductor 2015, the right No. 8 contacts of the 0 relay 2000, conductor 1915, the No. 5 contacts of the 0 relay 1900, conductor 1920, the right No. 2 contacts of relay 2002, the right No. 2 contacts of operated B relay 2003 and through the winding of the B relay 2053 of the tens A register to battery. Thereupon relay 2053 operates and at its right No. 1 contacts prepares a locking circuit for itself to locking ground on conductor 2807. As a further result of the operation of the B relay 2003 and the B relay 2053, a circuit is prepared for the K relay 2809 of Fig. 28 which may be traced from battery through its winding, conductor 2811, the left No. 1 contacts of relay 2053 to conductor 2767 or over the No. 1 right contacts of relay 2003 to conductor 2767 which latter conductor becomes grounded when the progress switch 2750 of Fig. 27 advances at the end of the ticket processing.

The operation of the 0 relay 2050 and the tens A register has now been instrumental in adding the tens digit 0 of the charge in message units for the first processed ticket to the tens digit 0 registered by the 0 relay 2000 of the tens B register to produce a total tens digit 0 which, if the relay 2809 were operated at this time, would result in ground being connected to conductor 2720 over a circuit which may be traced from ground applied by the progress switch 2750 over conductor 2767, the left No. 7 contacts of the 0 relay 2050, conductor 2820, the No. 5 contacts of the K relay 2809 and to conductor 2720 whereby the teletypewriter would be controlled to print the tens digit 0 of the total message units.

Since the tens digit of the total message units now registered in the A tens register is 0, there is no necessity for causing a 1 to be carried over into the hundreds register section of the adding and storing circuits and, therefore, a circuit is established for the no-carry hundreds (NC—H) relay 1522 of Fig. 15 which may be traced from ground on off-normal bus-bar 109 over the No. 7 contacts of operated 0 relay 1900 of the tens digit translator of Fig. 19, conductor 1922, the upper No. 1 contacts of the ADD relay 2200, conductor 2206, the left No. 6 contacts of operated NC—T relay 1800, conductor 1804 and through the winding of the NC—H relay 1522 to battery. Relay 1522 thereupon operates and extends the hundreds conductors 1450 and 1451 incoming from Fig. 14 without change in their digital values. It has been assumed that conductor 1450 has been grounded indicative of the hundreds digit 0 for the total message units charge for the ticket being processed and, therefore, with relay 1522 operated, such conductor is extended over the inner contacts of relay 1522 and through the winding of the 0 hundreds translator relay 1500 to battery.

Relay 1500 upon operating establishes a circuit from ground over its No. 7 contacts, conductor 1510, the right No. 7 contacts of operated 0A relay 1602, the right No. 6 contact of the 0 relay 1600 through the winding of the 0 relay 1650 of the hundreds A register to battery. Thereupon relay 1650 operates and prepares a locking circuit at its left No. 1 contacts to locking ground conductor 2707, to which ground will be applied upon the subsequent operation of the W relay 2701. In addition, relay 1500 establishes a circuit extending from ground at the right No. 8 contacts of the 0A relay 1602, conductor 1615, the right No. 8 contacts of the 0 relay 1600, conductor 1515, the No. 5 contacts of the 0 relay 1500, conductor 1520, the right No. 2 contacts of relay 1602, the right No. 2 contacts of operated B relay 1603 and through the winding of the B relay 1653 of the hundreds A register to battery, whereupon, relay 1653 operates and at its right No. 1 contacts prepares a locking circuit for itself to ground on conductor 2707. As a further result of the operation of the B relay 1603 and the B relay 1653, a circuit is prepared for the K relay 2709 of Fig. 27 which may be traced from battery through its winding, conductor 2711, the left No. 1 contacts of relay 1653 to conductor 2766 or over the No. 1 right contacts of relay 1603 to conductor 2766, which becomes grounded when the progress switch 2750 of Fig. 27 advances at the end of the ticket processing.

The operation of the 0 relay 1650 of the tens A register has now been instrumental in adding the hundreds digit 0 of the charge in message units for the first processed ticket to the hundreds digit 0 registered by the 0 relay 1600 of the B register to produce a total hundreds digit 0 which, if the relay 2709 were operated at this time, would result in ground being connected to conductor 2720 over a circuit which may be traced from ground applied by the progress switch 2750 over conductor 2766, the left No. 7 contacts of the 0 relay 1650, conductor 2730, the No. 5 contacts of the K relay 2709 and to conductor 2720 whereby the teletypewriter would be controlled to print the hundreds digit 0 of the total message units.

A check circuit is now established to determine that either an A or B relay of the hundreds A register, that either an A or B relay of the hundreds B register, that only one register relay of each of the registers, that only one of the hundreds digit translator relays, that either an A or B relay of the tens A register, that either an A or B relay of the tens B register, that only one register relay of each of the tens registers, that only one relay of the tens translator relays, that either an A or B relay of the units A register, that either an A or B relay of the units B register, that only one register relay of each of the units registers and that only one of the units translator relays have been operated. If the check circuit is closed, the circuits are prepared for processing the next ticket in the stack.

Under the conditions previously assumed, the check circuit will be closed as follows: Ground at the left No. 4 back contact of the A relay 1651, the left No. 4 front contact of operated B relay 1653, the left No. 9 front contact of the operated 0 relay 1650 of the hundreds A register, conductor 1604, the left No. 9 back contacts of unoperated 1, 2, 3 and 4 relays 1751, 1752, 1753 and 1754, respectively, of the hundreds A register, the right No. 9 back contacts of the unoperated 4, 3, 2 and 1 relays 1704, 1703, 1702 and 1701 of the hundreds B register, conductor 1605, the right No. 9 front contact of the operated 0 relay 1600 of the hundreds B register, the right No. 4 front contact of the operated B relay 1603, the right No. 4 back contact of the unoperated A relay 1601, conductor 1606, the No. 8 front contact of the operated hundreds translator relay 1500, the lower back contacts of unoperated hundreds translator relays 1501, 1502, 1508 and 1509, conductor 1523, the lower No. 8 front contact of the operated tens translator relay 1900, the lower No. 7 back contacts of unoperated translator relays 1902, 1904, 1906 and 1908, the upper No. 7 back contacts of unoperated translator relays 1901, 1903, 1905, 1907 and 1909, conductor 1923, the left No. 4 back contact of unoperated A relay 2051 of the tens A register, the left No. 4 back contact of the B relay 2053, the left No. 9 front contact of the operated 0 relay 2050 of the tens A register, conductor 2004, the left No. 9 back contacts of the unoperated 1, 2, 3 and 4 relays 2151, 2152, 2153 and 2154, respectively, of the tens A register, the right No. 9 back contacts of the unoperated 4, 3, 2 and 1 relays 2104, 2103, 2102 and 2101 of the tens B register, conductor 2105, the right No. 9 front contact of the operated 0 relay 2000 of the tens B register, the right No. 4 front contact of the operated B relay 2003, the right No. 4 back contact of the unoperated A relay 2001, conductor 2005, the No. 8 back contacts of unoperated units translator relays 2300, 2302, 2304, 2306 and 2308, the No. 8 back contacts of unoperated translator relays 2301, 2303 and 2305, the No. 8 front contact of operated relay 2307, the upper back contact of unoperated relay 2309, conductor 2322, the left No. 4 contact of the operated A relay of the units A register, the left No. 4 back contact of the unoperated B relay of the units A register, the left No. 9 back contact of the unoperated 0 relay of the units A register, conductor 2404, the left No. 10 back contact of the unoperated 1 relay 2551 of the units A register, the left No. 10 front contact of the operated 2 relay 2552, the left No. 9 back contacts of the unoperated 3 and 4 relays 2553 and 2554 of the units A register, the right No. 9 back contacts of unoperated 4, 3, 2 and 1 relays 2504, 2503, 2502 and 2501, respectively, of the units B register, conductor 2505, the right No. 9 front contact of operated 0 relay 2400 of the units B register, the right No. 4 front contact of operated B relay 2403, the right No. 4 back contact of unoperated A relay 2401, conductor 2405 and thence over the lower normal contacts and through the winding of the W relay 2901 and through resistance 2912 to battery and also through the winding of the Z relay 2900 and through resistance 2913 to battery. Relay 2901 operates and locks over its lower alternate contacts to ground, but the winding of relay 2900, being shunted so long as ground remains applied to conductor 2505, does not operate.

Ground on conductor 2405 in a similar manner causes the operation and locking of the W relay 2801 and the operation and locking of the W relay 2701 and such ground is also extended to Fig. 7 where, with the end of record register relays 709 and 711 both operated, it is instrumental in causing the operation of relay 714. Relay 714 upon operating locks over its inner contacts to ground bus-bar 105 and initiates the advance of the reader to process the next ticket in the stack and to prepare the calculating circuits for calculating the charge in message units for the next ticket.

When relay 2701 operates it removes ground at its upper back contact from conductor 2703 thereby releasing the operated 0A relay 1602, the operated B relay 1603 and the operated 0 relay 1600 of the hundreds B register preparatory to registering the hundreds digit of the message units charge for the next ticket to be processed on the relays of the hundreds B register. At its upper front contact relay 2701 connects ground to conductor 2707 to complete the locking circuits of the previously operated B relay 1653 and 0 relay 1650 of the hundreds A register. As soon as the previously traced check circuit is opened by the release of relays 1602 and 1603, ground is removed from conductor 2405 and the Z relay 2700 operates in a circuit from ground over the lower alternate contacts of relay 2701 through its winding and resistance 2713 to battery thereby establishing a circuit for the 0B relay 1652 which may be traced from ground on conductor 109 over the inner upper front contact of relay 2700, conductor 2714, the left back contact of the 0A relay 1602 and through the winding of the 0B relay 1652. The hundreds section of the adding and storing circuits is now prepared for receiving another hundreds digit registration. Relay 2700 also causes the operation of the P relay 2702 over an obvious circuit and such relay locks to ground on conductor 109 and opens at its back contacts the initial operating circuits for the 0A relay 1602 and the B relay 1603.

In a similar manner the operation of the W relay 2801 removes ground from conductor 2803 thereby causing the release of operated 0A relay 2002, the operated B relay 2003 and the operated 0 relay 2000 of the tens B register preparatory to registering the tens digit of the message units charge for the next processed ticket on the relays of the tens B register. At its upper front contact, relay 2801 connects ground to conductor 2807 to complete the locking circuits of the previously operated B relay 2053 and 0 relay 2050 of the tens A register. As soon as ground is removed from conductor 2405 as previously described, the Z relay 2800 operates over the locking ground of relay 2801 and establishes the circuit of the 0B relay 2052 which extends from ground on conductor 109, inner upper front contact of relay 2800, conductor 2814, left back contact of relay 2002 and through the winding of the 0B relay 2052 to battery. Relay 2800 also causes the operation of the P relay 2802 which locks to ground on conductor 109 and opens at its back contacts the initial operating circuits for the 0A relay 2002 and the B relay 2003.

In a similar manner the operation of the W relay 2901 removes ground from conductor 2903 thereby causing the release of operated 0A relay 2402, the operated B relay 2403 and the operated 0 relay 2400 of the units B register preparatory to registering the units digit of the message units charge for the next processed ticket on the relays of the units B register. At its upper front contact, relay 2901 connects ground to conductor 2907 to complete the locking circuits of the previously operated A relay 2451 and 2 relay 2552 of the units A register. As soon as ground is removed from conductor 2405 as previously described, the Z relay 2900 operates over the locking ground of relay 2901 and establishes the circuit of the 0B relay 2452 which may be traced from ground on conductor 109, inner upper front contact of relay 2900, conductor 2914, left back contact of relay 2402 and through the winding of the 0B relay 2452 to battery. Relay 2900 also causes the operation of the P relay 2902 which locks to ground on conductor 109 and opens at its back contacts the initial operating circuits for the 0A relay 2402 and the B relay 2403.

It will be recalled that as a result of the completion of the check circuit and the application of ground to conductor 2405, relay 714 operated and locked. Upon its operation, relay 714 applies ground to conductor 715 and with relay 508 unoperated a circuit is completed from conductor 715 over the left back contact of relay 508, conductor 510 and through the winding of the AV relay 123 which thereupon operates and locks under the control of the reader; opens at its right back contact the locking circuit of the RC relay 122 which thereupon releases; at its right front contact establishes a circuit for advancing the reader for processing the next ticket in the stack and at its left back contact removes ground from off-normal ground bus-bar 105. The removal of ground from bus-bar 105 releases all of the operated register relays of Figs. 2 to 7 inclusive, and relay 714 of Fig. 7. The release of the RC relay 122 reconnects ground at its upper right back contact to conductor 106 whereupon the transfer relays 200, 220, etc., and the progress relays 201, 221, etc., reoperate preparatory to enabling the registration of the record data on the next ticket to be processed by the reader 100. The release of the register relays of Figs. 2 to 7 inclusive, in turn causes the release of all operated relays of the computing circuits of Figs. 8 to 14 inclusive, but since ground has not been removed from ground bus 109, the operated relays of the adding and storing circuits of Figs. 15 to 25 inclusive, and the operated W, Z and P relays of Figs. 27, 28 and 29 remain operated. When 0A relay 2402 released as previously described, the circuit of the NC—T relay 1800 of Fig. 18 was opened and such relay released in turn releasing the NC—H relay 1522 of Fig. 15. When the reader has advanced to read the second ticket in the stack, the locking circuit of relay 123 is opened by the reader and such relay releases.

The reader now proceeds to process the second ticket and to cause the registration of the data thereon in the registers of Figs. 2 to 7 inclusive, in the manner previously described. Since the calling line directory number is the same as for the previously processed ticket, the calling zone relay 834 will be operated as before. The office code of the called subscriber's directory number registered by Called Code A, B and C registers of Figs. 4 and 5 may be the same or different resulting in the operation of one of the called zone relays, such as 934, and with the calling zone and called zone relays operated one of the route charge relays, such as 836, will be operated to determine the charging rate to be applied for the toll call. To simplify the description, however, it will be assumed that the same charge route relay 836 is used as was used in processing the first ticket. In the manner previously described, a computation of the charge in message units for the second ticketed call is made by the computing circuits in accordance with the charge rate determined by relay 836 and in accordance with the registered elapsed time for the call.

It will be assumed that a total charge for the call is calculated to be 005 message units as will be indicated by grounding conductors 1450, 1440 and 1465 outgoing from the circuit of Fig. 14. With the A relay 2201 of Fig. 22 still operated, conductor 1465 is extended over the left No. 1 contacts of relay 2201, over conductor 2215 and through the winding of the units translator relay 2305 to battery on conductor 2203.

Relay 2305 upon operating establishes a circuit from ground over its No. 6 contacts, conductor 2310, the left No. 7 contacts of the 0B relay 2452, conductor 2460, the left No. 6 contacts of operated 2 relay 2552 of the units A register and through the winding of the 2 relay 2502 of the units B register to battery whereupon relay 2502 operates and at its right No. 1 contacts prepares a locking circuit for itself to ground supply conductor 2903. In addition, relay 2305 establishes a circuit extending from ground at the left No. 8 contacts of the 0B relay 2452, conductor 2416, the left No. 8 contacts of the 2 relay 2552, conductor 2317, the No. 3 contacts of translator relay 2305, conductor 2321, the left No. 1 contacts of the 0B relay 2452, the left No. 3 contacts of operated A relay 2451 and to battery through the winding of the B relay 2403. Thereupon relay 2403 operates and prepares a locking circuit for itself over its left No. 1 contacts to ground supply conductor 2903. As a further result of the operation of the B relay 2403 a circuit is prepared for relay 2909 of Fig. 29 for applying the output of the units section of the adding and storing circuits to the teletypewriter control circuits. This circuit may be traced from battery through the winding of relay 2909, conductor 2911, the right No. 1 contacts of relay 2403 to conductor 2768, which conductor becomes grounded when the progress switch 2750 of Fig. 27 advances at the end of the ticket processing.

The operation of the 2 relay 2502 of the units B register has now been instrumental in adding the units digit 5 of the charge in message units for the second processed ticket to the units digit 7 for the first processed ticket registered by the 2 relay 2552 of the A register to produce a total units digit 2 with a carry-over of 1 into the tens place which, if the relay 2909 were now operated, would result in ground being applied to conductor 2722 over a circuit which may be traced from ground applied to conductor 2768 by the progress switch 2750 over the No. 7 contacts of the 2 relay 2502 of the units B register, conductor 2922 and over the No. 3 contacts of the K relay 2909 to conductor 2722 whereby the teletypewriter would be controlled to print the units digit 2 of the total message units.

Since the units digit of the total message units now registered on the units B register is 2 or a digit less in value than the units digit previously registered in the units A register, it becomes necessary to carry one over into the tens register section of the adding and storing circuits and therefore a circuit is established for the carry-one tens (CI—T) relay 1801 of Fig. 18 which may be traced from ground over the left No. 2 contacts of the B relay 2403, the right No. 2 contacts of the A relay 2451, the right No. 2 contacts of the 0B relay 2452, conductor 2207, the upper No. 3 contacts of the ADD relay 2200, conductor 2208 and to battery through the winding of relay 1801. Relay 1801 thereupon operates and extends the tens group of conductors 1440 to 1449, inclusive, outgoing from the circuits of Fig. 14 over its contacts to the conductors 1810 to 1819, inclusive, with a slip of one in the digital values. It has been assumed that conductor 1440 has been grounded, indicative of the tens digit 0 for the total message units charged for the second ticket being processed and, therefore, with relay 1801 operated, such conductor is extended over the right No. 5 contacts of relay 1801 to conductor 1811 and thence through the winding of the tens 1 relay 1901 to battery on conductor 1803.

Relay 1901 upon operating establishes a circuit from ground over its No. 6 contacts, conductor 1911, the left No. 6 contacts of operated 0B relay 2052, conductor 2061, the left No. 5 contacts of the operated 0 relay of the tens A register, conductor 2071 and through the winding of the 1 relay 2101 of the tens B register to battery. Thereupon relay 2101 operates and prepares a locking circuit at its right No. 1 contacts to locking ground conductor 2803. In addition, relay 1901 establishes a circuit extending from ground at the left No. 8 contacts of the 0B relay 2052, conductor 2016, the left No. 8 contacts of the 0 relay 2050 of the tens A register, conductor 1915, the No. 5 contacts of the translator relay 1901, conductor 1920, the left No. 2 contacts of the 0B relay 2052, the left No. 2 contacts of the B relay 2053 of the tens A register and through the winding of the B relay 2003 of the tens B register to battery, whereupon relay 2003 operates and at its left No. 1 contacts prepares a locking circuit for itself to locking ground on conductor 2803. As a further result of the operation of the B relay 2003 a circuit is prepared for the K relay 2809 of Fig. 28 which may be traced from battery through its winding, conductor 2811, the right No. 1 contacts of relay 2003 to conductor 2767, which conductor becomes grounded when the progress switch 2750 of Fig. 27 advances at the end of the ticket processing.

The operation of the 1 relay 2101 of the tens B register has now been instrumental in adding the tens digit 1 of the charge in message units for the second processed ticket to the tens digit 0 for the first processed ticket registered by the 0 relay 2050 of the tens A register to produce a total tens digit 1 which will result in ground being connected to the conductor 2721 over a circuit which may be traced from ground applied by the progress switch 2750 over conductor 2767, the right No. 7 contacts of the 1 relay 2101, conductor 2821, the No. 4 contacts of the K relay 2809 and to conductor 2721 whereby the teletypewriter would be controlled to print the tens digit 1 of the total message units.

Since the tens digit of the total message units now registered in the tens B register is 1 there is no necessity for causing a one carry-over into the hundreds register section of the adding and storing circuits and therefore a circuit is established for the no-carry hundreds (NC—H) relay 1522 of Fig. 15. This circuit may be traced from ground over the right No. 3 contacts of the B relay 2053 of the tens A register, the left No. 3 contacts of the B relay 2003 of the tens B register, conductor 2017, the left contacts 1 of the 1 relay 2101 of the tens B register, over the back contacts 2 of the unoperated Nos. 1, 2, 3 and 4 relays 2151, 2152, 2153 and 2154 of the tens A register, conductor 2106, the right No. 3 contacts of the 0B relay 2052, conductor 2018, the lower No. 1 contacts of the ADD relay 2200 and conductor 1804 through the winding of relay 1522 to battery. Relay 1522 therefore operates and extends the hundreds conductors 1450 and 1451 without change in the digital values. It has been assumed that conductor 1450 has been grounded indicative of a hundreds digit 0 for the total message unit charge for the ticket being processed and, therefore, with relay 1522 operated, such a conductor is extended over the inner contacts of relay 1522 and through the winding of the 0 hundreds translator relay 1500 to battery.

Relay 1500 upon operating establishes a circuit from ground over its No. 7 contacts, conductor 1510, the left No. 7 contacts of operated 0B relay 1652, the left No. 6 contacts of the 0 relay 1650 of the hundreds A register to battery through the winding of the 0 relay 1600 of the hundreds B register whereupon relay 1600 operates and prepares a locking circuit for itself over its right No. 1 contacts to locking ground conductor 2703. In addition, relay 1500 establishes a circuit extending from ground at the left No. 8 contacts of the 0B relay 1652, conductor 1616, the left No. 8 contacts of the 0 relay 1650, conductor 1515, the No. 5 contacts of relay 1500, conductor 1520, the left No. 2 contacts of relay 1652, the left No. 2 contacts of the B relay 1653 and to battery through the winding of B relay 1603 of the hundreds B register whereupon relay 1603 operates and at its left No. 1 contacts prepares a locking circuit for itself to ground on locking conductor 2703. As a result of the operation of the B relay 1603 a circuit is prepared as previously described for the K relay 2709 of Fig. 27 which becomes effective upon the subsequent advance of the progress switch of Fig. 27.

The operation of the 0 relay 1600 of the hundreds B register has now been instrumental in adding the hundreds digit 0 of the charge in message units for the second processed ticket to the previously stored hundreds digit 0 for the first processed ticket to produce a total hundreds digit 0 which, if relay 2709 was operated at this time would result in ground being connected to conductor 2720 over a circuit which may be traced from ground applied by the progress switch 2750, over conductor 2766, the right No. 7 contacts of the 0 relay 1600 of the hundreds B register, conductor 2730, the No. 5 contacts of the K relay 2709 and to conductor 2720, whereby the teletypewriter would be controlled to print the hundreds digit 0 of the total message units.

The check circuit is now established to determine that the correct number of relays in each section of the adding and storing circuits have been operated and such circuit may be traced from ground at the left No. 4 back contact of unoperated A relay 1651, thence in a manner similar to that previously described, over front contacts of operated relays, and back contacts of unoperated relays of the hundreds, tens and units sections of the adding and storing circuits to conductor 2405. This ground is applied over the lower front contact of the Z relay 2900 to a point between the winding of the W relay 2901 and resistance 2912, resulting in the shunting down of relay 2901 which, upon releasing opens the operating circuit of the Z relay 2900 at its lower alternate contacts but connects the grounded conductor 2405 over its lower normal contacts to hold relay 2900 operated. In a similar manner the W relays 2801 and 2701 are shunted down by ground on conductor 2405 and the Z relays 2800 and 2700 are held operated to the ground on conductor 2405. When the W relays 2901, 2801 and 2701 release, they apply ground over their upper back contacts to conductors 2903, 2803 and 2703 respectively to complete the locking circuits of the operated relays of the units, tens and hundreds B registers and at their front contacts remove ground from conductors 2907, 2807 and 2707 respectively to open the locking circuits of the operated relays of the units, tens and hundreds A registers which were operated during the processing of the first ticket. Upon the release of such relays the check circuit is opened and ground is thereby removed from conductor 2405 whereupon the Z relays 2700, 2800 and 2900 release removing ground from conductors 2714, 2814 and 2914 respectively to release the operated 0B relays 1652, 2052 and 2452 and to cause the operation of the 0A relays 1602, 2002 and 2402. With the latter relays operated the adding and storing circuits are prepared to register the digits of the message units for the next processed ticket on the A registers.

Also in response to the connection of ground to conductor 2405 the registers of Figs. 2 to 7, inclusive, are released, the operated relays of the computing circuits are released and the reader is advanced to process the next or third ticket in the stack. In the manner previously described, successive tickets in the stack of the subscriber's account are processed and calculated charges therefor are alternately registered on the A and B registers of the adding and storing circuits. When all of the toll tickets have thus been processed it will be assumed that the message units for the last processed toll ticket have been registered on the B registers of the adding and storing circuits and that following such registration the circuits have functioned as just described to prepare for the registration of message units digits on the A registers and to advance the reader to process the next ticket in the stack. It will also be assumed that the B registers have been operated to register a total 085 message units for all of the toll calls. This will be indicated by the operated 0 relay 1600 of the hundreds B register by the operated 3 relay 2103 of the tens B register and by the operated 0 relay 2500 of the units B register.

Processing Ticket for Local Call Message Unit

It will be assumed that during the billing period, the subscriber whose bill is being prepared, used sixty-seven message units and that a local call ticket has been prepared for processing by the reader 100 which contains the office code and numerical digits of the subscriber's directory number, a special three-digit number indicative of the fact that the ticket is for local call message units, three digits 0, 6, 7 indicative of the number of message units used by the subscriber for local calls, an arbitrary digit which has no accounting significance and an end of record indication.

Figure 2:
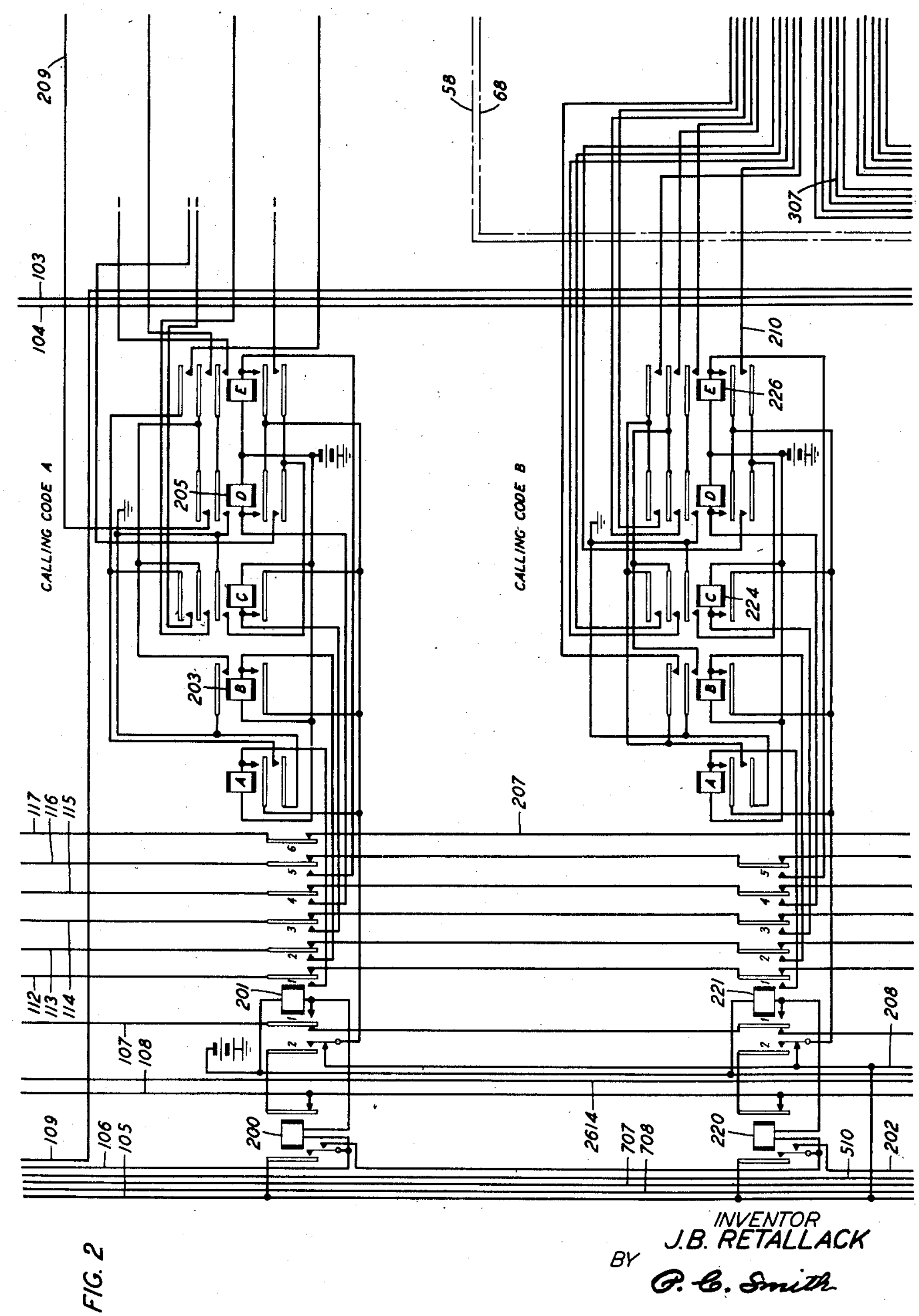
Fig. 2 shows the A and B calling office code registers of the computer.
Figure 3:
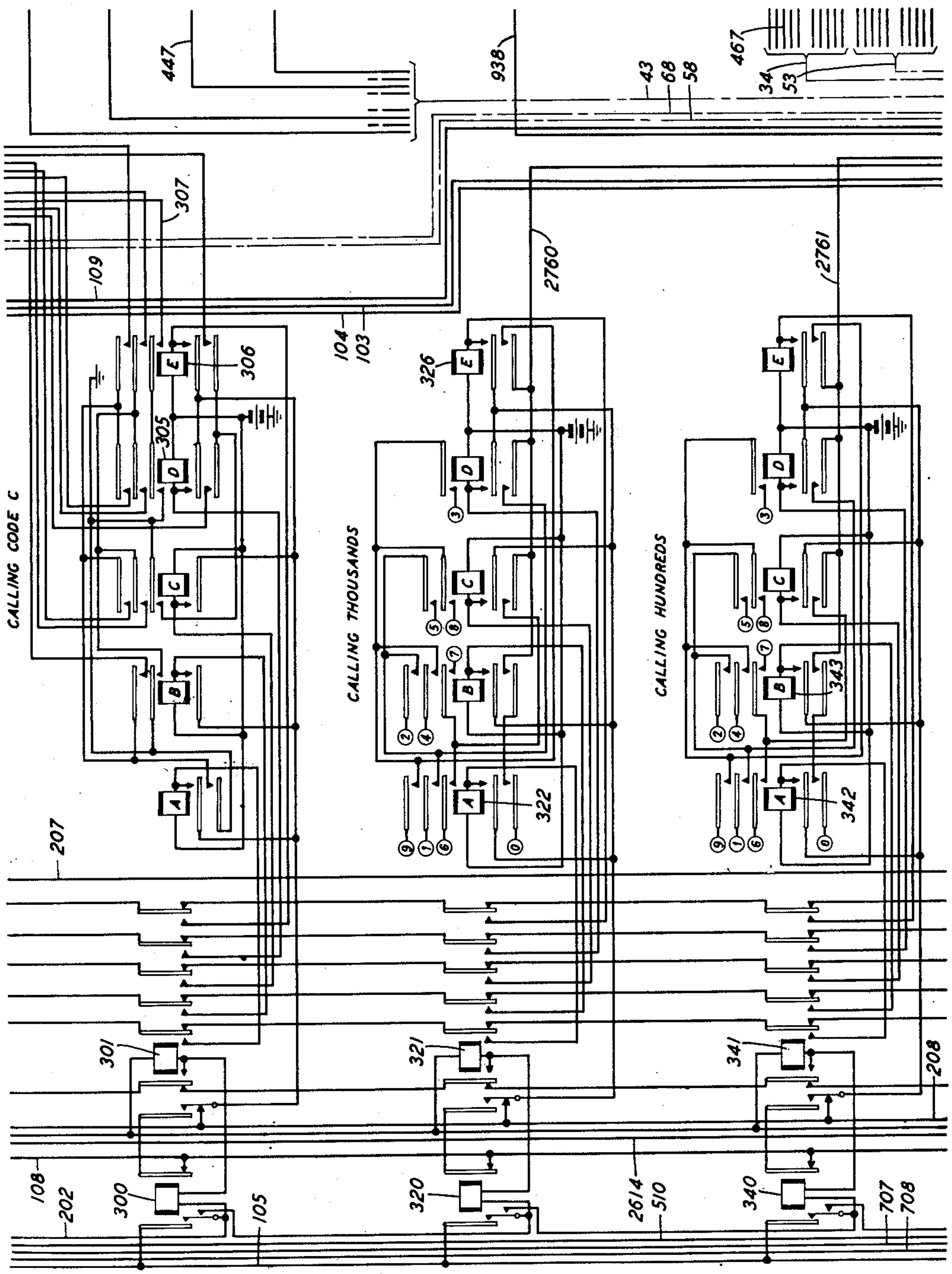
Fig. 3 shows the C calling office code register and the registers for registering the thousands and hundreds numerical digits of the calling line number.
Figure 4:
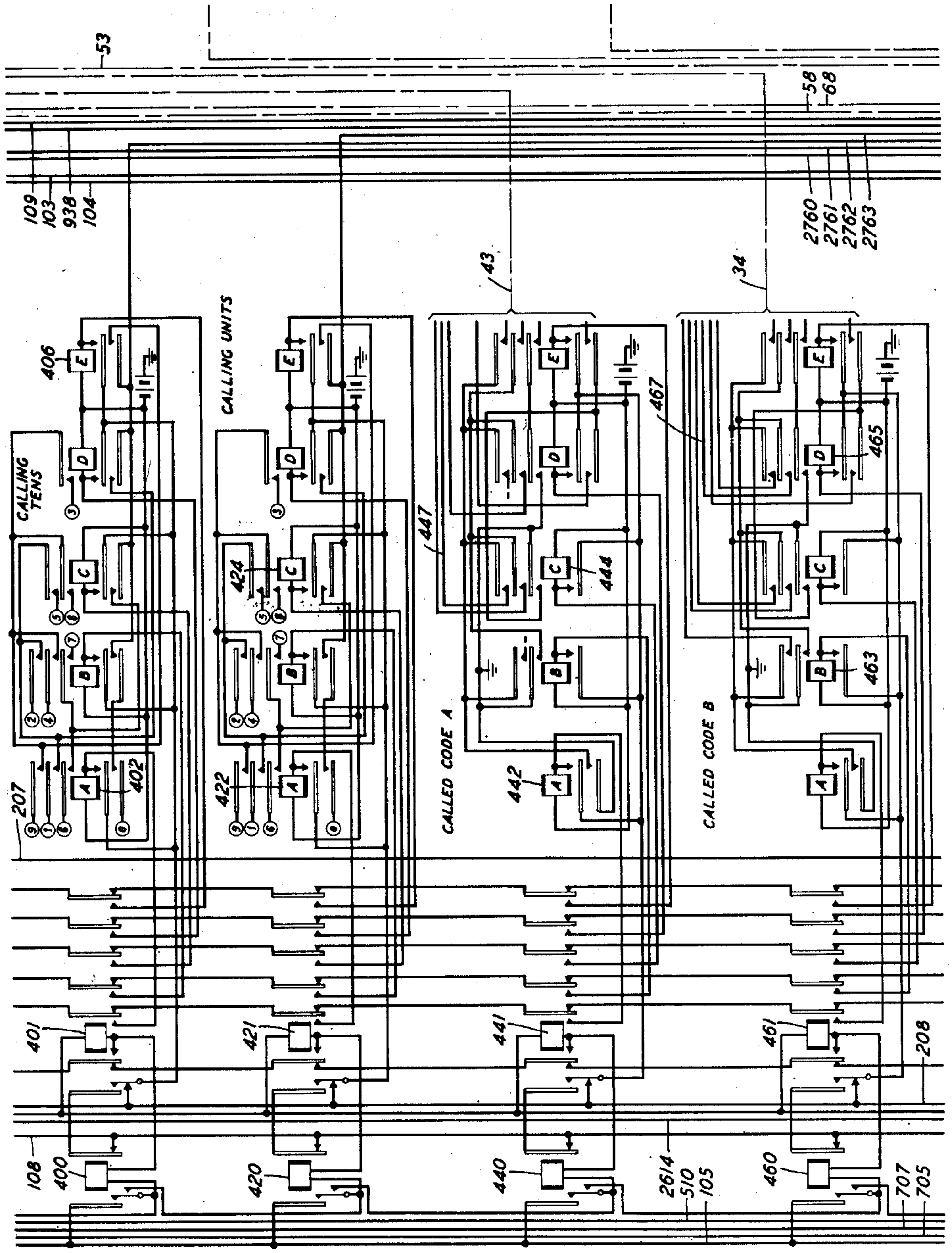
Fig. 4 shows the registers for registering the tens and units digits of the calling line number and the A and B called office code registers.
Figure 5:
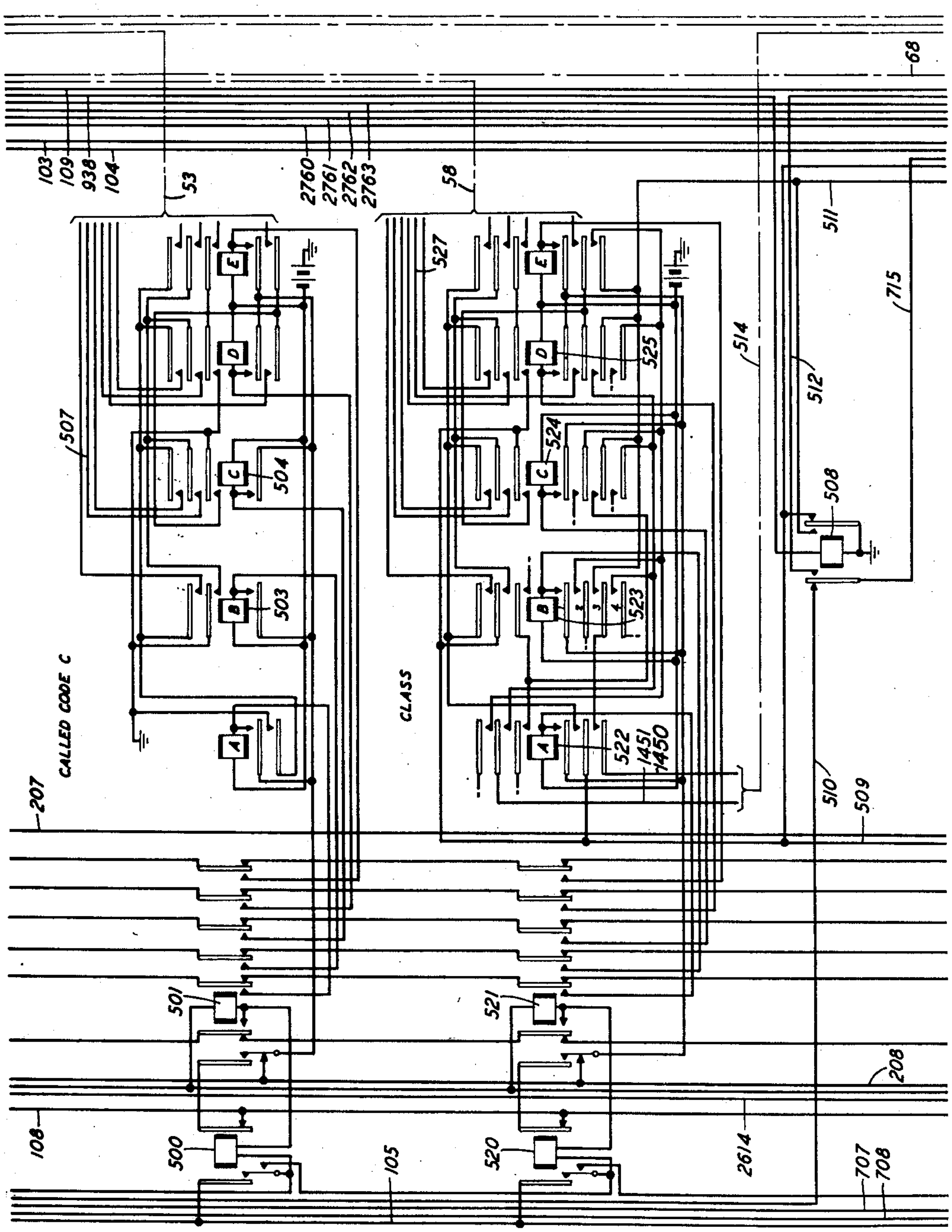
Fig. 5 shows the C called office code register, a register for registering either the calling line class or, in response to the operation of the route transfer relay, the hundreds digit of the number of local-call message units and a special route transfer relay.

The reader 100 in response to reading the ticket causes the registration of the office code and the numerical digits of the directory number of the subscriber for whom the account is being calculated, on the Calling Code A and Calling Code B registers of Fig. 2, on the Calling Code C, Calling Thousands and Calling Hundreds registers of Fig. 3 and the Calling Tens and Calling Units registers of Fig. 4, causes the registration of the three digits of the special number to be registered on the Called Code A and Called Code B registers of Fig. 4 and on the Called Code C register of Fig. 5, causes the hundreds, tens and units digits of the number of local call message units to be registered on the Class, Rate and Elapsed Time Tens registers of Figs. 5 and 6 and the arbitrary digit to be registered on the Elapsed Time Units register of Fig. 7 and causes the end-of-record indication to be registered on relays 709 and 711 of Fig. 11.

The registration of the calling office code digits is instrumental, through the calling office code translator of Fig. 8, in operating the calling zone relay 834. The operation of relay 834 and the registration of numerical digits of the calling line number will become effective under the control of the progress switch as will hereinafter be described to control the teletypewriter to print the directory listing of the subscriber whose account is being processed on a bill or ticket. The registration of the three special code digits on the called code registers is effective in the manner previously described to control the called office code translator of Fig. 9 to operate a special called zone relay 935 which in turn establishes a circuit from battery over the outer right contacts of relay 935, over conductor 938 and through the winding of transfer relay 508 of Fig. 5. The operation of relay 508 removes ground from conductor 509 thereby rendering the transfer of registrations from the Class register of Fig. 5, from the Rate and Elapsed Time Tens registers of Fig. 6 and from the Elapsed Time Units register of Fig. 7 to operate a class relay such as 839 of Fig. 8, to operate a route charge relay such as 836 of Fig. 8, or to set the tens and units elapsed time registers of Fig. 10, ineffective. Relay 508 is however effective to cause the transfer of the registrations of the hundreds, tens and units digits from the Class, Rate and Elapsed Time Tens registers to the conductors 2720 to 2729 inclusive of Fig. 27 under the control of progress switch 2750 to control the teletypewriter.

It has been assumed that the digits 0, 6 and 7 have been registered on the Class, Rate and Elapsed Time Tens registers and therefore in accordance with the preceding table the A relay 522 and the B relay 523 of the Class register, the A relay 602 and C relay 604 of the Rate register and the B relay 623 and C relay 624 of the Elapsed Time Tens relays have been operated and locked. With ground connected to conductor 511, over the right front contact of relay 508, and relays 522 and 523 operated, such ground is extended from conductor 511 over the lower No. 3 contacts of relay 523 and the lowermost contacts of relay 522 to conductor 1450 extending through cable 514 to Fig. 14. With ground connected to conductor 511 and relays 602 and 604 operated, such ground is extended from conductor 511, over the lower No. 3 contacts of relay 604 and the inner upper contacts of relay 602 to conductor 1446 extending through cable 614 to Fig. 14. With ground connected to conductor 511 and relays 623 and 624 operated, such ground is extended from conductor 511, over the lower No. 3 contacts of relay 624, the upper No. 1 contacts of relay 623 to conductor 1467 of cable 650 extending to Fig. 14.

It has been assumed that the 0 relay 1600, the 3 relay 2103 and the 0 relay 2400 of the B registers of the adding and storing circuits have been operated to register the digits 0, 8 and 5 of the total message units for all the toll calls, that the 0A relays 1602, 2002 and 2402, the B relay 1603 of the hundreds B register, the A relay 2001 of the tens B register and the A relay 2401 of the units B register have been operated. With the ADD relay 2200 and the A relay 2201 of Fig. 22 still operated, conductor 1467 is extended over the left No. 3 contacts of relay 2201, over conductor 2217 and through the winding of the units translator relay 2307 to battery on conductor 2203.

Relay 2307 upon operating establishes a circuit from ground over its No. 6 contacts, conductor 2312, the right No. 5 contacts of the 0A relay 2402, conductor 2412, the right No. 4 contacts of the 0 relay 2400 of the units B register, conductor 2422 and through the winding of the 2 relay 2552 of the units A register to battery, whereupon relay 2552 operates and at its left No. 1 contacts prepares a locking circuit for itself to ground supply conductor 2907. In addition relay 2307 establishes a circuit extending from ground at the right No. 8 contacts of the 0A relay 2402, conductor 2415, the right No. 8 contacts of the 0 relay 2400, conductor 2315, the No. 1 contacts of relay 2307, conductor 2321, the right No. 1 contacts of 0A relay 2402, the right No. 2 contacts of the A relay 2401 and through the winding of the B relay 2453 to battery, whereupon relay 2453 operates and prepares a locking circuit for itself over its right No. 1 contacts to ground supply conductor 2907. As a further result of the operation of the B relay 2453 a circuit is prepared for the K relay 2909 of Fig. 29, as previously described, for applying the output of the units section of the adding and storing circuits to the teletypewriter control circuits.

The operation of the 2 relay 2552 of the units A register has now been instrumental in adding the units digit 5 of the charge in message units for the local calls to the digit 7 for the toll message units for all toll calls registered by the operated 0 relay 2400, to produce a total units digit 2 with a carry-over of 1 into the tens place which, if the relay 2909 were now operated would result in ground being applied to conductor 2722 over a circuit which would be traced from ground applied to conductor 2768 by the progress switch 2750, over the left No. 7 contacts of the 2 relay 2552, conductor 2922, the No. 3 contacts of relay 2909 and to conductor 2722 whereby the teletypewriter would be controlled to print the units digit 2 of the total message units.

Since the units digit of the total message units now registered in the units A register is 2, or a digit less in value than the units digit 5 previously registered, it becomes necessary to carry one over into the tens section of the adding and storing circuits and therefore a circuit is established for the carry-over tens relay 1801 of Fig. 18, which may be traced from ground at the left No. 2 contacts of the A relay 2401, the right No. 2 contacts of the B relay 2453, the left No. 3 contacts of 0A relay 2402 conductor 2207, the upper No. 3 contacts of relay 2200, conductor 2208 and through the winding of relay 1801 to battery. Relay 1801 thereupon operates and extends the tens group of conductors 1440 to 1449, inclusive, outgoing from the Rate register of Fig. 6 over its contacts to the conductors 1810 to 1819, inclusive, with a slip of one in digital values. It has been assumed that conductor 1446 has been grounded indicative of a tens digit 6 for the message units for local calls and therefore, with relay 1801 operated, such conductor is extended over its left No. 2 contacts to conductor 1817 and thence through the winding of the 7 tens translator relay 1907 to battery on conductor 1803.

Relay 1907 upon operating establishes a circuit from ground over its No. 6 contacts, conductor 1912, the right No. 5 contacts of 0A relay 2002, conductor 2012, the right No. 4 contacts of the 3 relay 2103, conductor 2020 and through the winding of the 0 relay 2050 of the tens A register to battery. Thereupon relay 2050 operates and prepares a locking circuit for itself over its left No. 1 contacts to ground supply conductor 2807. In addition, relay 1907 establishes a circuit extending from ground at the right No. 8 contacts of the 0A relay 2002, conductor 2015, the right No. 8 contacts of the 3 relay 2103, conductor 1918, the No. 4 contacts of relay 1907, conductor 1920, the right No. 2 contacts of 0A relay 2002, the right No. 2 contacts of the A relay 2001 of the tens B register, through the winding of the A relay 2051 of the tens A register to battery, whereupon relay 2051 operates and prepares a locking circuit for itself over its right No. 1 contacts to ground supply conductor 2707. As a further result of the operation of the A relay 2051 a circuit is prepared for the J relay 2808 of Fig. 28, which may be traced from battery through its winding, conductor 2810, the left No. 1 contacts of relay 2051 and to conductor 2767, which conductor becomes grounded when the progress switch 2750 of Fig. 27 advances at the end of the ticket processing.

The operation of the 0 relay 2050 of the tens A register has now been instrumental in adding the tens digit 6 of the charge in message units for the local calls to the tens digit 8 for the total message units for the toll calls registered by the 3 relay 2103 of the tens B register, to produce a total tens digit 8 which will result in ground being connected to conductor 2725 over a circuit which may be traced from ground applied by the progress switch 2750, over conductor 2767, the left No. 7 contacts of the 0 relay 2050, conductor 2820, the No. 5 contacts of the J relay 2808 to conductor 2725 whereby the teletypewriter would be controlled to print the tens digit 5 of the total message units.

Since the tens digit of the total message units now registered in the A register is 5 or less than the tens digit 8 previously registered by the operation of the 3 relay 2103 of the tens B register, it becomes necessary to carry a one over into the hundreds section of the adding and storing circuits and therefore a circuit is established for carry-one hundreds (CI—H) relay 1524 which may be traced from ground, over the right No. 3 contacts of the A relay 2051 of the tens B register, the left No. 3 contacts of the A relay 2001 of the tens B register, conductor 2017, the left No. 1 contacts of the 3 relay 2103 of the tens B register, the right No. 2 back contacts of the 3 and 4 relays 2153 and 2154 of the tens A register, conductor 2106, the left No. 3 contacts of the 0A relay 2002, conductor 2019, the lower No. 2 contacts of the ADD relay 2200 and conductor 2209 through the winding of relay 1524 to battery. Relay 1524 thereupon operates and extends the hundreds conductors 1450 and 1451 with a slip of one in their digital values to the windings of the hundreds translator relays 1501 and 1502. It has been assumed that conductor 1450 has been grounded indicative of a hundreds digit 0 for the total message units for local calls and therefore with relay 1524 operated, such conductor is extended over the inner left contacts of relay 1524 and through the winding of the translator relay 1501 to battery.

Relay 1501 upon operating establishes a circuit from ground over its No. 6 contacts, conductor 1511, the right No. 6 contacts of 0A relay 1602, conductor 1611, the right No. 5 contacts of the 0 relay 1600 of the hundreds B register, conductor 1621 and through the winding of the 1 relay 1751 of the hundreds A register to battery, whereupon relay 1751 operates and prepares a locking circuit for itself over its left No. 1 contacts to ground supply conductor 2707. In addition, relay 1501 establishes a circuit extending from ground at the right No. 8 contacts of the 0A relay 1602, conductor 1615, the right No. 8 contacts of the 0 relay 1600, conductor 1515, the No. 1 contacts of relay 1501, conductor 1520, the right No. 2 contacts of 0A relay 1602, the right No. 2 contacts of the B relay 1603 of the hundreds B register and through the winding of the B relay 1653 of the hundreds A register to battery. Relay 1653 thereupon operates and prepares a locking circuit for itself over its right No. 1 contacts to ground supply conductor 2707. As a further result of the operation of the B relay 1653 a circuit is prepared, as previously described, for the K relay 2709 of Fig. 27 which becomes effective upon the subsequent advance of the progress switch 2750 of Fig. 27.

The operation of the 1 relay 1751 of the hundreds A register has now been instrumental in adding the hundreds digits of the charge in message units for the toll calls and the local calls to produce a hundreds digit 1 which, if relay 2709 were operated at this time would result in ground being connected to conductor 2721 over a circuit which may be traced from ground applied by the progress switch, over conductor 2766, the left No. 7 contacts of the 1 relay 1751 of the hundreds A register, conductor 2731, the No. 4 contacts of the K relay 2709 and to conductor 2721 whereby the teletypewriter would be controlled to print the hundreds digit 1 of the total message units. The total message units now registered by the A registers of the adding and storing circuits is 152.

A check circuit is now established to determine that the correct number of relays in each section of the adding and storing circuits have been operated and such circuit may be traced in part from ground at the left of No. 4 contacts of unoperated A relay 1651, thence in the manner previously described over front contacts of operated relays and over back contacts of unoperated relays of the hundreds, tens and units sections of the adding and storing circuits to conductor 2405. This ground on conductor 2405 is now applied over the lower normal contacts and through the windings of the W relays 2701, 2801 and 2901 which operate and lock, and also through the winding of relay 714 which operates and locks. When the W relays operate they remove ground at their upper back contacts from conductors 2703, 2803, and 2903 and thereby cause the release of the operated B relay 1603 and 0 relay 1600 of the hundreds B register, the release of the operated A relay 2001 and 3 relay 2103 of the tens B register, and the release of the operated A relay 2401 and 4 relay 2504, of the units B register. The W relays at their upper front contacts connect ground to conductors 2707, 2807 and 2907 whereby the locking circuits for the operated relays of the hundreds, tens and units A registers are completed. When the relays of the B registers release upon the operation of the W relays, ground is removed from conductor 2405 and the Z relays 2700, 2800 and 2900 operate in the locking circuits of the W relays and at their inner back contacts remove ground from conductors 2706, 2806 and 2906 to cause the release of the operated 0A relays 1602, 2002 and 2402 and, at their inner front contacts, connect ground to conductors 2714, 2814 and 2914 to cause the operation of the 0B relays 1652, 2052 and 2452. The adding and storing circuits are now conditioned to store digits in their B registers. The reader is advanced in the manner previously described under the control of relay 714.

Subtracting a Credit of Message Units

A situation may arise where it is desirable to credit a subscriber's account with message units as, for example, when he has been overcharged on a previous bill. In this case a credit ticket is prepared for processing by the reader. This ticket is similar to the ticket used for adding message units for local calls but in processing the key 102 is operated to its lower or Subtract position thereby releasing the ADD relay 2200 and the A relay 2201 and establishing a circuit from ground over its lower contacts, conductor 104 and through the winding of the SUB relay 2220 to battery. Relay 2220 operates and establishes an obvious circuit for the S relay 2221.

It is well known that substraction of one number from another (and specifically in the cases to be performed by the circuits under consideration from a larger number by a smaller number) can be carried out by two distinct methods. The first of these methods is the usual arithmetical subtraction and the second, is subtraction by adding the complement of the subtrahend. These two methods may be illustrated as follows:

*Ordinary arithmetic*

| | | | |
|---|---|---|---|
| | 9 | 8 | 7 |
| | −1 | 3 | 2 |
| Remainder | 8 | 5 | 5 |

*Subtraction by adding complement*

| | | | | | | | | | | | |
|---|---|---|---|---|---|---|---|---|---|---|---|
| | 1 0 | — | 0 | — | 0 | | 9 | + | 8 | + | 7 |
| − | 1 | β | 3 | β | 2 | +Complement | 8← | | 6← | | 8 |
| Complement | 8 | | 6 | | 8 | Remainder | 8 | | 5 | | 5 |

Note.—The symbol β indicates that one is borrowed from the next higher digit.

The arithmetic type of subtraction has been employed herein by the subtracting circuits of Fig. 10 in which different values of initial periods of conversation are subtracted from the total period of conversation to secure the total overtime period. For each digital value to be subtracted a separate relay is required as shown in Fig. 10.

In order to perform the operation of subtraction by means of relays with a minimum modification of the circuit from its arrangement for addition, it has been found expedient to introduce variations in the ordinary method of performing subtraction by the addition of the complement of the subtrahend. In the above example it will be noted that the complement will be obtained by giving due regard to the borrowing from the next higher digit in each case. However, in performing subtraction by means of relays, the complement used is obtained by subtracting each digit individually from ten with no regard for borrowing from the higher digit. Thus, the complements of all digits may be represented by the following:

| | | | | | | | | | | |
|---|---|---|---|---|---|---|---|---|---|---|
| Digit Value | 0 | 1 | 2 | 3 | 4 | 5 | 6 | 7 | 8 | 9 |
| Complement | 0* | 9 | 8 | 7 | 6 | 5 | 4 | 3 | 2 | 1 |

*This complement is really a ten but is treated as a zero by the circuit.

At this point it will become obvious that the only circuit modification necessary to adapt the adding circuit to the operation of subtraction is the translation of the input leads to the complement as shown in the preceding tabulation. It will, however, be necessary to provide means for the function of borrowing from the next higher digit. As far as the modification of the input leads for the function of borrowing is concerned, it is only necessary to reduce the value of the complement by one in each case to gain this end. This will be shown in the following tabulation.

| | | | | | | | | | | |
|---|---|---|---|---|---|---|---|---|---|---|
| Complement | 0 | 9 | 8 | 7 | 6 | 5 | 4 | 3 | 2 | 1 |
| One Borrowed | 9 | 8 | 7 | 6 | 5 | 4 | 3 | 2 | 1 | 0 |

Borrow One Feature

In order to illustrate the conditions in which one is borrowed from the preceding digit when subtracting by addition of complements, two cases will be illustrated which are similar in some respects to the two cases shown for addition.

*Case I.*—No borrow from higher digit. New tens—old tens.

*Ordinary arithmetic*

| | | | |
|---|---|---|---|
| | 1 | 5 | 2 |
| | −0 | 1 | 1 |
| Remainder | 1 | 4 | 1 |

*Subtraction by adding individual digit complements*

| | | | |
|---|---|---|---|
| Old Registration | 1 | 5 | 2 |
| +Complement | 0 | 9 | 9 |
| New Registration | 1 | 4 | 1 |

It should be noted that in the above sum of the old registration and the complement there is no carry from digit to digit. This will be explained later.

*Case II.*—Borrow one from higher digit. New tens—old tens.

*Ordinary arithmetic*

| | | | | | |
|---|---|---|---|---|---|
| | 1 | β | 5 | β | 2 |
| | −0 | | 6 | | 3 |
| Remainder | 0 | | 8 | | 9 |

Note.—The symbol β indicates the operation of borrowing one from the next higher digit.

*Subtraction by addition of individual digit complements*

| | | | | | |
|---|---|---|---|---|---|
| Old Registration | 1 | | 5 | | 2 |
| +Complement | 0 | β | 4 | β | 7 |
| New Registration | 0 | | 8 | | 9 |

In this case it will be noted that in performing this addition one was borrowed from the next higher digit at the same steps as in the example shown for ordinary arithmetic.

From these two cases we can now state the criteria which govern the borrow one or the no borrow condition. An examination of Cases I and II will indicate that the criteria for borrow one or no borrow one in subtraction by addition of individual complements are as follows:

*Borrow one*

New Registration>Old Registration

*No borrow*

New Registration≦Old Registration

Case II also indicates that in subtraction by this method, the condition where the new registration equals the old registration in the tens place, the borrow from the hundreds place is governed by whether there was a borrow in the tens place dictated by the units digits.

In order to point out the similarity between the functioning of the circuit for subtracting and its function when adding, the criteria for carry one or no carry in adding will be shown as follows:

*Carry one*

New Registration<Old Registration

*No Carry*

New Registration≧Old Registration

Note.—When new registration equals old registration, the no carry is modified in the tens place.

From a comparison of the two criteria cited above, it will be seen that they are similar but in reverse order from each other.

From the preceding descriptions of adding and subtracting, it can now be deduced that the only changes which are necessary to convert from an adding circuit to a subtracting circuit are to modify the input to the translation relays so as to translate all input leads to complements or complements minus one and to reverse the functions of the no carry and carry one leads from the digit registers.

Thus no change is required in the adding and storing circuits, but the circuit modifications necessary to cause either an addition or subtraction to be accomplished are confined to the input and interdigital connections disclosed in Figs. 15, 18, and 22. These circuit modifications comprise the four relays of each of these figures. The functioning of relays 1522, 1524, 1800, 1801, 2200 and 2201 for the purpose of addition, when no digit carry-over from the units to the tens place or from the tens place to the hundreds place, or when a carry-over was necessary has been previously described.

The functioning of the circuits to perform the subtraction operations to illustrate the first cited Case I will now be described. It has been assumed that to subtract, relays 2220 and 2221 of Fig. 22 have been operated and it will now be assumed that as previously described the A registers of the adding and storing circuits have been operated to register a total of 152 message units at which time the 0B relays 1652, 2052 and 2452, the B relay 2453 and the 2 relay 2552 of the units A register, the A relay 2051 and the 0 relay 2050 of the tens A register and the B relay 1653 and the 1 relay 1751 of the hundreds A register have been operated. It will now be assumed that from processing the credit ticket it has been determined that 011 message units should be subtracted and that therefore ground has been connected to conductors 1450, 1451 and 1461 incoming to Figs. 15, 18 and 22. It is to be noted that each of the digits to be subtracted is less than the corresponding digits of the stored number 152.

With the subtract relay 2221 now operated, conductor 1461 is extended over its right No. 4 contacts to conductor 2219 and thence through the winding of the 9 units translator relay 2309 to battery on conductor 2203. It is to be noted that the relay operated corresponds to a units digit which is the complement of the units digit represented by the grounded conductor 1461. Relay 2309 upon operating establishes a circuit from ground over its No. 6 contacts, conductor 2314, the left No. 3 contacts of the 0B relay 2452, conductor 2464, the left No. 2 contacts of the 2 relay 2552 and to battery through the winding of the 1 relay 2501 of the units B register, which relay operates and prepares a locking circuit for itself over its right No. 1 contacts to ground supply conductor 2903. In addition relay 2309 establishes a circuit extending from ground at the left No. 8 contacts of the 0B relay 2452, conductor 2416, the left No. 8 contacts of the 2 relay 2552, conductor 2317, the No. 3 contacts of relay 2309, conductor 2320, the left No. 2 contacts of the 0B relay 2452, the left No. 2 contacts of the B relay 2453 and through the winding of the B relay 2403 to battery, whereupon relay 2403 operates and prepares a locking circuit over its left No. 1 contacts to ground supply conductor 2903. As a further result of the operation of the B relay 2403 the previously traced circuit for the K relay 2909 of Fig. 29 is prepared for applying the output of the units section of the adding and storing circuits to the teletypewriter control circuits.

The units digit 1 has thus been subtracted from the previously registered and stored units digit 2 to produce a final units digit 1 which, if the relay 2909 were now operated would result in ground being applied to conductor 2721 over a circuit which would be traced from ground applied to conductor 2768 by the progress switch 2750, the right No. 7 contacts of the 1 relay 2501, conductor 2921, the No. 4 contacts of relay 2909 and to conductor 2721 whereby the teletypewriter would be controlled to print the units digit 1 of the total charge in message units.

Since the units digit 1 of the new total is less than the units digit 2 of the previously registered total there is no necessity to borrow one from the tens place and therefore a circuit is established for the no-borrow tens (NB—T) relay 1805 of Fig. 18, which may be traced from ground at the No. 3 right contacts of the B relay 2453, the No. 3 left contacts of the B relay 2403, conductor 2417, the left back contacts of the 4, 3 and 2 relays 2504, 2503 and 2502 of the units A register, the right No. 1 contacts of the 2 relay 2552 of the units B register, conductor 2506, the right No. 2 contacts of the 0B relay 2452, conductor 2207, the upper No. 3 contacts of the SUB relay 2220, conductor 2222 and to battery through the winding of relay 1805. Relay 1805 thereupon operates and extends the tens group of conductors 1440 to 1449, inclusive, over its contacts to the conductors 1810 to 1819, inclusive, in accordance with the complements of the digital values and therefore, with relay 1805 operated and conductor 1441 assumed to be grounded, such conductor becomes extended over the right No. 4 contacts of relay 1805, conductor 1819 and thence through the winding of relay 1909 to battery on conductor 1803.

Relay 1909 upon operating establishes a circuit from ground over its No. 6 contacts, conductor 1914, the left No. 3 contacts of the 0B relay 2052, the left No. 2 contacts of the 0 relay 2050 of the tens A register, conductor 2704 and to battery through the winding of the 4 relay 2104, whereupon such relay operates and prepares a locking circuit for itself over its right No. 1 contacts to ground supply conductor 2803. In addition, relay 1909 establishes a circuit extending from ground at the left No. 8 contacts of the 0B relay 2052, conductor 2016, the left No. 8 contacts of the 0 relay 2050, conductor 1915, the No. 1 contacts of relay 1909, conductor 1921, the left No. 1 contacts of 0B relay 2052, the left No. 3 contacts of the A relay 2051 and through the winding of the B relay 2003 to battery, whereupon relay 2003 operates and prepares a locking circuit for itself over its left No. 1 contacts to ground supply conductor 2803. As a further result of the operation of relay 2003 the circuit of the K relay 2809 of Fig. 28 is prepared as previously described.

The tens digit 1 has now been subtracted from the previously registered and stored units digit 5 to product a final units digit 4 which, if relay 2809 were now operated would result in ground being connected to conductor 2724 over a circuit which would be traced from ground applied to conductor 2767 by the progress switch 2750, over the right No. 7 contacts of the 4 relay 2104, conductor 2824, the No. 1 contacts of relay 2809 and to conductor 2724, whereby the teletypewriter would be controlled to print the units digit 4 of the total charge in message units.

Since the tens digit of the new total is less than the tens digit of the preceding registered total there is no necessity to borrow one from the hundreds place and therefore a circuit is established for the no-borrow hundreds (NB—H) relay 1525 of Fig. 15, which may be traced from ground at the left No. 2 contacts of the B relay 2003, the right No. 2 contacts of the A relay 2051, the right No. 2 contacts of the 0B relay 2052, conductor 2019, the lower No. 2 contacts of the SUB relay 2220, conductor 2223 and through the winding of relay 1525 to battery. Relay 1525 thereupon operates and extends the hundreds conductors 1450 and 1451 over its contacts to the windings of the hundreds translator relays 1500 and 1509 respectively, in accordance with the complements of the digital values and, therefore, with conductor 1450 grounded, ground is extended over the inner contacts of relay 1525 to the winding of relay 1500 and hence to battery, whereupon relay 1500 becomes operated.

Relay 1500 upon operating establishes a circuit from ground over its No. 7 contacts, conductor 1510, the left No. 7 contacts of the 0B relay 1652, conductor 1660, the left No. 6 contacts of the 1 relay 1751 and through the winding of the 1 relay 1701 to battery whereupon the latter relay operates and prepares a locking circuit for itself over its right No. 1 contacts to ground supply conductor 2703. In addition, relay 1500 establishes a circuit from ground at the left No. 8 contacts of 0B relay 1652, conductor 1616, the left No. 8 contacts of the 1 relay 1751, conductor 1516, the No. 4 contacts of relay 1500, conductor 1520, the left No. 2 contacts of 0B relay 1652, the left No. 2 contacts of the B relay 1653 and through the winding of the B relay 1603 to battery whereupon relay 1603 operates and prepares a locking circuit for itself over its left No. 1 contacts to ground supply conductor 2703. As a further result of the operation of the B relay 1603 the circuit is prepared for the K relay 2709 of Fig. 27 which becomes effective upon the subsequent advance of the progress switch 2750.

The hundreds digit 0 has thus been subtracted from the previously registered and stored hundreds digit 1 to produce a final hundreds digit 1 which, if relay 2709 were now operated would result in ground being applied to conductor 2721 over a circuit which would be traced from ground applied to conductor 2766 by the progress switch, over the right No. 7 contacts of the 1 relay 1751, conductor 2731, the No. 4 contacts of relay 2709 and to conductor 2721 whereby the teletypewriter would be controlled to print the hundreds digit 1 of the total charge and message units.

The B registers have now been operated to register the digits 1, 4, 1 of the final charge in message units in readiness to control the teletypewriter as will be later described.

As illustrative of the second Case II where the digits of the number of message units to be subtracted are greater than the corresponding digits of the previously registered number it will be assumed that the number of message units previously registered is 152 and that the 0B relays 1652, 2052 and 2452, the B relay 2453 and the 2 relay 2552 of the units A register, the A relay 2051 and the 0 relay 2050 of the tens A register and the B relay 1653 and the 1 relay 1751 of the hundreds register have been operated to register the number 152. It will also be assumed that from the reading of the credit ticket it has been determined that a credit of 0, 6, 3 message units should be given and subtracted from the 152 registered message units. As indicative of the 0, 6, 3 message units to be subtracted, ground has been applied to conductors 1450, 1446 and 1463 incoming to Figs. 15, 18 and 22 and as before relays 2220 and 2221 of Fig. 22 have been operated to enable the subtractive functions of the circuits.

With relay 2221 now operated conductor 1463 is extended over its right No. 2 contacts to conductor 2217 and thence through the winding of the 7 units translator relay 2307 to battery on conductor 2203. It is to be noted that the relay operated corresponds to a units digit representing the complement of the units digit represented by the grounded conductor 1463. Relay 2307 upon operating establishes a circuit from ground over its No. 6 contacts, conductor 2312, the left No. 5 contacts of 0B relay 2452, conductor 2462, the left No. 4 contacts of the 2 relay 2552 and to battery through the winding of the 4 relay 2504 of the units B register, which relay operates and prepares a locking circuit for itself over its right No. 1 contacts to ground supply conductor 2903. In addition, relay 2307 establishes a circuit extending from ground at the left No. 8 contacts of the 0B relay 2452, conductor 2416, the left No. 8 contacts of the 2 relay 2552, conductor 2317, the No. 3 contacts of relay 2307, conductor 2321, the left No. 1 contacts of 0B relay 2452, the left No. 3 contacts of the B relay 2453 and through the winding of the A relay 2401 to battery, whereupon relay 2401 operates and prepares a locking circuit for itself over the left No. 1 contacts to ground supply conductor 2903. As a further result of the operation of the A relay 2401 the previously traced circuit for the J relay 2908 is prepared for applying the output of the units section of the adding and storing circuits to the teletypewriter control circuits.

The units digit 3 has thus been subtracted from the previously registered units digit 2 by adding the complement of the digit 3 or 7 to the digit 2 to produce a final units digits 9 which, if the relay 2908 were now operated would result in ground being applied to conductor 2729 over a circuit which would be traced from ground applied to conductor 2768 by the progress switch 2750, over the right No. 7 contacts of the 4 relay 2504, conductor 2924, the No. 1 contacts of relay 2908 and to conductor 2729 whereby the teletypewriter would be controlled to print the units digit 9 of the total charge in message units.

Since the units digit 3 of the new registration is greater than the units digit 2 of the previously registered units it is necessary to borrow one from the tens place and therefore a circuit is established for the borrow one tens (B1—T) relay 1806 of Fig. 18, which circuit may be traced from ground at the left No. 2 contacts of the A relay 2401, the right No. 2 contacts of the B relay 2453, the right No. 3 contacts of the 0B relay 2452, conductor 2204, the upper No. 4 contacts of the SUB relay 2220, conductor 2224 and through the winding of relay 1806 to battery. Relay 1806 thereupon operates and extends the tens group of conductors 1440 to 1449, inclusive, over its contacts to the conductors 1810 to 1819, inclusive, in accordance with values of one less than the complements of the digits represented by conductors 1440 to 1449. Therefore the relay 1806 operated and conductor 1446 assumed to be grounded, such conductor becomes extended over the No. 2 left contacts of relay 1806 to conductor 1813 and thence through the winding of the tens translator relay 1903 to battery on conductor 1803.

Relay 1903 upon operating establishes a circuit from ground over its No. 6 contacts, conductor 1913, the left No. 4 contacts of the 0B relay 2052, the left No. 3 contacts of the 0 relay 2050 of the tens A register, conductor 2073 and through the winding of the 3 relay 2103 of the tens B register to battery, whereupon the latter relay operates and prepares a locking circuit for itself over its right No. 1 contacts to ground supply conductor 2803. In addition, relay 1903 establishes a circuit extending from ground at the left No. 8 contacts of the 0B relay 2052, the left No. 8 contacts of the 0 relay 2050 of the tens A register, conductor 1915, the No. 1 contacts of relay 1903, conductor 1920, the left No. 2 contacts of 0B relay 2052, the left No. 2 contacts of the A relay 2051 and through the winding of the A relay 2001 to battery, whereupon the latter relay operates and prepares a locking circuit for itself over its left No. 1 contacts to ground supply conductor 2803. As a further result of the operation of relay 2001 the previously traced circuit for the J relay 2808 of Fig. 28 is prepared.

The tens digit 6 has thus been subtracted from the previously registered tens digit 5 by adding one less than the complement of the digit 6 or 3 to produce a final tens digit 8 which if relay 2808 were now operated would result in ground being applied to conductor 2728 over a circuit which would be traced from ground applied to conductor 2767 by the progress switch 2750, over the right No. 7 contacts of the 3 relay 2103, conductor 2823, the No. 2 contacts of relay 2808 and to conductor 2728 whereby the teletypewriter would be controlled to print the tens digit 8 of the total charge in message units.

Since the units digit 6 of the new registration is greater than the units digit 5 of the previously registered total, it is necessary to borrow one from the hundreds place and therefor a circuit is established for the borrow one hundreds (B1—H) relay 1526 of Fig. 15, which may be traced from ground over the right No. 3 contacts of the A relay 2051, the left No. 3 contacts of the A relay 2001, conductor 2017, the left No. 1 contacts of the 3 relay 2103 of the tens B register, the right No. 1 back contacts of the 3 and 4 relays 2153 and 2154 of the tens A register, conductor 2106, the right No. 3 contacts of the 0B relay 2052, conductor 2018, the lower No. 3 contacts of relay 2220 and conductor 2225 through the winding of relay 1526 to battery. Relay 1526 thereupon operates and extends the hundreds conductors 1450 and 1451 over its contacts to the windings of the hundreds translator relays 1509 and 1508 respectively in accordance with values of one less than the complements of the digits represented by conductors 1450 and 1451. Therefore with relay 1526 operated and conductor 1450 grounded as assumed, such conductor becomes extended over the inner contacts of relay 1526 and through the winding of relay 1509 to battery. Relay 1509 thereupon operates and establishes a circuit from ground over its No. 6 contacts, conductor 1514, the left No. 3 contacts of the 0B relay 1652, conductor 1664, the left No. 2 contacts of the 1 relay 1751 of the hundreds A register, conductor 1670 and through the winding of the 0 relay 1600 of the hundreds B register to battery, whereupon relay 1600 operates and prepares a locking circuit for itself over its left No. 1 contacts to ground supply conductor 2703. In addition, relay 1509 establishes a circuit from ground at the left No. 8 contacts of relay 1652, conductor 1616, the left No. 8 contacts of the 1 relay 1751, conductor 1516, the No. 2 contacts of relay 1509, conductor 1520, the left No. 2 contacts of 0B relay 1652, the left No. 2 contacts of the B relay 1653 and through the winding of the B relay 1603 to battery, whereupon 1603 prepares a locking circuit for itself over its left No. 1 contacts to ground supply conductor 2703. As a further result of the operation of the B relay 1603 the circuit is prepared for the K relay 2709 of Fig. 27 which becomes effective upon the subsequent advance of progress switch 2750.

The hundreds digit 0 has thus been subtracted from the previously registered and stored digit 1 by adding one less than the complement of the digit 0 or 9 to produce a final hundreds digit 0 which, if relay 2709 were now operated would result in ground being applied to conductor 2720 over a circuit which would be traced from ground applied to conductor 2766 by the progress switch, over the right No. 7 contacts of the 0 relay 1600, conductor 2730, the No. 5 contacts of relay 2709 and to conductor 2720 whereby the teletypewriter would be controlled to print the hundreds digit 0 of the total charge in message units.

The B registers have now been operated to register the digits 0, 8, 9 of the final charge in message units in readiness to control the teletypewriter as will now be described. In the manner previously described a check circuit is enclosed upon the completion of the registration of the last processed ticket assumed to be a ticket for credit and if the adding and storing circuits have functioned properly such circuit will be completed to apply ground to check conductor 2405 thereby causing the release of the operated W relays 2701, 2801 and 2901 which remove ground from ground supply conductors 2707, 2807 and 2907 to release any operated relays of the A registers and to supply ground over their back contacts to conductors 2703, 2803 and 2903 to thereby lock up any operated relays of the B registers. When the relays of the A registers release the check circuit is opened and ground is removed from conductor 2405.

As previously described with the end-of-record relays 709 and 711 operated the connection of ground to conductor 2405 causes the operation and locking of relay 714 which is now effective to establish a circuit from ground at its upper contacts over conductor 715, the left front contact of relay 508, now operated, conductor 512 over the back contact of relay 2605 and through the winding of relay 2603 to battery. Relay 2603 operates and locks over its lower No. 3 contacts to ground at the back contact of relay 2606 and establishes over its lower No. 1 contacts an obvious circuit for relay 2604 which operates and locks over its lower front contact to ground at the back contact of relay 2608. With relays 2603 and 2604 both operated ground is connected to conductor 2618 to start the motors of both the transmitter distributor 2780 and the printer 2791.

Relay 2604 also closes an obvious circuit for relay 2605 which in turn operates to open the operating circuit of relay 2603 and connects ground over conductor 2619 to interrupter 2600. When interrupter 2600 closes its right contact it completes the circuit of relay 2601 which operates and locks to conductor 2619. With relay 2601 operated the closure of the left contacts of interrupter 2600 completes a circuit for relay 2602 which also operates and locks to conductor 2619. The operation of relays 2601 and 2603 permits the motors of the distributor and printer to attain operating speeds before starting to make a printed record.

At its upper No. 4 front contact relay 2603 also establishes a circuit from ground thereover, conductor 2610, normal terminal of the restoring arc of progress switch 2750 with which brush 2753 is engaged, interrupter contacts and winding of stepping magnet 2751 and to battery. Magnet 2751 operates interrupting its own circuit and advancing the brushes 2753 and 2754 to the No. 1 terminals of their respective arcs for preparing the teletypewriter for typing the first character.

TRANSMISSION CONTROL

The teletypewriter used operates on the "start stop" principle. The two motors are run synchronously, and the drive shaft of the transmitter-distributor 2780 is connected through a friction clutch to the brush arm 2790 which is held in normal position by latch 2789 controlled by magnet 2781. The teletypewriter responds to the closures of the selector magnet circuit to type characters dependent on the combinations of such closures.

The transmitter-distributor 2780 is required to transmit a combination of closures in one revolution and this is accomplished by the use of a commutator which is divided into a number of segments 2782 to 2787, inclusive. Segments 2783 to 2787 are connected to control conductors 2743 to 2747 which are multipled to front contacts of character relays of Figs. 28 and 29 whereby signal circuits are closed at various positions in the rotation of the arm 2790 of the distributor 2780. Since the distributor and teletypewriter motors run in synchronism they occupy the same relative positions at the same time with the same resulting effect as though conductors connected distributing and sending segments each to each.

Associated with the transmitter-distributor 2780 are thirty character relays namely, 2830 to 2839, inclusive, of Fig. 28, and 2930 to 2944, inclusive, of Fig. 29 which correspond to the letters A to Y and relays 2840 to 2844, inclusive, which control various teletypewriter operations such as line feed, upper case selection, spacing, lower case selection and carriage return. The character relays 2838, 2839, 2942, 2834, 2937, 2939, 2944, 2940, 2933 and 2837 also control the typing of the digits 0 to 9 when the teletypewriter is adjusted to type numerical characters by the upper case shift.

These character relays when operated connect ground over the segments of the distributor 2780 and conductors 2743 to 2747, inclusive, in accordance with a predetermined code. They also supply ground over conductor 2715 to the armature of relay 2794. Therefore, when start relay 2603 operates, ground is connected to conductor 2611 which is connected with distributor ring 2799 and, with the distributor brush 2790 in its normal position, a circuit is closed over the normal segment 2788 of the distributor through the winding of relay 2794 and over a conductor which connects the transmitter with the teletypewriter and thence through resistance 2793 to battery. With any one of the character relays operated relay 2794 operates and extends ground from conductor 2715 over the upper back contact of relay 2797, normal contacts and winding of relay 2796 and to battery. Relay 2796 thereupon operates, locks over its upper contacts to conductor 2715 and completes a circuit from battery through the winding of latch magnet 2781, lower contacts of relay 2796, lower back contacts of relays 2797 and 2798, conductor 2612 and to ground over the upper No. 3 contacts of relay 2603. The operation of magnet 2781 withdraws latch 2789 and permits brush arm 2790 to make one revolution. As the brush on arm 2790 leaves normal and passes over segment 2782, the signal circuit to the teletypewriter is opened to release the selection magnet thereof and to permit its associated mechanism to revolve in synchronism with that of the distributor 2780. As the brush on arm 2790 passes over segments 2783 to 2787, ground is connected to signal conductor 2716 according to the wiring of the operated character relay.

With the brush 2754 of the progress switch 2750 advanced into engagement with the No. 1 terminal of its arc a circuit is established from ground over the lower No. 2 contacts of relay 2603, the lower contacts of relay 2602, conductor 2613, the normal contacts of stepping relay 2752, brush 2754, conductor 2755 and through the winding of the carriage return character relay 2844 to battery. Relay 2844 thereupon operates and connects ground to conductor 2715 thereby operating relays 2794 and 2796 as above described. Also, relay 2796 operates magnet 2781 and releases brush arm 2790 to make a revolution. Relay 2844 also connects the signal conductor 2746 to segment 2786 of the distributor to send out a pulse during the fourth period. This signal causes the teletypewriter carriage to return to normal irrespective of its previous position.

When relay 2796 operated it closed a circuit from battery through resistance 2795, winding of relay 2797, alternate contacts of relay 2796 to conductor 2715 grounded by the operated character relay 2844. However, relay 2797 is shunted by ground over the contacts of relay 2794 and the upper back contact of relay 2797. As soon as the brush on arm 2790 leaves the normal segment 2788 relay 2794 releases permitting relay 2797 to operate. The operation of relay 2797 opens the circuit of magnet 2781 and the latch 2789 drops back into the position to connect with brush arm 2790 when it again reaches normal. When this occurs the circuit of relay 2794 is closed, completing a circuit from ground on conductor 2715 over contacts of relay 2794, upper front contact of relay 2797, and over the normal contacts and winding of relay 2798 to battery. Relay 2798 thereupon operates, locks over its upper alternate contacts and the inner lower contacts of relays 2796 and 2797 to ground; at its lower back contact opens another point in the circuit of latch magnet 2781; and establishes a circuit from ground on conductor 2612 over its lower front contact and through the winding of stepping relay 2752 to battery. Relay 2752 thereupon operates and establishes a circuit from ground on conductor 2613 over its alternate contacts and through the winding of stepping magnet 2751 to battery whereupon such magnet operates preparatory to advancing the brushes of the progress switch.

As a further result of the operation of stepping relay 2752 the previously-traced circuit for character relay 2844 is opened and such relay releases to remove ground from conductor 2715 and to open the circuit of relay 2794. Relay 2794 thereupon releases followed by the release of relays 2796, 2797, 2798 and 2752. When stepping relay 2752 releases the circuit of stepping magnet 2751 is opened and such magnet releases to advance the brushes of progress switch 2750 into engagement with the No. 2 terminals of their arcs.

A circuit is now established from ground on conductor 2613, over the normal contacts of relay 2752, brush 2754 and the No. 2 terminal of its arc, conductor 2770 and through the winding of the line feed character relay 2840 to battery, whereupon relay 2840 operates and connects ground to conductor 2715 thereby causing the reoperation of relays 2794 and 2796 as previously described. Relay 2796 upon operating causes the reoperation of latch magnet 2781 to release brush arm 2790 to make another revolution. Relay 2840 also connects the signal conductor 2716 over conductor 2744 to segment 2784 of the distributor to send out a pulse in the second period when the brush of arm 2790 passes over segment 2784. When the brush of arm 2790 leaves normal segment 2788, relay 2794 releases thereby permitting relay 2797 to operate as previously described to cause the release of latch magnet 2781 and when the brush again reaches the normal segment relay 2794 reoperates to cause the operation of relay 2798 followed by the operation of stepping relay 2752 and stepping magnet 2751. The pulse delivered to the teletypewriter in the second pulse position, as described, controls the teletypewriter to feed the paper forward one line.

The operation of stepping relay 2752 opens the circuit of the line feed character relay 2840 which releases to open the circuit of relay 2794 which releases to in turn cause the release of relays 2796, 2797, 2798 and 2752 and the release of stepping magnet 2751 to advance the brushes of progress switch 2750 into engagement with the No. 3 terminals of their arcs.

A circuit is now established from ground on conductor 2613, over the normal contacts of relay 2752, brush 2754 and the No. 3 terminal of its arc, conductor 2772 and through the winding of the space character relay 2842 to battery, whereupon relay 2842 operates and connects ground to conductor 2715 thereby causing the reoperation of relays 2794 and 2796 as previously described. Relay 2796 upon operating causes the reoperation of latch magnet 2781 to release brush arm 2790 to make another revolution. Relay 2842 also connects the signal conductor 2716 over conductor 2745 to segment 2785 of the distributor to send out a pulse in the third period when the brush of arm 2790 passes over segment 2985. When the brush leaves normal segment 2788 relay 2794 releases thereby permitting relay 2797 to operate as previously described to cause the release of latch magnet 2781 and, when the brush again leaves the normal segment, relay 2794 reoperates to cause the operation of relay 2798 followed by the operation of stepping relay 2752 and stepping magnet 2751. The pulse delivered to the teletypewriter in the third pulse period as described causes the teletypewriter to advance one space without typing a character.

The operation of stepping relay 2752 opens the circuit of space character relay 2842 which releases to open the circuit of relay 2794. Relay 2794 thereupon releases to in turn cause the release of relays 2796, 2797, 2798 and 2752 and the release of stepping magnet 2751 to advance the brushes of progress switch 2750 into engagement with the No. 4 terminals of their arcs. It will be recalled that in response to processing each ticket of the stack the calling zone relay 834 of Fig. 8 is operated through the operation of the calling office code translator. When it operated it established a circuit over its outer right contacts and conductor 844 through the winding of office code reconstruction relay 2815, there being a relay such as relays 2815, 2816 and 2817 for each office in the billing area.

With relay 2815 operated, representative of the office code designation AU3 for the subscriber whose account is being calculated, and with brush 2754 on the No. 4 terminal of its arc, a circuit is established from ground over conductor 2613, over the normal contacts of relay 2752, brush 2754, over conductor 2756, over the inner upper contacts of relay 2815 cross-connected over rack 2850 to the winding of the A character relay 2830 and thence to battery. Relay 2830 thereupon operates and connects ground to conductor 2715 thereby causing the reoperation of relays 2794 and 2796 as previously described. Relay 2796 upon operating causes the reoperation of latch magnet 2781 to release brush arm 2790 to make another revolution. Relay 2830 also connects signal conductor 2716 over conductors 2743 and 2744 to segments 2783 and 2784 of the distributor to send out pulses in the first and second periods when the brush of arm 2790 passes over such segments. When the brush leaves the normal segment 2788 relay 2794 releases thereby permitting relay 2797 to operate as previously described to cause the release of latch magnet 2781 and, when the brush again reaches the normal segment relay 2794, reoperates to cause the operation of relay 2798 followed by the reoperation of stepping relay 2752 and stepping magnet 2751. The pulses delivered to the teletypewriter in the first and second pulse periods as described cause the teletypewriter to type the letter A and to advance one space.

The operation of stepping relay 2752 opens the circuit of the A character relay 2830 which releases to in turn permit the release of relays 2796, 2797, 2798 and 2752 and the release of stepping magnet 2751 whereupon the brushes of the progress switch 2750 are advanced into engagement with the No. 5 terminals of their arcs.

With relay 2815 operated, brush 2754 in engagement with the No. 5 terminal of its arc and relay 2752 released, a circuit is established from ground on conductor 2613, over the normal contacts of relay 2752, brush 2754, conductor 2757, the lower contacts of relay 2815 cross-connected over the rack 2850 to conductor 2851, and thence through the winding of the U character relay 2940 to battery. Relay 2940 thereupon operates and connects ground to conductor 2715 thereby causing the reoperation of relays 2794 and 2796 as previously described. Relay 2796 upon operating causes the reoperation of latch magnet 2781 to release brush arm 2790 to make another revolution. Relay 2940 also connects signal conductor 2716 over conductors 2743, 2744 and 2745 to segments 2783, 2784, and 2785 of the distributor to send out pulses in the first, second and third periods when the brush of arm 2790 passes over such segments. When the brush leaves the normal segment 2788 relay 2794 releases thereby permitting relay 2797 to operate as previously described to cause the release of latch magnet 2781 and when the brush again reaches the normal segment relay 2794 reoperates to cause the operation of relay 2798 followed by the operation of stepping relay 2752 and stepping magnet 2751. The pulses delivered to the teletypewriter in the first, second and third pulse periods as described cause the teletypewriter to type the letter U and to advance one space.

The operation of stepping relay 2752 opens the circuit of the U character relay 2940 which releases to in turn permit the release of relays 2796, 2797 and 2798 and 2752 and the release of stepping magnet 2751 to advance the brushes of progress switch 2750 into engagement with the No. 6 terminals of their arcs.

With relay 2752 now released a circuit is established from ground on conductor 2613, over the normal contacts of relay 2752, brush 2754, conductor 2758 and through the winding of the upper case character relay 2841 to battery. Relay 2841 thereupon operates and connects ground to conductor 2715 thereby causing the reoperation of relays 2794 and 2796 as previously described. Relay 2796 upon operating causes the reoperation of latch magnet 2781 to release brush arm 2790 to make another revolution. Relay 2841 also connects the signal conductor 2716 over conductors 2743, 2744, 2746 and 2747 to segments 2783, 2784, 2786 and 2787 of the distributor to send out pulses in the first, second, fourth and fifth periods when the brush of arm 2790 passes over such segments. When the brush leaves the normal segment 2788, relay 2794 releases thereby permitting relay 2797 to operate as previously described to cause the release of latch magnet 2781 and, when the brush again reaches the normal segment, relay 2794 reoperates to cause the operation of relay 2798 followed by the operation of stepping relay 2752 and stepping magnet 2751. The pulses delivered to the teletypewriter in the first, second, fourth and fifth pulse periods, as described, cause the teletypewriter to make the upper case shift.

The operation of stepping relay 2752 opens the circuit of the upper case character relay 2841 which releases to in turn permit the release of relays 2796, 2797, 2798 and 2752 and the release of stepping magnet 2751 to advance the brushes of switch 2750 into engagement with the No. 7 terminals of their arcs.

With relay 2752 now released, and relay 2815 operated as previously described, a circuit is established from ground on conductor 2613, over the normal contacts of relay 2752, brush 2754, conductor 2759, the upper contacts of relay 2815 cross-connected over rack 2850 to control conductor 2722, and thence through the winding of character relay 2942 to battery. This relay thereupon operates and is effective to control the teletypewriter to type either the lower case letter U or the upper case numeral 2 depending upon whether the teletypewriter has been shifted to upper or lower case. Relay 2942 upon operating connects ground to conductor 2715 thereby causing the operation of relays 2794 and 2796 as previously described. Relay 2796 upon operating causes the reoperation of latch magnet 2781 to release brush arm 2780 to make another revolution. Relay 2942 also connects the signal conductor 2716 over conductors 2743, 2744, and 2747 to segments 2783, 2784 and 2787 of the distributor to send out pulses in the first, second and fifth periods when the brush of arm 2790 passes over such segments. When the brush leaves the normal segment 2788, relay 2794 releases thereby permitting relay 2797 to operate as previously described to cause the release of latch magnet 2781 and, when the brush again engages the normal segment, relay 2794 reoperates to cause the operation of relay 2798 followed by the operation of stepping relay 2752 and stepping magnet 2751. The pulses delivered to the teletypewriter in the first, second and fifth pulse periods as described, with the upper case shift operated, causes the teletypewriter to type the numeral 2.

The operation of stepping relay 2752 opens the circuit of the character relay 2942 which releases to in turn permit the release of relays 2796, 2797, 2798 and 2752 and the release of stepping magnet 2751 to advance the brushes of progress switch 2750 into engagement with the No. 8 terminals of their arcs. With relay 2752 now released the previously-traced circuit over conductor 2772 is established for the space character relay 2842 which thereupon operates to control the teletypewriter to space without printing a character, in the manner previously described. Thereafter progress switch 2750 is controlled to advance its brushes into engagement with the No. 9 terminals of their arcs. Upon the advance of the brush 2754 the character relay 2842 is released.

With relay 2752 released following the advance of the progress switch and relays 322 and 326 of the Calling Thousands register of Fig. 3 operated to register the thousands digit 9 of the calling line number, as assumed, a circuit is established from ground on conductor 2613, over the normal contacts of relay 2752, brush 2754, conductor 2760 the lower contacts of register relay 326 and the upper contacts of register relay 322 to terminal 9 cross-connected to the similar numbered terminal of Fig. 27, thence over conductor 2729 and through the winding of character relay 2837 to battery. Relay 2837 upon operating is effective to control the teletypewriter to print either the lower case letter W or the upper case numeral 9 depending upon whether the teletypewriter has been shifted to upper or lower case. Relay 2837 upon operating connects ground to conductor 2715 thereby causing the reoperation of relays 2794 and 2796 and the operation of latch magnet 2781 as previously described to release brush arm 2790 to make another revolution. Relay 2837 also connects the signal conductor 2716 over conductors 2746 and 2747 to segments 2786 and 2787 of the distributor to send out pulses in the fourth and fifth periods when the brush of arm 2790 passes over such segments. In the manner previously described the stepping relay 2752 is operated and released to cause stepping magnet 2751 to advance the brushes of progress switch 2750 into engagement with the No. 10 terminals of their arcs. Upon the advance of the brushes the circuit of relay 2837 is opened and such relay releases. The pulses delivered to the teletypewriter in the fourth and fifth pulse periods, as described, with the upper case shift operated causes the typing of the numeral 9.

With relay 2752 now released following the advance of the progress switch and relays 342 and 343 of the Calling Hundreds register of Fig. 3 operated to register the hundreds digit zero of the calling line number, as assumed, a circuit is established from ground on conductor 2613, over the normal contacts of relay 2752, brush 2754, conductor 2761, the lower contacts of register relays 343 and 342 to terminal 0, cross-connected to the similarly numbered terminal of Fig. 27, thence over conductor 2720 and through the winding of character relay 2838 to battery. Relay 2838 upon operating is effective to control the teletypewriter to type either the letter P or the numeral 0 depending upon whether the teletypewriter has been shifted for upper or lower case typing. Relay 2838 upon operating causes ground to be connected over conductor 2715 thereby causing the reoperation of relays 2794 and 2796 and the operation of latch magnet 2781 to release brush arm 2790 to make another revolution. Relay 2838 also connects the signal conductor 2716 over conductors 2744, 2745 and 2747 to segments 2784, 2785 and 2787 of the distributor to send out pulses in the second, third and fifth periods when the brush of arm 2790 passes over such segments. In the manner previously described stepping relay 2752 is operated and released to cause stepping magnet 2751 to advance the brushes of progress switch 2750 into engagement with the No. 11 terminals of their arcs, whereupon character relay 2838 is released. The pulses delivered to the teletypewriter in the second, third and fifth pulse periods, as described, with the upper case shift operated causes the typing of the numeral 0.

With relay 2752 now released following the advance of the progress switch and relays 402 and 406 of the Calling Tens register of Fig. 4 operated to register the tens digit 9 as assumed, a circuit is established from ground on conductor 2613, over the normal contacts of relay 2752, brush 2754, conductor 2762, the lower contacts of register relay 406 and the upper contacts of register relay 402 to terminal 9 cross-connected to the similarly numbered terminal of Fig. 27, thence over conductor 2729 and through the winding of character relay 2837 to battery. Relay 2837 functions as previously described to control the teletypewriter to type numeral 9, whereafter the progress switch is advanced to position its brushes on the No. 12 terminals of its arcs and the character relay 2837 becomes released.

With relay 2752 now released following the advance of the progress switch and relays 423 and 424 of the Calling Units register of Fig. 4 operated to register the units digit 6, as assumed, a circuit is established from ground on conductor 2613, over the normal contacts of relay 2752, brush 2754, conductor 2763, the lower contacts of register relay 424, the inner upper contacts of register relay 422 to terminal 6 cross-connected to the similarly numbered terminal of Fig. 27, thence over conductor 2726 and through the winding of character relay 2944 to battery. Relay 2944 upon operating is effective to control the teletypewriter to print either the lower case letter Y or the numeral 6 depending upon whether the teletypewriter has been shifted for upper or lower case operation. Relay 2944 upon operating connects ground to conductor 2715 thereby causing the reoperation of relays 2794 and 2796 and the operation of latch magnet 2781 to release the brush arm 2790 for another revolution. Relay 2944 also connects the signal conductor 2716 over conductors 2743, 2745 and 2747 to segments 2783, 2785, 2787 of the distributor to send out pulses in the first, third and fifth periods when the brush of arm 2790 passes over such segments.

In the manner previously described stepping relay 2752 is operated and released to cause stepping magnet 2751 to advance the brushes of progress switch 2750 into engagement with the No. 13 terminals of their arcs whereupon character relay 2944 is released. The pulses delivered to the teletypewriter in the first, third and fifth pulse periods, as described, with the upper case shift operated cause the teletypewriter to type the numeral 6.

With relay 2752 now released following the advance of the progress switch the previously-traced circuit over conductor 2772 for the space character relay 2842 is established and such relay operates to control the teletypewriter to space without printing a character as previously described, whereupon the progress switch is controlled to advance its brushes into engagement with the No. 14 terminals of their arcs and the character relay 2842 becomes released.

The directory number AU3-9096 of the subscriber whose bill is being calculated has now been typed and the progress switch 2750 has been advanced into a position for typing the digits of the number of message units for which the subscriber is to be charged. It will be assumed that the subscriber is to be charged for 089 message units as registered by the operated 0 relay 1600 and K relay 2709 of the hundreds section of the adding and storing circuits, by operated 3 relay 2103 and J relay 2808 of the tens section of the adding and storing circuits and by operated 4 relay 2504 and J relay 2908 of the units section of the adding and storing circuits.

With relay 2752 now released following the advance of the progress switch and register relays 1600 and 2709 operated, a circuit is established from ground on conductor 2613, over the normal contacts of relay 2752, brush 2754, conductor 2766, over the right No. 7 contacts of relay 1600, conductor 2730, the No. 5 contacts of relay 2709, conductor 2720 and through the winding of character relay 2838 to battery. Relay 2838 thereupon operates and functions in the manner previously described to control the teletypewriter to print the numeral 0 after which the progress switch is advanced to engage its brushes with the No. 15 terminals of their arcs. Upon the advance of the brushes of the progress switch character relay 2838 becomes released.

With relay 2752 now released following the advance of the progress switch and register relay 2103 and J relay 2808 operated, a circuit is established from ground on conductor 2613, over the normal contacts of relay 2752, brush 2754, conductor 2767, the right No. 7 contacts of relay 2103, the No. 2 contacts of relay 2808, conductor 2728 and to battery through the winding of character relay 2933. Relay 2933 thereupon operates and is effective to cause the teletypewriter to type either the letter I or the numeral 8 depending upon whether the teletypewriter has been shifted for upper or lower case typing. Relay 2933 upon operating connects ground to conductor 2715 thereby causing the reoperation of relays 2794 and 2796 and the operation of latch magnet 2781 to release the brush arm 2790 for another revolution. Relay 2933 also connects the signal conductor 2716 over conductors 2743 and 2744 to distributor segments 2783 and 2784 to send out pulses in the first and second periods when the brush of arm 2790 passes over such segments. In the manner previously described the stepping relay 2752 is operated and released to cause the stepping magnet 2751 to advance the brushes of the progress switch 2750 into engagement with the No. 16 terminals of their arcs whereupon character relay 2953 becomes released. The pulses delivered to the teletypewriter in the first and second pulse periods, as described, with the upper case shift operated cause the teletypewriter to type the numeral 8.

With relay 2752 released following the advance of the progress switch and with register relay 2504 and J relay 2908 operated, a circuit is established from ground on conductor 2613, over the contacts of relay 2752, brush 2754, conductor 2768, the right No. 7 contacts of relay 2504, conductor 2924, the No. 1 contacts of relay 2908, conductor 2729 and through the winding of character relay 2837 to battery. Relay 2837 thereupon operates to control the teletypewriter to type the numeral 9 and to advance the brushes of progress switch into engagement with the No. 17 terminals of their arcs as previously described.

With relay 2752 released following the advance of the progress switch a circuit is established from ground on conductor 2613, over the normal contacts of relay 2752, brush 2754, conductor 2755 and to battery through the winding of carriage return character relay 2844 whereupon such relay functions in the manner previously described to control the teletypewriter to perform its carriage return function, after which the progress switch is advanced to engage its brushes with the No. 18 terminals of their arcs.

With relay 2752 released following the advance of the progress switch, a circuit is established from ground on conductor 2613, over the normal contacts of relay 2752, brush 2754, conductor 2771 and to battery through the winding of the lower case character relay 2843. Relay 2843 operates and connects ground to conductor 2715 thereby causing the reoperation of relays 2794 and 2796 and the reoperation of latch magnet 2781 to release brush arm 2790 for another revolution. Relay 2843 also connects the signal conductor 2716 over conductor 2743 to 2747, inclusive, to distributor segments 2783 to 2787, inclusive, to send out pulses in the five pulse positions of the distributor as the brush of arm 2790 passes over such segments. These pulses are effective to shift the teletypewriter back to its lower case typing condition. In the manner previously described the stepping relay 2752 is operated and released to cause stepping magnet 2751 to advance the brushes of the progress switch 2750 into engagement with their No. 19 terminals whereupon the operated character relay 2843 becomes released.

In position 19 of brush 2754 and with relay 2752 released a circuit is established from ground on conductor 2613, over the normal contacts of relay 2752, brush 2754, conductor 2769 and through the winding of relay 2606 whereupon such relay operates opening at its back contact the locking circuit of relay 2603 which thereupon releases. The relay 2603 removes ground from conductor 2618 to bring the transmitter and teletypewriter motors to rest. It cannot reoperate if conductor 512 is momentarily reclosed since relay 2604 is locked operated to the back contact of relay 2608 and therefore holds relay 2604 operated. Relay 2605 maintained ground on conductor 2619 to supply ground to the moving contact of interrupter 2600 and to hold relays 2601 and 2602 operated. When the interrupter closes its right contact relay 2609 operates in a circuit extending over the lower back contact of relay 2603 and locks to ground on conductor 2619. With relay 2606 operated the closure of the left contact of interrupter 2600 completes the circuit of relay 2608 which operates and locks to ground on conductor 2619 and at its lower back contact opens the locking circuit of relay 2604, which then releases in turn releasing relay 2605 followed by the release of relays 2601, 2602, 2608 and 2609. The delay introduced by the operation of relays 2608 and 2609 is to permit the teletypewriter motor to come to rest before ground is disconnected from the ring 2799 of the distributor 2780 by the release of relay 2604 as opening the signal lead before the teletypewriter has been stopped might result in typing an extra character when the motor is restarted for the next recording.

When relay 2606 operated as previously described, it established a circuit from ground over its front contact, conductor 2614 and through the winding of the RL relay 121 of Fig. 1 which relay operates and locks under the control of reader 100 and opens the locking circuit of start relay 120. Relay 120 thereupon releases, removing ground from the ground bus-bars 105 and 109 to permit the release of all operated relays of the registering and calculating circuits.

The release of relay 2603 as previously described establishes a circuit from ground over its upper back contact, conductor 2615, over the strapped terminals of the restoring arc of switch 2750 with which the brush 2753 is engaged, and through the interrupter contacts and winding of stepping magnet 2751 to battery. Thereby such magnet becomes operated in a self-interrupting circuit to advance the brushes of the progress switch until brush 2753 disengages the last terminal of its arc when the circuit of magnet 2751 will become opened and the switch will be brought to rest in its normal position.

A ticket or bill on which the directory number of the subscriber whose account has been calculated and the number of message units to be charged for the billing period have been typed and the circuits have been released preparatory to processing the tickets of another subscriber's account.

In the foregoing description it has been assumed that a teletypewriter has been used for typing the required data on a ticket or bill and that the progress switch 2750 associated therewith has been designed to control the teletypewriter to print all of the data in a single line. It will, of course, be obvious that by the proper interpolation of line feed, carriage return and spacing signal positions in the arc of the progress switch associated with brush 2754, the data could be typed in more than one line and could be placed in desired positions in such lines on a prepared form.

It would, of course, be possible to type the entire office name of the subscriber whose account is being calculated by providing additional contacts on the code reconstruction relays, such as relay 2815, connected on one side to additional windings of character relays and on the other side to additional terminals on the arc progress switch with which brush 2754 is associated. Thus in the example assumed the contacts added to relay 2815 could be connected to the character relays 2830, 2940, 2833, 2933, 2831, 2837, 2836 and 2834 whereby the teletypewriter could be controlled to print AUDUBON 3 rather than the abbreviation AU3. It is to be noted that additional code reconstruction relays, such as 2816 and 2817 disclosed in Fig. 28, are arranged to control the typing of office designations RE2 as for office REgent 2 and ST4 as for office STate 4.

While a well-known type of teletypewriter has been selected to illustrate the invention, it is to be understood that the circuits of the invention could be readily modified for use with any other well-known type of printing or typing device.

What is claimed is:

1. In an accounting system, means for scanning a stack of tickets appertaining to a subscriber's account for a billing period, said tickets including a ticket for each toll call and a credit ticket representing message units to be credited to the subscriber's account, means for computing from each toll ticket scanned the message units charged for each individual toll call, means for totalizing the message units computed for all scanned toll tickets, and means for subtracting from such total the message units represented by said credit ticket.

2. In an accounting system, means for scanning a stack of tickets appertaining to a subscriber's account for a billing period, said tickets including a ticket for each toll call, a local call ticket representing the total message units for all local calls and a credit ticket representing message units to be credited to the subscriber's account, means for computing from each toll ticket scanned the charge in message units for each toll call, means for totalizing the message units computed for all scanned toll tickets, means for adding to such total the message units represented by said local call ticket and means for subtracting from the latter total the message units represented by said credit ticket.

3. In an accounting system, means for scanning a stack of tickets appertaining to a subscriber's account for a billing period, said tickets including a ticket for each debit and a ticket for a credit to be charged to the subscriber's account, means responsive to the scanning of each ticket for determining the charge in message units represented thereby, means for totalizing the message units determined by said latter means, means for applying the total of message units as determined by said determining means for each scanned ticket to said totalizing means, and means for controlling said latter means to prepare an additive or a subtractive application of message units to said totalizing means.

4. In an accounting system, means for scanning a stack of tickets appertaining to a subscriber's account for a billing period, means for computing from each ticket scanned the charge in message units for each call represented by a scanned ticket, means for totalizing the message units computed for all scanned tickets, a printing device, and means controlled by said totalizing means for controlling said printing device to print the total of message units to be charged against the subscriber's account.

5. In an accounting system, means for scanning a stack of tickets appertaining to a subscriber's account for a billing period, means for registering the items of information secured in response to scanning each ticket, one of said items being digits representative of the office code and numerical designations of the directory listing number of the subscriber whose account is being calculated, means responsive to the registered items of information for each scanned ticket for computing the charge in message units for the call represented by the scanned ticket, means for totalizing the message units computed for all scanned tickets, a printing device, and means controlled by said registering means and said totalizing means for controlling said printing device to print the directory listing number of the subscriber whose account is being computed and the total of message units to be charged against such account.

6. In an accounting system, means for successively scanning the tickets of a stack appertaining to the subscriber's account for a billing period, said tickets including a ticket for each toll call and a ticket representative of the total message units for all local calls, means for registering the items of information secured in response to scanning each ticket, means responsive to said registering means when a toll ticket is scanned for computing the charge in message units for the call represented by the scanned ticket, means for adding the message units determined by said computing means to the message units determined by the last preceding operation of said computing means and for storing the total message units, means responsive to the completion of each of said adding and storing operations if said latter means for restoring said registering and said computing means to render them responsive to the scanning of the next succeeding ticket of the stack, means responsive to the registration of the data of said local call ticket for operating said adding and storing means to add the local call message units to the previous total of toll call message units, a printing device, means operative upon the completion of said last adding and storing operations to control said device to print the final total of said message units, and means operative following the completion of printing to restore all operated apparatus in readiness for processing another stack of tickets.

7. In an accounting system, means repeatedly operable to calculate the message unit charges for a plurality of telephone calls, each of said charges being represented by a plural digit number, a summing means for summing said charges consisting of a plurality of adding and storing circuits corresponding to the digit places of the plural digit numbers to be summed, each of said adding and storing circuits comprising an addend register responsive to said calculating means and two other registers serving alternately as augend and sum registers, counting means for controlling the summing cycle whereby said two other registers are alternately rendered responsive to said addend register, and control circuits controlled by said counting means for the register at that time functioning as a sum register in accordance with the operated condition of the register at that time functioning as an augend register and the operated condition of said addend register, whereby the digits registered by the registers serving at any time as sum registers represent the total charge in message units for all calls.

8. In an accounting system, means repeatedly operable to calculate the message unit charges for a plurality of telephone calls, each of said charges being represented by a plural digit number, a summing means for summing said charges consisting of a plurality of adding and storing circuits corresponding to the digit places of the plural digit numbers to be summed, each if said adding and storing circuits comprising a set of addend relays responsive to said calculating means and two other sets of relays serving alternately for representing digit values and for calculating the sum of an augend and an addend, counting means for controlling the summing cycle whereby said two other sets of relays are alternately rendered responsive to said addend relays, and control circuits controlled by said counting means for the relays of the set at that time functioning as a sum register in accordance with the operated condition of the relays of the set at that time functioning as an augend register and in accordance with the operated condition of said addend relays, whereby the digits registered by said sets of relays serving at any time as sum registers represent the total charge in message units for all calls.

9. In an accounting system, means repeatedly operable to calculate the message unit charges for a plurality of telephone calls, each of said charges being represented by a plural digit number, a set of carry circuits for each digit place of any of said calculated charges outgoing from said calculating means, a summing means for summing said charges consisting of a plurality of adding and storing circuits corresponding to the digit places of said carry circuits, each of said adding and storing circuits comprising a set of addend relays responsive to said calculating means over a set of said carry circuits and two other sets of relays serving alternately for representing digital values and for calculating the sum of an augend and an addend, counting means for controlling the summing cycle whereby said two other sets of relays are alternately rendered responsive to said addend relays, control circuits controlled by said counting relays for the relays of the set at that time functioning as a sum register in accordance with the operated condition of the relays of the set at that time functioning as an augend register and in accordance with the operated condition of said addend relay, whereby the digits registered by said sets of relays serving at any time as sum registers represent the total charge in message units, and means effective if the value of a sum digit in any digit place is less than the value of the augend digit for that digit place for causing a positive shift of one in the digit value of the carry circuits of the next higher digit place.

10. In an accounting system, means repeatedly operable to calculate the message unit charges for a plurality of telephone calls each of said charges being represented by a plural digit number, a set of carry circuits for each digit place of any of said calculated charges outgoing from said calculating means, a summing means for summing said charges consisting of a plurality of adding and storing circuits corresponding to the digit places of said carry circuits, each of said adding and storing circuits comprising a set of addend relays responsive to said calculating means and a set of said carry circuits and two other sets of relays serving alternately for representing digital values and for calculating the sum of an augend and an addend, counting relays for controlling the summing cycle whereby said two other sets of relays are alternately rendered responsive to said addend relays, control circuits controlled by said counting relays for the relays of the set at that time functioning as a sum register in accordance with the operated condition of the relays of the set at that time functioning as an augend register and in accordance with the operated condition of said addend relays, whereby the digits registered by said sets of relays serving at any time as sum registers represent the total charge in message units, means effective if the value of a sum digit in any digit place is greater than the value of the augend digit for the same digit place for connecting the carry circuits of the next higher digit place to the addend relays of that digit place without change in digital values, and means effective if the value of a sum digit in any digit place is less than the value of the augend digit of the same place for connecting the carry circuits of the next higher digit place to the addend relays of that digit place with a positive shift of one in the digit values.

11. In an accounting system, means repeatedly operable to calculate the message unit charges for a plurality of telephone calls, means for registering a message units credit, each of said charges and said credit being represented by a plural digit number, a set of carry circuits for each digit place of any of said calculated charges or said credit, a summing means for summing said charges and said credit consisting of a plurality of adding and storing circuits corresponding to the digit places of said carry circuits, each of said adding and storing circuits comprising a set of addend relays operable over a set of carry circuits and two other sets of relays serving alternately for representing digital values and for calculating the sum of an augend and an addend, counting means for controlling the summing cycle whereby said two other sets of relays are alternately rendered responsive to said addend relays, control circuits controlled by said counting relays for the relays of the sets at that time functioning as a sum register in accordance with the operated condition of the relays of the set at that time functioning as an augend register and in accordance with the operated condition of said addend relays, whereby the digits registered by said sets of relays serving at any time as sum registers represent the total charge in message units, a positive sign relay operable when charges are to be debited and a negative sign relay operable when a credit is to be subtracted, said negative sign relay operative to cause said sets of carry circuits to be connected to the sets of addend relays of the same digit places in an order inverse of the order by which said positive sign relay causes said sets of carry circuits to be connected to said sets of addend relays, whereby the digital values expressed by said addend relays upon the operation of said negative sign relay are complements of the digital values expressed by said addend relays upon the operation of said positive sign relay.

12. In an accounting system, means repeatedly operable to calculate the message unit charges for a plurality of telephone calls, means for registering a message units credit, each of said charges and said credit being represented by a plural digit number, a set of carry circuits for each digit place of any of said calculated charges or said credit, a summing means for summing said charges and said credit consisting of a plurality of adding and storing circuits corresponding to the digit places of said carry circuits, each of said adding and storing circuits comprising a set of addend relays operable over a set of carry circuits and two other sets of relays serving alternately for representing digital values and for calculating the sum of an augend and an addend, counting means for controlling the summing cycle whereby said two other sets of relays are alternately rendered responsive to said addend relays, control circuits controlled by said counting relays for the relays of the set at that time functioning as a sum register in accordance with the operated condition of the relays of the set at that time functioning as an augend register and in accordance with the operated condition of said addend relays, whereby the digits represented by said sets of relays serving at any time as sum registers represent the total charge in message units, a negative sign relay operable when a credit is to be subtracted to cause said sets of carry circuits to be connected in an inverse order to the sets of addend relays of the same digit places whereby the digital values expressed by said addend relays are the complements of the digital values represented by said sets of carry circuits, and means effective if the value of a sum digit in any digit place is greater than the value of the augend digit of the same digit place for causing a negative shift of one in the digit values expressed by the set of addend relays of the next higher digit place.

13. In an accounting system, means repeatedly operable to calculate the message unit charges for a plurality of telephone calls, means for registering a message unit credit, each of said charges and said credit being represented by a plural digit number, a set of carry circuits for each digit place of any of said calculated charges or said credit, summing means for summing said charges and said credit consisting of a plurality of adding and storing circuits corresponding to the digit places of said carry circuits, each of said adding and storing circuits comprising a set of addend relays operable over a set of carry circuits and two other sets of relays serving alternately for representing digital values and for calculating the sum of an augend and an addend, counting means for controlling the summing cycle whereby said two other sets of relays are alternately rendered responsive to said addend relays, control circuits controlled by said counting relays for the relays of the set at that time functioning as a sum register in accordance with the operated condition of the relays of the set at that time functioning as an augend register and in accordance with the operated condition of said addend relays, whereby the digits represented by said sets of relays serving at any time as sum registers represent the total charge in message units, a negative sign relay operated when a credit is to be subtracted to cause said sets of carry circuits to be connected in an inverse order to the sets of addend relays of the same digit place, whereby the digit values expressed by said addend relays are the complements of the digital values represented by said sets of carry circuits if the value of a sum digit in any digit place is less than or equal to the value of the augend digit of the same digit place, and means effective if the value of a sum digit in any digit place is greater than the value of the augend digit of the same digit place for causing a negative shift of one in the digit values expressed by the set of addend relays of the next higher digit place.

14. In a system for computing charges for telephone calls, registers for registering each of the office code digits and numerical digits of the directory listing number of a subscriber whose account is being computed, a translator jointly controlled by the office code registers, calling area relays selectively operable by said translator for determining the office in which subscribers are located, office identification reconstruction relays selectively operable by said calling area relays for distinctively reconstructing the directory listing identification of the offices of subscribers, a progress switch, a printing device and means under the control of said progress switch for successively enabling said operated reconstruction relay and said numerical digit registers to control said printing device to print on a ticket or bill the directory listing number of the subscriber whose account is being computed.

15. In a system for computing charges for telephone calls, a group of incoming tens conductors, a group of incoming units conductors, means for conditioning a conductor in each of said groups representative of the tens and units digits of the number of overtime intervals in a call, a charge route relay for determining the charge rate to be applied to the call, and means controlled by said charge route relay and conditioned conductors of said tens and units groups to determine the charge in message units for the total overtime period of conversation.

16. In a system for computing charges for telephone calls, a group of incoming tens conductors, a group of incoming units conductors, means for conditioning a conductor in each of said groups representative of the tens and units digits of the number of overtime intervals in a call, a charge route relay for determining the charge rate to be applied to the call, and multiplying relays selectively responsive to said latter relay for determining the charge in message units for the total overtime period of conversation in accordance with the product of the number of overtime intervals represented by said conditioned conductors and the charge rate for each overtime interval prescribed by the selected multiplying relay.

17. In a system for computing charges for telephone calls, a group of incoming hundreds conductors, a group of incoming tens conductors, a group of incoming units conductors, means for conditioning a conductor of each of said groups representative of the hundreds, tens and units digits of the total charge in message units for the overtime period of conversation, a charge route relay, and means selectively responsive to said relay for adding to said charge the charge in message units for the initial period of conversation as determined by the charge rate prescribed by said charge route relay.

18. In a system for computing charges for telephone calls, a group of incoming hundreds conductors, a group of incoming tens conductors, a group of incoming units conductors, means for conditioning a conductor of each of said groups representative of the hundreds, tens and units digits of the total charge in message units for the overtime period of conversation, a charge route relay, a group of outgoing hundreds conductors, a group of outgoing tens conductors, a group of outgoing units conductors, and adding relays selectively operable in response to said charge route relay for interconnecting the incoming groups of conductors with the outgoing groups of conductors in a manner representative of the addition of the charge for the initial period of conversation as prescribed by the operated adding relay to the charge for the overtime period.

JOHN B. RETALLACK.

References Cited in the file of this patent

UNITED STATES PATENTS

| Number | Name | Date |
|---|---|---|
| 2,165,925 | Goodrum et al. | July 11, 1939 |
| 2,178,064 | Bryce | Oct. 21, 1939 |
| 2,268,203 | Carpenter et al. | Dec. 30, 1941 |
| 2,438,081 | Watson et al. | Mar. 16, 1948 |